United States Patent
Okubo et al.

(10) Patent No.: US 7,088,472 B1
(45) Date of Patent: Aug. 8, 2006

(54) METHOD, SYSTEM, AND APPARATUS FOR IMAGE FORMING AND PROCESSING CAPABLE OF APPROPRIATELY ADJUSTING INPUT AND OUTPUT PROPERTIES

(75) Inventors: Hiromi Okubo, Yokohama (JP); Hiroyuki Shibaki, Kawasaki (JP); Hiroshi Ishii, Yokohama (JP); Hiroki Kubozono, Yokohama (JP); Shougu Oneda, Urayasu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/473,647

(22) Filed: Dec. 28, 1999

(30) Foreign Application Priority Data

| Dec. 28, 1998 | (JP) | ............................................ 10-377489 |
| Feb. 1, 1999 | (JP) | ............................................ 11-024345 |
| Feb. 1, 1999 | (JP) | ............................................ 11-024346 |

(51) Int. Cl.
*H04N 1/40* (2006.01)

(52) U.S. Cl. ........................................ 358/2.1; 358/434
(58) Field of Classification Search .................. 358/2.1, 358/1.9, 3.21–3.22, 3.27, 504, 515–523, 358/434
See application file for complete search history.

(56) References Cited

U.S. PATENT DOCUMENTS

| 4,979,129 | A | 12/1990 | Okubo et al. | ................ 364/518 |
| 5,392,137 | A | 2/1995 | Okubo | ........................ 358/216 |
| 5,410,619 | A | 4/1995 | Fujisawa et al. | ............... 382/54 |
| 5,473,444 | A | 12/1995 | Sakano et al. | ............... 358/462 |
| 5,647,010 | A | 7/1997 | Okubo et al. | ................ 382/100 |
| 5,652,803 | A | 7/1997 | Tachikawa et al. | ......... 382/235 |
| 5,659,628 | A | 8/1997 | Tachikawa et al. | ......... 382/135 |
| 5,751,854 | A | 5/1998 | Saitoh et al. | ................ 382/216 |
| 5,781,653 | A | 7/1998 | Okubo | ........................ 382/461 |
| 5,831,751 | A | 11/1998 | Ohneda et al. | ............. 358/521 |
| 6,272,248 | B1 | 8/2001 | Saitoh et al. | ................ 382/226 |
| 2002/0021455 | A1 | 2/2002 | Ishii et al. | |

FOREIGN PATENT DOCUMENTS

JP 9-172543 6/1997

OTHER PUBLICATIONS

U.S. Appl. No. 09/473,647, filed Dec. 28, 1999, Okubo et al.
U.S. Appl. No. 10/785,034, filed Feb. 25, 2004, Shibaki et al.
U.S. Appl. No. 10/760,460, filed Jan. 21, 2004, Miyagi et al.
U.S. Appl. No. 10/732,442, filed Dec. 11, 2003, Takenaka et al.
U.S. Appl. No. 10/665,463, filed Sep. 22, 2003, Shibaki et al.

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

A novel image forming system which includes an image input apparatus, an image processing apparatus, and an image output apparatus. The image input apparatus has an input property profile, reads an image, and converts the image into image data using the input property profile. The image processing apparatus executes an image processing operation relative to the image data. The image output apparatus has an output property profile, outputs an image using the output property profile in accordance with the image data processed through the image processing operation. The above-mentioned image processing apparatus includes a property recognizer, a memory, and a property calculator. The property recognizer reads and recognizes the input property profile and the output property profile. The memory prestores a reference property profile. The property calculator calculates an optimal property based on the input property profile, the output property profile, and the reference property profile so that the image processing operation is optimally executed with the optimal property.

104 Claims, 49 Drawing Sheets

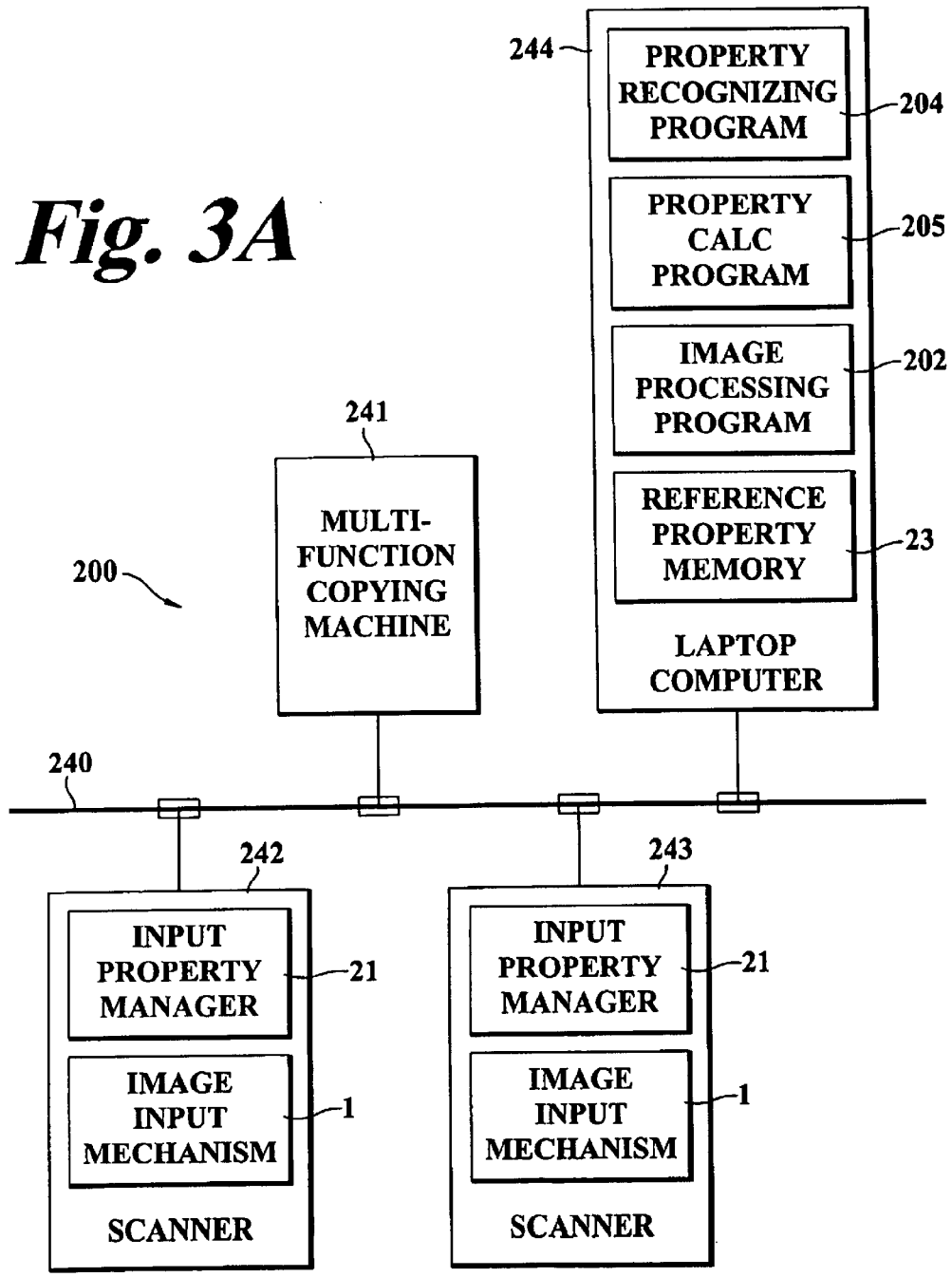

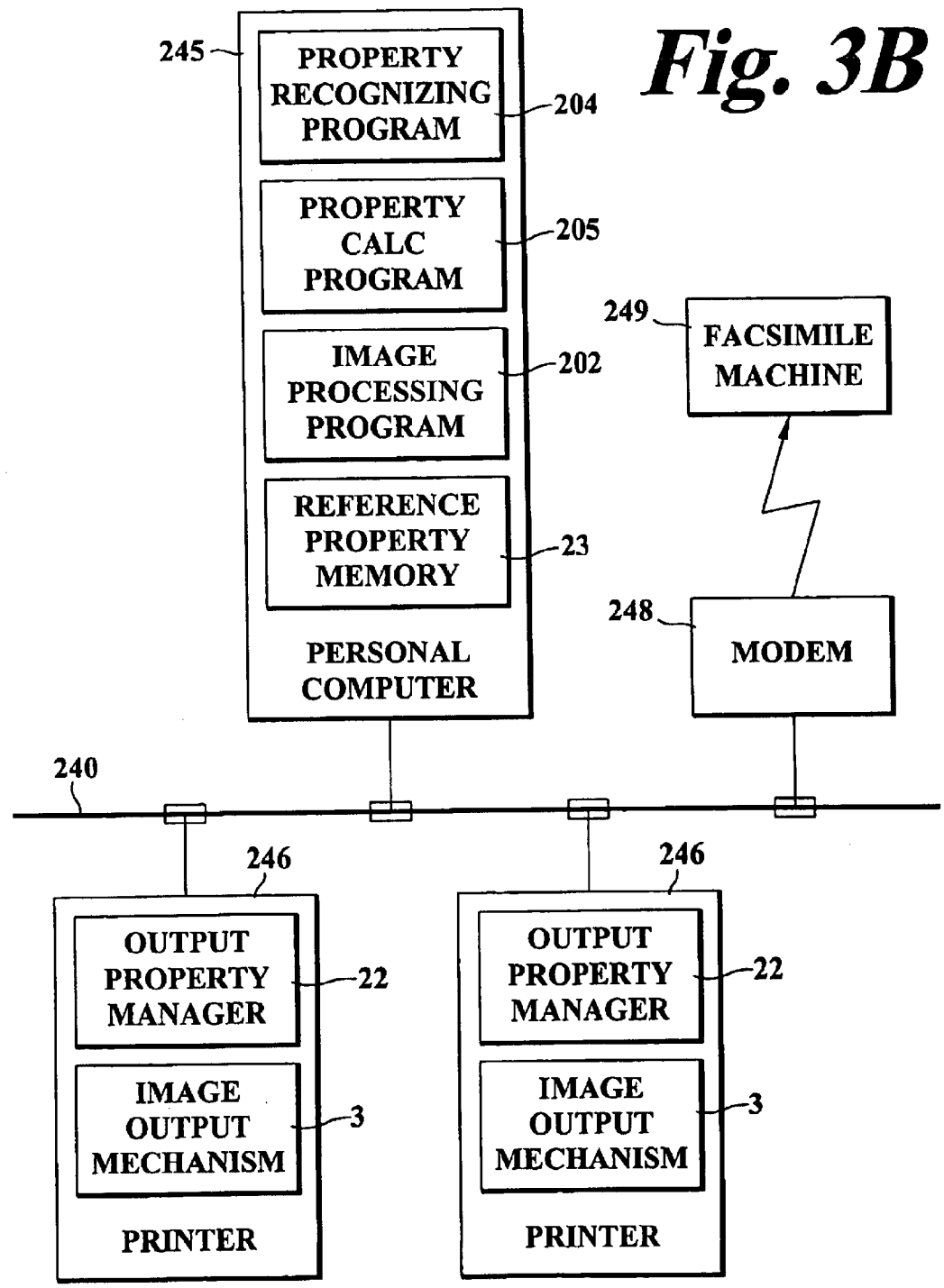

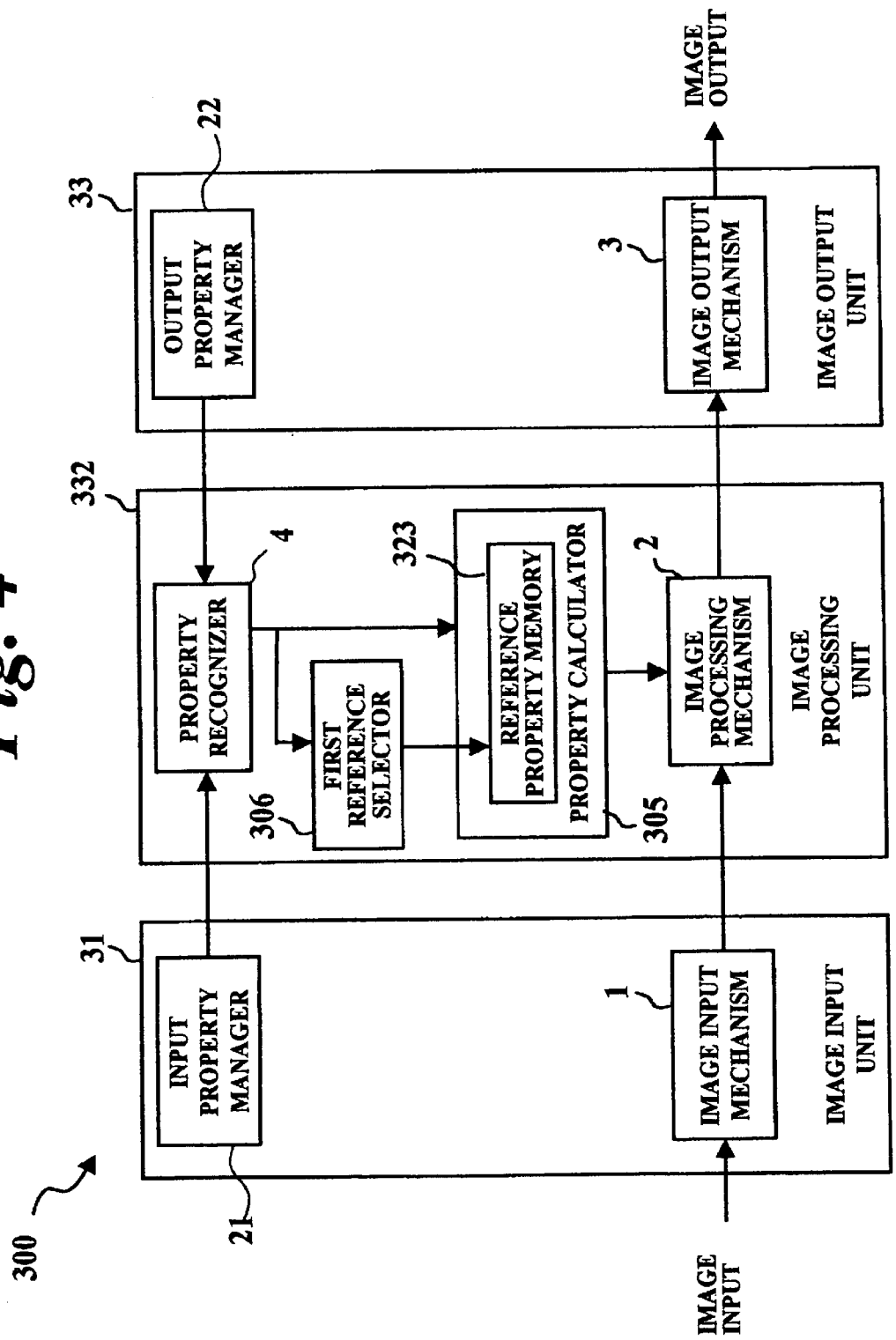

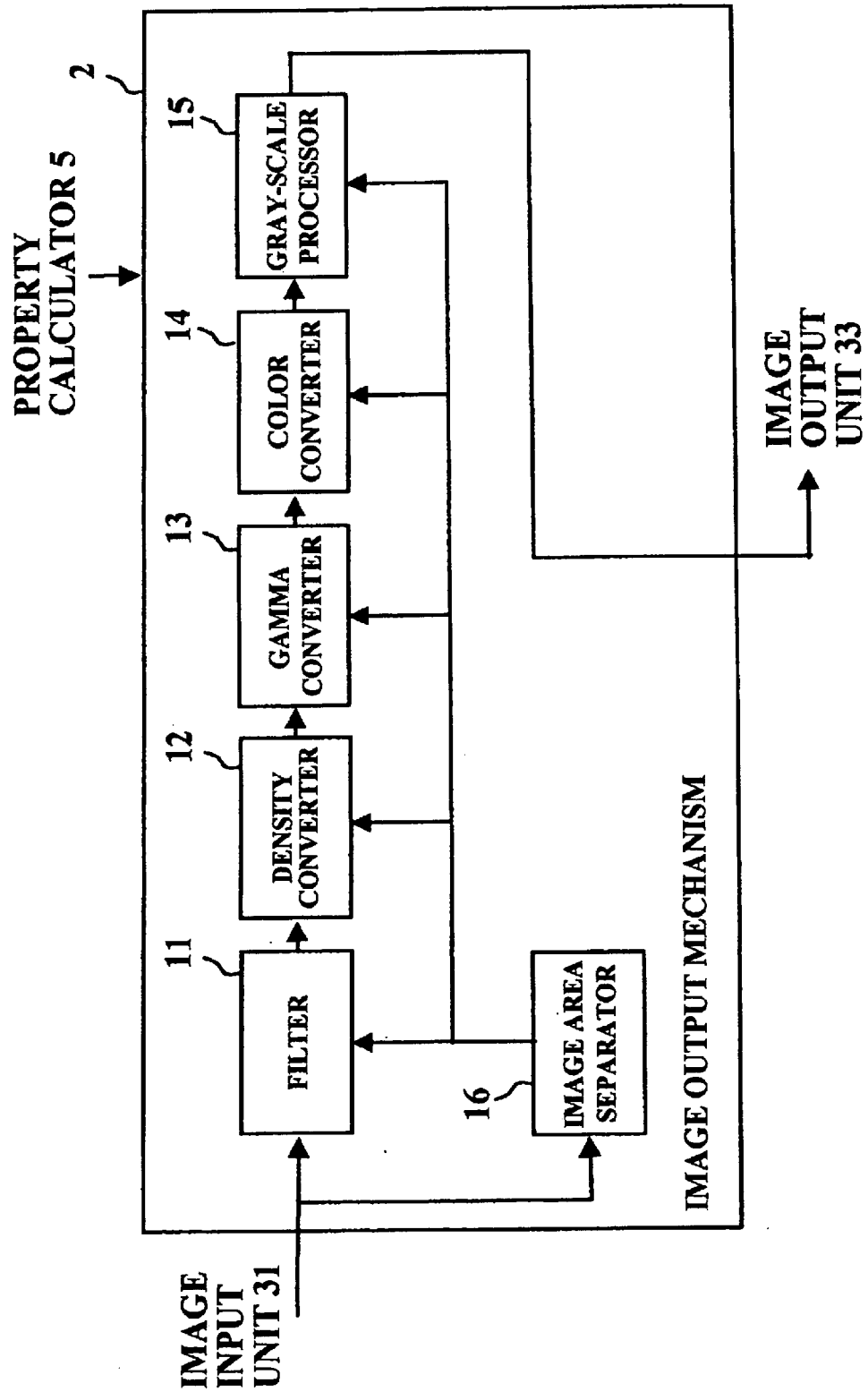

Fig. 13A

| INPUT IMAGE-MODE | OUTPUT IMAGE-MODE | DETERMINING IMAGE-MODE |
|---|---|---|
| NON-SPECIFIED | NON-SPECIFIED | PREDETERMINED IMAGE-MODE |
| SPECIFIED | NON-SPECIFIED | INPUT IMAGE-MODE |
| NON-SPECIFIED | SPECIFIED | OUTPUT IMAGE-MODE |
| SPECIFIED | DIFFERENTLY SPECIFIED | OUTPUT IMAGE-MODE |

Fig. 13B

| INPUT IMAGE-MODE | OUTPUT IMAGE-MODE | DETERMINING IMAGE-MODE |
|---|---|---|
| NON-SPECIFIED | NON-SPECIFIED | PREDETERMINED IMAGE-MODE |
| SPECIFIED | NON-SPECIFIED | INPUT IMAGE-MODE |
| NON-SPECIFIED | SPECIFIED | OUTPUT IMAGE-MODE |
| SPECIFIED | DIFFERENTLY SPECIFIED | INPUT IMAGE-MODE |

Fig. 14A

| INPUT IMAGE-MODE | OUTPUT IMAGE-MODE | RESOLUTION | DETERMINING IMAGE-MODE |
|---|---|---|---|
| NON-SPECIFIED | NON-SPECIFIED | VOID | PREDETERMINED IMAGE-MODE |
| SPECIFIED | NON-SPECIFIED | VOID | INPUT IMAGE-MODE |
| NON-SPECIFIED | SPECIFIED | VOID | OUTPUT IMAGE-MODE |
| SPECIFIED | SPECIFIED | INPUT = OUTPUT | INPUT IMAGE-MODE |
| SPECIFIED | SPECIFIED | INPUT < OUTPUT | INPUT IMAGE-MODE |
| SPECIFIED | SPECIFIED | INPUT > OUTPUT | OUTPUT IMAGE-MODE |

Fig. 14B

| INPUT IMAGE-MODE | OUTPUT IMAGE-MODE | RESOLUTION | DETERMINING IMAGE-MODE |
|---|---|---|---|
| NON-SPECIFIED | NON-SPECIFIED | VOID | PREDETERMINED IMAGE-MODE |
| SPECIFIED | NON-SPECIFIED | VOID | INPUT IMAGE-MODE |
| NON-SPECIFIED | SPECIFIED | VOID | OUTPUT IMAGE-MODE |
| SPECIFIED | SPECIFIED | INPUT = OUTPUT | OUTPUT IMAGE-MODE |
| SPECIFIED | SPECIFIED | INPUT < OUTPUT | INPUT IMAGE-MODE |
| SPECIFIED | SPECIFIED | INPUT > OUTPUT | OUTPUT IMAGE-MODE |

*Fig. 21*

|   |   |   |
|---|---|---|
| a | b | c |
| d | * | e |
| f | g | h |

| RESULT OF EDGE DETECTION | RESULT OF SCREENED-PRINT PIXEL DETECTION | RESULT OF COLOR PIXEL DETECTION | TATAL JUDGEMENT |
|---|---|---|---|
| EDGE AREA | NON-SCREENED-PRINT AREA | COLOR AREA | COLOR CHARACTER AREA |
| EDGE AREA | NON-SCREENED-PRINT AREA | NON-COLOR AREA | NON-COLOR CHARACTER AREA |
| OTHER AREA | | | PATTERN AREA |

*Fig. 23*

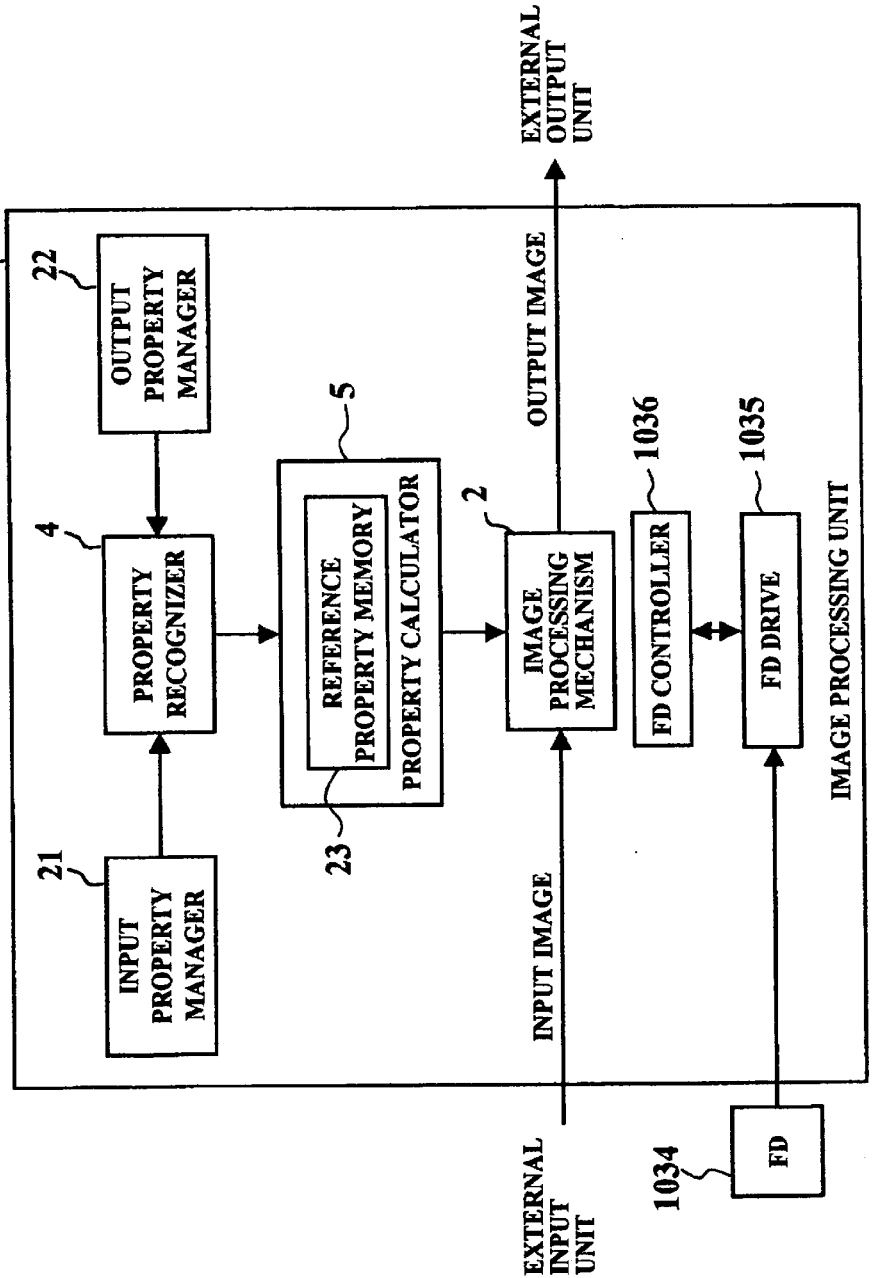

METHOD, SYSTEM, AND APPARATUS FOR IMAGE FORMING AND PROCESSING CAPABLE OF APPROPRIATELY ADJUSTING INPUT AND OUTPUT PROPERTIES

CROSS-REFERENCE APPLICATIONS

The present application claims priority rights of and is based on subject matter described in Japanese patent applications respectively filed in the Japanese Patent Office as listed below, the entire contents of which are hereby incorporated by reference;

1. JPAP10-377489 filed on Dec. 28, 1998,
2. JPAP11-024346 filed on Feb. 1, 1999, and
3. JPAP11-024345 filed on Feb. 1, 1999.

BACKGROUND OF THE INVENTION

1. Field of the Invention

The present invention generally relates to a method, system and apparatus for image forming and processing, and more particularly relates to a method, system and apparatus for image forming and processing that is capable of adjusting input and output properties in an appropriate manner.

2. Discussion of the Background

In general, image forming systems such as digital copying machines, for example, having input and output stations as well as an image processing station have been provided in a variety of forms. For example, an input station which reads an original image and converts a read image into digital data can be separated as a form of a scanner, for example. Also, an output station which outputs on a recording sheet can be separated as a form of a printer, for example. An image processing station can also be a single apparatus such as a personal computer. These separated units can be put partly or totally in one apparatus or operatively be connected using a network such as a local area network, for example.

However, any one of these variations of the image forming system cannot be successful to neglect a basic rule in that a quality of an image is determined by the input and output properties inherent to the input and output stations, respectively. In particular, an image forming system built up in a network environment may provide users with a variety of combinations of personal computers, scanners, and printers. Using a different combination generally results in a different image quality, mostly bad quality.

Japanese Laid-Open Patent Publication No. 9-172543 (1997) describes an image forming system which adjusts property information in response to image forming processes and output modes and performs an image processing operation using the adjusted property information to obtain an output image in an optimal quality. In another image forming system, image data is separated into a plurality of image areas according to a type of an image area and each image area is handled with an image processing operation so as to obtain an output image in an optimal quality.

However, the above-mentioned systems merely correct for spatial frequency properties of a specific scanner and a specific printer. Therefore, the above-mentioned way is not sufficient to generate a precision image output when using a scanner and a printer randomly selected.

Also, input properties such as a resolution property, an MFT (modulation transfer function), and the like inherent to an image input apparatus are very important factors for the image area separation operation, and a simple uniform application of the image area separation operation relative to the whole range of these input properties may result rather in a bad image quality. For example, if an image area separation technique having algorithms optimized at a resolution of 400 dpi is used relative to image data having a different resolution, a result of the operation will mostly be inferior in comparison with the original image.

For example, an image with a degraded MTF shows, in particular, a smoothed edge at which a simple uniform application of a technique for finding an edge specific pixel cannot properly be operated. Commonly, in such a case, a pretreatment is executed, that is, an MTF correction filter is used to enhance the MTF. But, the MTF correction filter may also enhance electrical noises included in the image signal when the MTF is degraded to an extreme extent. This causes an event in which a character image area is erroneously mixed in a pattern image area or in which a pattern image area is erroneously mixed in a character image area. As a result, an output image will be inferior in comparison with the original image.

As described above, the image area separation operation relies largely on the resolution property and the MTF property of the scanner. Therefore, the image area separator operation adjusted to a specific resolution and a specific MTF cannot properly handle an image having a resolution and an MTF which are greatly different from the specific resolution and the specific MTF of the image area separation operation. For example, a high resolution scanner can generally increase a detection accuracy in an edge image detection for detecting an edge portion of an image or a screened-print image detection for detecting an image made with a screen, by increasing a size of a matrix used in a pattern matching test. But, if it is not possible to use a large size matrix due to any reason such as a limitation from a host apparatus, such a high resolution scanner cannot perform the image area separation operation at a preferred performance. This results in an inferior image in which a pattern image area may include several points wrongly judged as character image areas and a character image area may include several points wrongly judged as pattern image areas.

There would be at least two efficient ways to handle such an image, having an image at which it is difficult to properly perform the image area separation operation, so as to generate a superior output image. A first way is as follows. An object image is first determined whether it is a pattern image or a character image by examining the data of the object image and is then subjected to an image processing operation entirely under a pattern image mode or a character image mode in accordance with a result of the determination. In this case, the image area separation is not performed. A second way is to perform the image area separation only at an area where it is assured that the image area separation can properly be performed and to handle other areas under the pattern image mode or a character image mode.

Minimizing an application of the image area separation operation as described above will also provide a benefit in reduction of a process time to a software-implemented image area separation operation.

Furthermore, a recent trend in the computer industry shows the explosion in the use of a digital still camera and a digital video camera and, in such a time, input images are more pictures of landscapes and people by far than characters. Therefore, the image forming system which handles the input images entered through these cameras needs to perform the image processing operation more suitable to the picture image.

As for a filtering process, a filter enhancing a high frequency band will be selected for an image having an extremely low frequency property in a high frequency band so as to come close to a target property when an input property of an image input apparatus is randomly combined with an output property of an image output apparatus. In this case, an output image from an original image such as a picture or a painting may have an aliasing, a noise from an isolated point, or the like and be therefore inferior.

SUMMARY OF THE INVENTION

The present invention provides a novel image forming system which includes an image input apparatus, an image processing apparatus, and an image output apparatus. The image input apparatus has an input property profile, reads an image from an image source, and converts the image into image data using the input property profile. The image processing apparatus executes an image processing operation relative to the image data converted by the image input apparatus. The image output apparatus has an output property profile, outputs an image using the output property profile in accordance with the image data processed through the image processing operation which is executed by the image processing apparatus. The above-mentioned image processing apparatus includes a property recognizer, a memory, and a property calculator. The property recognizer reads and recognizes the input property profile of the image input apparatus and the output property profile of the image output apparatus. The memory prestores a reference property profile. The property calculator calculates an optimal property based on the input property profile, the output property profile, and the reference property profile so as to allow the image processing apparatus to optimally execute the image processing operation using the optimal property.

The above-mentioned image forming system may further include a reference selector which receives the input and output property profiles from the property recognizer. In this case, the memory prestores a plurality of reference property profiles. The above-mentioned reference selector selects one of the plurality of reference property profiles prestord in the memory based on the input and output property profiles sent from the property recognizer, and the property calculator calculates the optimal property based on the input and output property profile and the selected reference property profile.

In the above-mentioned image forming system, the image input apparatus may specify an input image mode and the image output apparatus may specify an output image mode. In this case, the image forming system further includes an image mode recognizer for reading and recognizing at least one of the input image mode specified by the image input apparatus and the output image mode specified by the image output apparatus. Further, the reference selector receives information of the at least one of the input and output image modes from the image mode recognizer and selects one of the plurality of reference property profiles prestored in the memory based on the information of the at least one of the input and output image modes sent from the image mode recognizer. Further, the property calculator calculates the optimal property based on the input and output property profile sent from the property recognizer and the reference property profile selected by the second reference selector.

The image mode recognizer may read and recognize the input property profile of the image input apparatus and the output property profile of the image output apparatus in addition to the at least one of the input image mode specified by the image input apparatus and the output image mode specified by the image output apparatus. In this case, the reference selector receives information of the input and output property profiles and the at least one of the input and output image mode sent from the image mode recognizer and selects one of the plurality of reference property profiles prestored in the memory based on the received information. Further, the property calculator calculates the optimal property based on the input and output property profile sent from the property recognizer and the reference property profile selected by the reference selector.

The above-mentioned image forming system may further include an image area separator for judging types of the image data converted by the image input apparatus and separating the image into image areas by the types according to a judged result, and an image area separation controller for controlling conditions, under which the image area separator judges and separates the image data, based on the input and output property profiles sent from the property recognizer. In this case, the image processing apparatus executes the image processing operation in accordance with the image areas separated by the image area separator.

In the above-mentioned image forming system, when the property recognizer recognizes an event that one of the resolution property and the MTF property is within the predetermined range, the image area separation controller may change a threshold value to be used for a pixel detection in one of the edge image and screened-print image detection operations based on values of the one of the resolution property and the MTF property.

The property recognizer may read an input spatial frequency property of the image input apparatus and an output spatial frequency property of the image output apparatus and recognize an input and output spatial frequency property information based on the input spatial frequency property of the image input apparatus and the output spatial frequency property of the image output apparatus. In this case, the memory prestores a reference spatial frequency property. Further, the property calculator calculates the optimal property based on the input and output spatial frequency property information and the reference spatial frequency property so as to allow the image processing apparatus to optimally execute the image processing operation using the optimal property.

Further, the present invention provides a novel method for image forming which includes the steps of reading, converting, executing, and outputting. The reading step reads an input image from an image source. The converting step converts the input image into image data. The executing step executes an image processing operation relative to the image data. The outputting step outputs an output image in accordance with the image data processed through the image processing operation. The novel method further includes the steps of prestoring, recognizing, and calculating. The prestoring step prestores a reference property profile. The recognizing step recognizes an input property profile including input properties with which the input image is converted during the converting step and an output property profile including output properties with which the output image is output during the outputting step. The calculating step calculates an optimal property based on the input property profile, the output property profile and the reference property profile so as to allow the executing step to optimally execute the image processing operation using the optimal property.

Further, the present invention provides a novel image processing apparatus which includes an input property profile manager, an output property manager, an image processing mechanism, a property recognizer, a memory, and a property calculator. The input property profile manager includes an input property profile for defining an input conversion property used when an input image is converted into input image data. The output property profile manager includes an output property profile for defining an output conversion property used when an output image data is converged into an output image. The image processing mechanism executes an image processing operation relative to the input image data converted with the input property profile. The property recognizer reads and recognizes the input property profile and the output property profile. The memory prestores a reference property profile. The property calculator calculates an optimal property based on the input property profile, the output property profile and the reference property profile so as to allow the image processing mechanism to optimally execute the image processing operation using the optimal property.

Further, the present invention provides a novel method for image forming which includes the steps of prestoring, providing, recognizing, calculating, and executing. The prestoring step prestores a reference property profile. The providing step provides an input property profile relative to an input property with which an image read from an original is converted into image data corresponding to the image and an output property profile relative to an output property to be used when the image data is converted to be output. The recognizing step recognizes the input property profile and the output property profile. The calculating step calculates an optimal property based on the input property profile, the output property profile and the reference property profile. The executing step executes an image processing operation relative to the image data using the optimal property.

Further, the present invention provides a novel computer readable medium storing computer instructions for performing the steps recited in anyone of the above-mentioned novel methods for image forming.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic block diagram of an exemplary shared image forming system according to a second embodiment of the present invention;

FIG. 4 is a schematic block diagram of an exemplary image forming system according to a third embodiment of the present invention;

FIG. 10 is a block diagram of an image processing mechanism of an image processing unit of the image forming system of FIG. 1;

FIGS. 13A–13B are tables for explaining determination of input and output image modes;

FIGS. 14A–14B are other tables for explaining determination of input and output image modes;

FIG. 21 is an illustration for explaining a 3-by-3 matrix including a focus pixel;

FIGS. 22A–22D are illustrations for explaining exemplary patterns to be used in an edge image detection;

FIG. 23 is a table for explaining exemplary judgement result of the edge image detection;

FIG. 60 is a schematic block diagram of an exemplary image forming system according to a fifteenth embodiment of the present invention.

DESCRIPTION OF THE PREFERRED EMBODIMENTS

Figure 1:
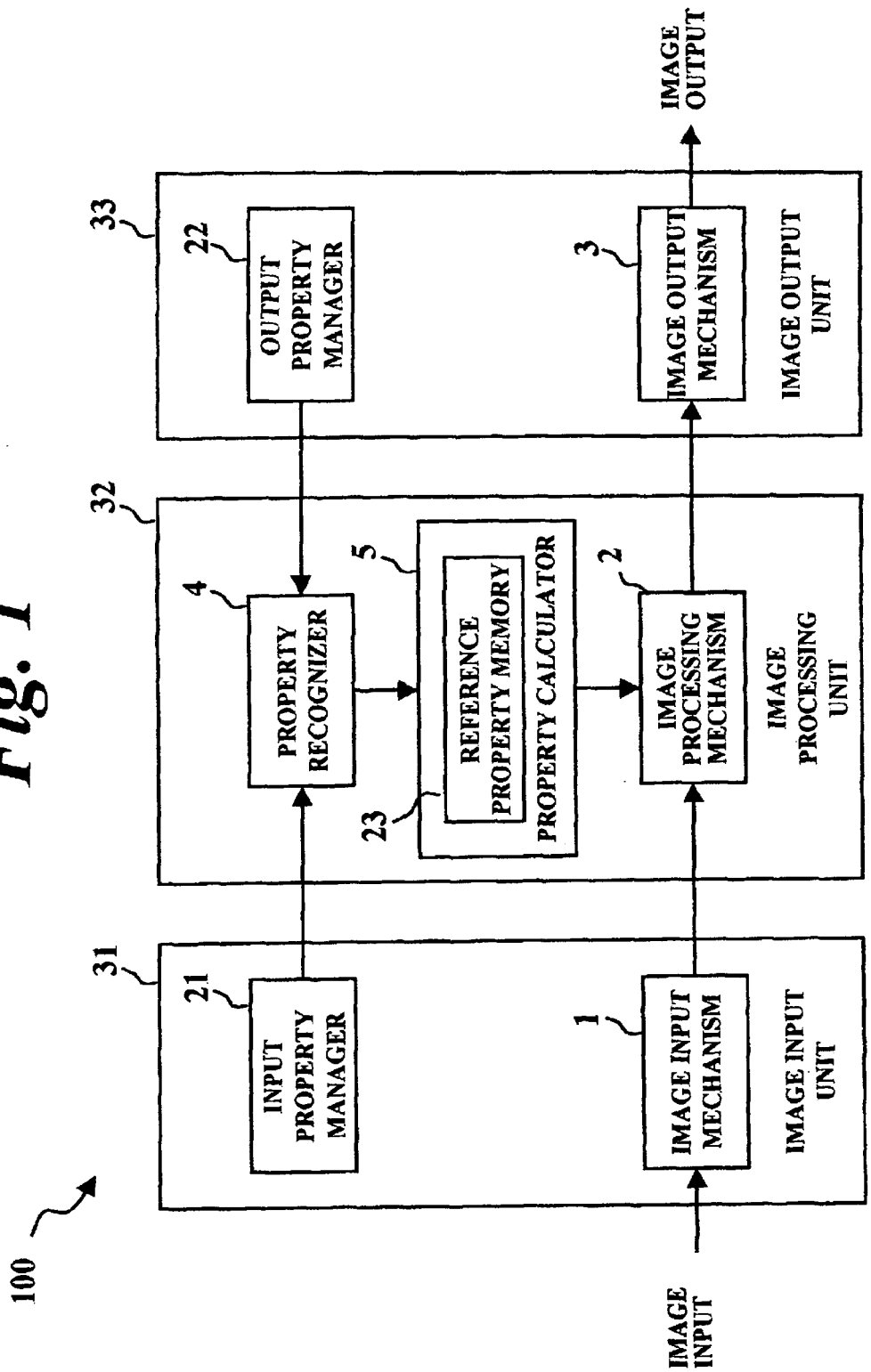
FIG. 1 is a schematic block diagram of an exemplary image forming system according to a first embodiment of the present invention.

In describing preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a schematic block diagram of an image forming apparatus 100 according to a first embodiment of the present invention.

The image forming apparatus 100 of FIG. 1 includes an image input unit 31 (i.e., a scanner), an image processing unit 32, and an image output unit 33 (i.e., a printer). The image input unit 31 includes an image input mechanism 1 and an input property manager 21. The image input mechanism 1 receives an input image (i.e., by scanning an image of an original sheet) and converts it into data corresponding to the received image. The input property manager 21 includes a memory (not shown) for storing information representing an input property profile (i.e., a scanner property) inherent to the image input unit 31 and sends the information to the image processing unit 32.

The image output unit 33 includes an image output mechanism 3 and an output property manager 22. The image output mechanism 3 outputs an image (i.e., by printing an image) in accordance with the data received from the image processing unit 32. The output property manager 22 includes a memory for storing information representing an output property profile (i.e., a printer property) inherent to the image output unit 33 and sends the information to the image processing unit 32.

The image processing unit 32 includes an image processing mechanism 2, a property recognizer 4, and a property calculator 5. The image processing mechanism 2 performs an image processing operation relative to the image data processed by the image processing mechanism 1 of the image input unit 31. The property recognizer 4 receives signals from the input property manager 21 of the image input unit 31 and the output property manager 22 of the image output unit 33, recognizes types and values of the input and output property profiles, and sends signals representing these types and values to the property calculator 5. The property calculator 5 receives the signals sent from the property recognizer 4, and calculates an optimal property profile with which the image processing mechanism 2 is allowed to optimally process the image.

The above-mentioned property calculator 5 includes a reference property memory 23 for storing information of a reference property profile regarded as a target property profile for the operations covering from the input operation through to the output operation, which are performed by the image input mechanism 1 and the image output mechanism 3, respectively. Accordingly, the calculation of the property calculator 5 is based on the information of types and values of the input and output property profiles sent from the property recognizer 4 and the reference property information stored in the reference property memory 23. The property calculator 5 sends a signal representing a calculation result as an optimal property profile to the image processing mechanism 2. Thus, the image processing mechanism 2 can obtain an optimal property profile and optimally process the image using the optimal property profile.

The above-mentioned reference property memory 23 may not necessarily be provided within the property calculator 5 and can be deposited at anywhere in the image processing unit 32 or even outside the image processing unit 32.

In addition, the reference property memory 23 stores one reference property profile which actually includes a plurality of reference properties covering various kinds of property information such as gamma characteristic information, space frequency response information, chromatic information, scanner RGB (red/green/blue) dot displacement information, resolution information, and so forth. Details of these various kinds of property information will be explained later.

Figure 2:
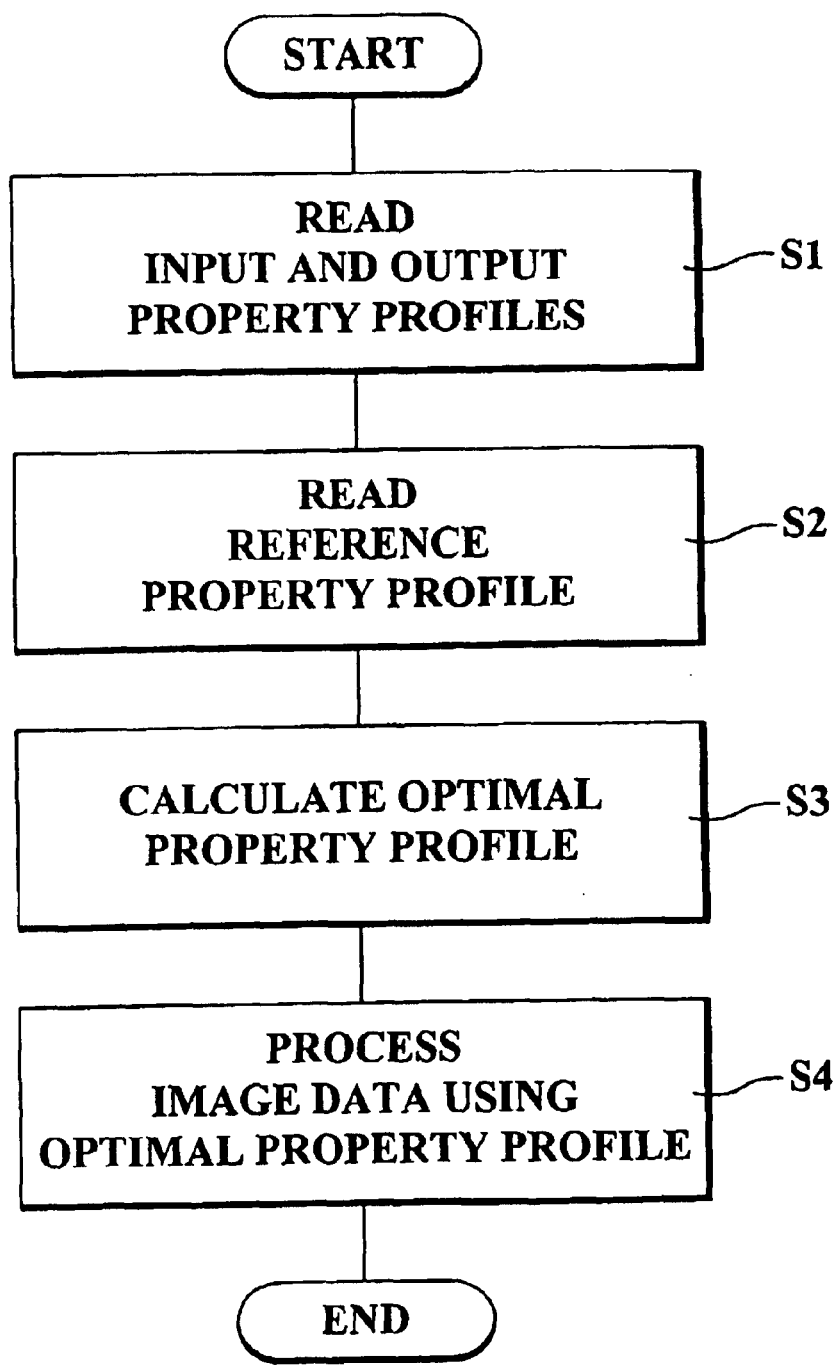
FIG. 2 is a flowchart for explaining an exemplary image forming operation of the image forming system of FIG. 1.

FIG. 2 shows an exemplary image processing operation of the above-described image forming apparatus 100. When the image forming apparatus 100 starts an image processing operation, the property recognizer 4 of the image processing unit 32 reads and recognizes an input property profile (i.e., a scanner profile) of the input property manager 21 and an output property profile (i.e., a printer profile) of the output property manager 22, in Step S1. Then, the property calculator 5 reads the recognizes reference property information prestored in the reference property memory 23, in Step S2. Then, the property calculator 5 calculates an optimal property profile based on the input and output property profiles and the reference property profile, in Step S3. After that, in Step S4, the image processing mechanism 2 processes the image using the information of the optimal property profile calculated in Step S3. Then, the process ends.

In the calculation, the property calculator 5 uses an equation A=B−(C+D), wherein A, B, C, and D represent an optimal property profile, a reference property profile, an input property profile, and an output property profile, respectively. In a case if any one of the property profiles has information less suitable for calculation, the property calculator 5 converts information of the property profile to information representing a value of a characteristic. That is, the property calculator 5 obtains a reference characteristic from the reference property profile, an input characteristic from the input property profile, and an output characteristic from the output property profile. In this case, the property calculator 5 uses an equation a=b−(c+d), wherein a, b, c, and d represent an optimal characteristic, the reference characteristic, the input characteristic, and the output characteristic. After the calculation, the property calculator 5 temporarily stores the optimal characteristic d and converts it back to an original data form as an optimal property profile D so as to be sent to the image processing mechanism 2.

The above-described configuration of the image forming apparatus 100 may be broken down into separate units and implemented into a network system as an image forming system as a whole. In such a network system, a plurality of client computers can share the image forming system. An exemplary image forming system 200 according to a second embodiment of the present invention is now explained with reference to FIG. 3. The image forming system 200 shown in FIG. 3 is connected to a network 240 and includes, for example, at least one of a plurality of scanners including scanners 242 and 243, at least one plurality of printers including printers (i.e., laser printers) 246 and 247, and at lease one of client computers including a computer 244 (i.e., a laptop computer) and a computer 245 (i.e., a desktop computer), which are all operatively connected to the network 240. The network 240 includes various peripherals such as a milti-function type copying machine 241, a modem 248, and so on, for example. The modem 247 is operatively connected to a facsimile machine 249. With this system 200, each computer connected to the network 240 can share data base (not shown), the computer peripherals, and the image forming system 200 with others.

The computer 245 (when it is a part of the image forming system 200) includes a property calculating program 205 (equivalent to the property calculator 5 of FIG. 1) and an image processing program 202 (equivalent to the image processing mechanism 2 of FIG. 1). Each of the scanners 242 and 243 includes an image input mechanism 1, and an input property manager 21. Each of the printers 246 and 247 includes an image output mechanism 3 and an output property manager 22. These components function in such a manner similar to those of the image input unit 31, the image processing unit 32, and the image output unit 33 of the image forming apparatus 100 and, therefore, detailed descriptions for the functions of these components are not repeated and are omitted.

In addition, each of the multi-functional type copying machine 241 and the facsimile machine 249, having scanning and printing functions, may include the image input mechanism 1, the input property manager 21, the image output mechanism 3, and the output property manager 22.

With the above-mentioned configuration, the image forming system 200 performs an image forming operation. In the image forming operation, the scanner 242 reads an image which is then sent to the computer 245 in which the image data is manipulated and is then transferred to the printer 247 to be recorded on a recording sheet. During this operation, the computer 245 receives the image data and the input property profile from the scanner 242 and the output property profile from the printer 247. Further, the computer 245 calculates an optimal property profile based on the input property profile and the output property profile, manipulates the image data using the calculated input and output property profiles, and sends the image data after the manipulating operation to the printer 247 which then records the image on a recording sheet. In this way, the computer 245 can handle the image with the appropriate input and output property profiles according to the image input and output devices such as the scanner 243 or 244 and the printer 246 or 247, even if the property profiles are different between the scanners 243 and 244 and the printers 246 and 247. Therefore, the image forming system 200 can output an image in a relatively high quality.

Referring to FIG. 4, an image forming apparatus 300 according to a third embodiment of the present invention will be explained. The image forming apparatus 300 of FIG. 4 has a configuration similar to the image forming apparatus 100 of FIG. 1, except for an image processing unit 332. The basic data flows from the image input unit 31 to the image processing unit 332 and from the image processing unit 332 to the image output unit 33 are also similar to those of the image forming apparatus 100. Accordingly, a description provided below mostly concentrates on the structure and the operations of the image processing unit 332.

The image processing unit 332 of the image forming apparatus 300 shown in FIG. 4 is similar to the image processing unit 32 of the image forming apparatus 100 of FIG. 1, except for a first reference selector 306 and a property calculator 305. The property calculator 305 includes a plural reference property memory 323 which stores a plurality of reference property profiles, while the reference property memory 23 of the property calculator 5 of FIG. 1 stores only one reference property profile. The first reference selector 306 receives the property information including the input property profile of the image input unit 31 and the output property profile of the image output unit 33 from the property recognizer 4 and, based on the received information, generates a signal for selecting one reference property profile from among the plurality of reference property profiles. With this operation, a factor such as a gamma having a characteristic changeable with time, for example, can be taken into consideration.

In the thus-configured image forming apparatus 300, the property recognizer 4 receives signals from the input property manager 21 of the image input unit 31 and the output property manager 22 of the image output unit 33, recognizes types and values of the input and output property profiles, and sends signals representing these types and values to the first reference selector 306 and the property calculator 305. Based on these received signals, the first reference selector 306 generates a signal to send to the plural reference property memory 323 of the property calculator 305 to select one reference property profile from among the plurality of reference property profiles. Based on the thus-selected reference property profile and the information from the property recognizer 4, the property calculator 305 calculates an optimal property profile which allows the image processing mechanism 2 to optimally process the image. After that, the image processing mechanism 2 sends the image data to the image output mechanism 3 which then outputs an image on a recording sheet in accordance with the received image data.

Figure 5:
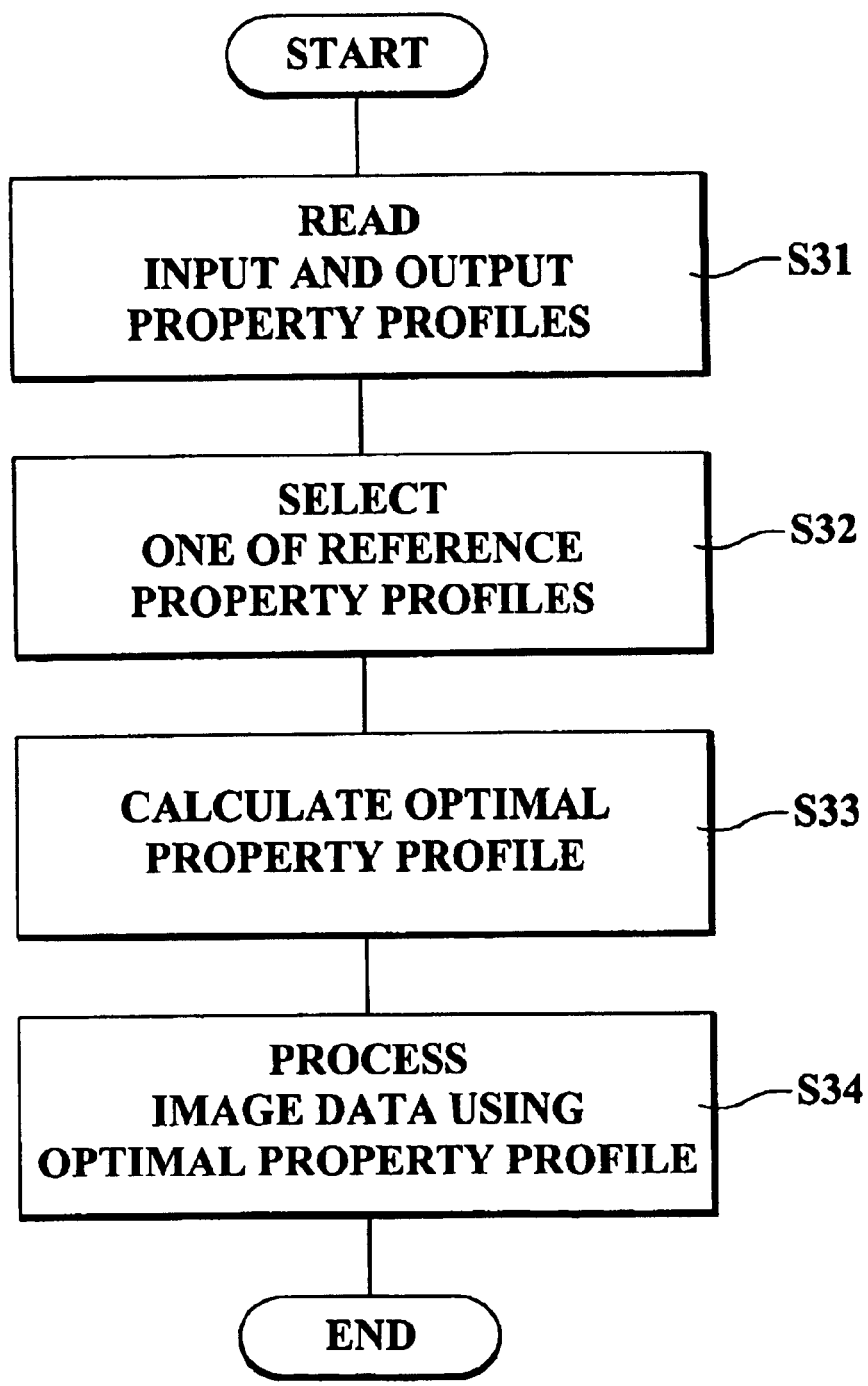
FIG. 5 is a flowchart for explaining an exemplary image forming operation of the image forming system of FIG. 4.

FIG. 5 shows an exemplary image processing operation of the above-described image forming apparatus 300. When the image forming apparatus 300 starts an image processing operation, the property recognizer 4 of the image processing unit 332 reads and recognizes an input property profile (i.e., a scanner profile) of the input property manager 21 and an output property profile (i.e., a printer profile) of the output property manager 22, in Step S31. Then, the first reference selector 306 selects one of the plurality of the reference property profiles stored in the reference property memory 323 so that the property calculator 305 reads and recognizes one reference property profile selected based on the property information of the above input and output property profiles, in Step S32. Then, the property calculator 305 calculates an optimal property profile based on the input and output property profiles and the selected reference property profile, in Step S33. After that, in Step S34, the image processing mechanism 2 processes the image using the optimal property profile calculated in Step S33. Then, the process ends.

Figure 6:
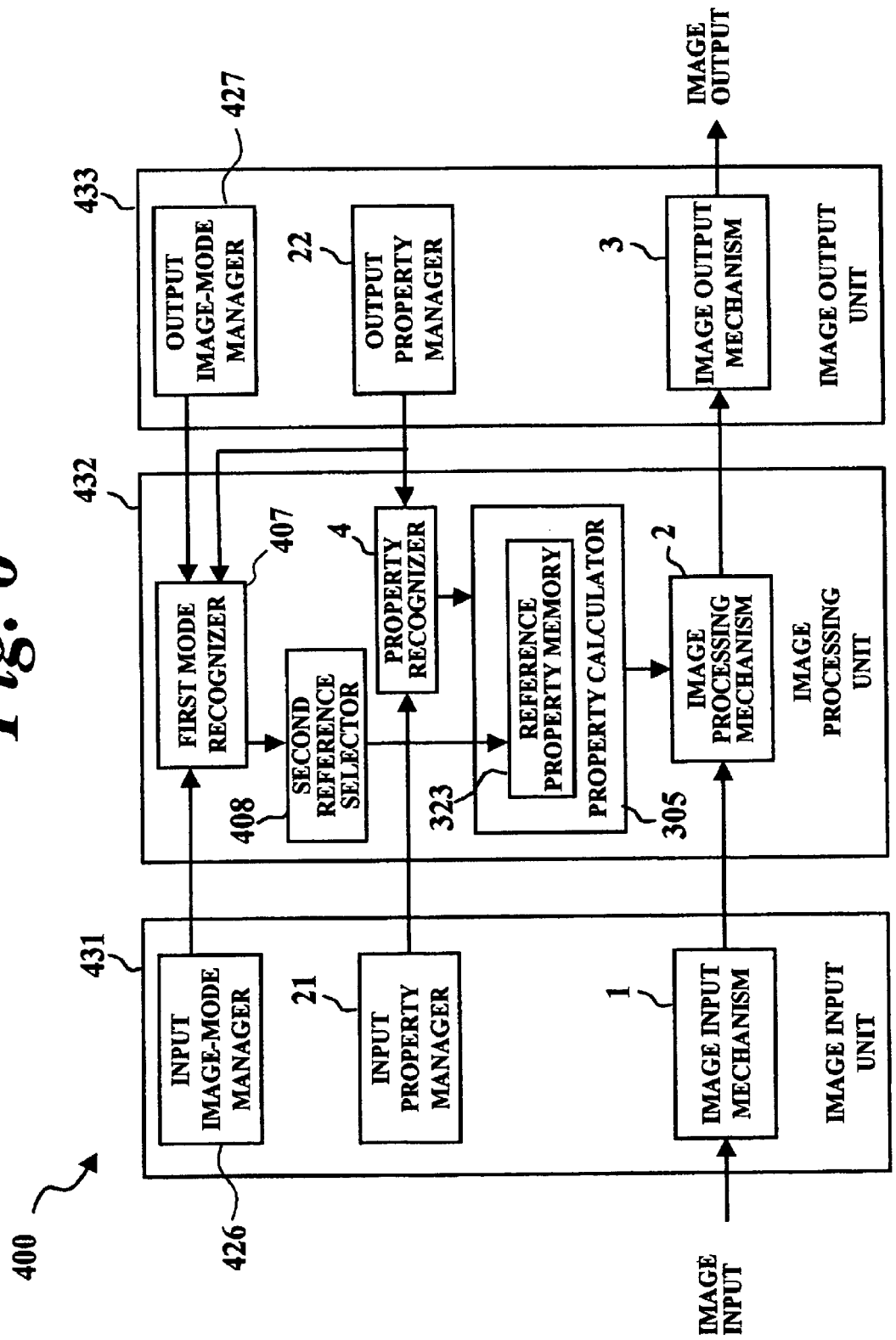
FIG. 6 is a schematic block diagram of an exemplary image forming system according to a four embodiment of the present invention.

Referring to FIG. 6, an image forming apparatus 400 according to a fourth embodiment of the present invention will be explained. The image forming apparatus 400 of FIG. 6 includes an image input unit 431, an image processing unit 432, and an image output unit 433, each of which has a configuration similar to that of the image forming apparatus 300 of FIG. 4, except for the following additional components. That is, the image input unit 431 adds an input image-mode manager 426 for storing a specified input image-mode and notifying of the specified input image-mode to the image processing unit 432. Further, the image processing unit 432 adds a first mode recognizer 407 and a second reference 408, but excludes the first reference selector 306. Further, the image output unit 433 adds an output mode manager 427 for storing a specified output image mode and notifying of the specified output image-mode to the image processing unit 432.

In the image forming apparatus 400, the basic data flows from the image input unit 431 to the image processing unit 432 and from the image processing unit 432 to the image output unit 433 and also the function of the property calculator 305 are similar to those of the image forming apparatus 300.

In the thus-configured image forming apparatus 400, the first mode recognizer 407 of the image processing unit 432 receives at least one of a specified unit image-mode signal from the input image-mode manager 426 of the image input unit 431 and a specified output image-mode signal from the output image-mode manager 427 of the image output unit 433. The first mode recognizer 407 then recognizes the specified input image-mode and the specified output image-mode, and sends signals representing these specified image modes to the second reference selector 408. Based on these received signals, the second reference selector 408 generates a signal to send to the plural reference property memory 323 of the property calculator 305 to select one reference property profile from among the plurality of reference property profiles.

Based on the thus-selected reference property profile and the information from the property recognizer 4, the property calculator 305 calculates an optimal property profile which allows the image processing mechanism 2 to optimally process the image. After that, the image processing mechanism 2 sends the image data to the image output mechanism 3 which then outputs an image on a recording sheet in accordance with the received image data.

Figure 7:
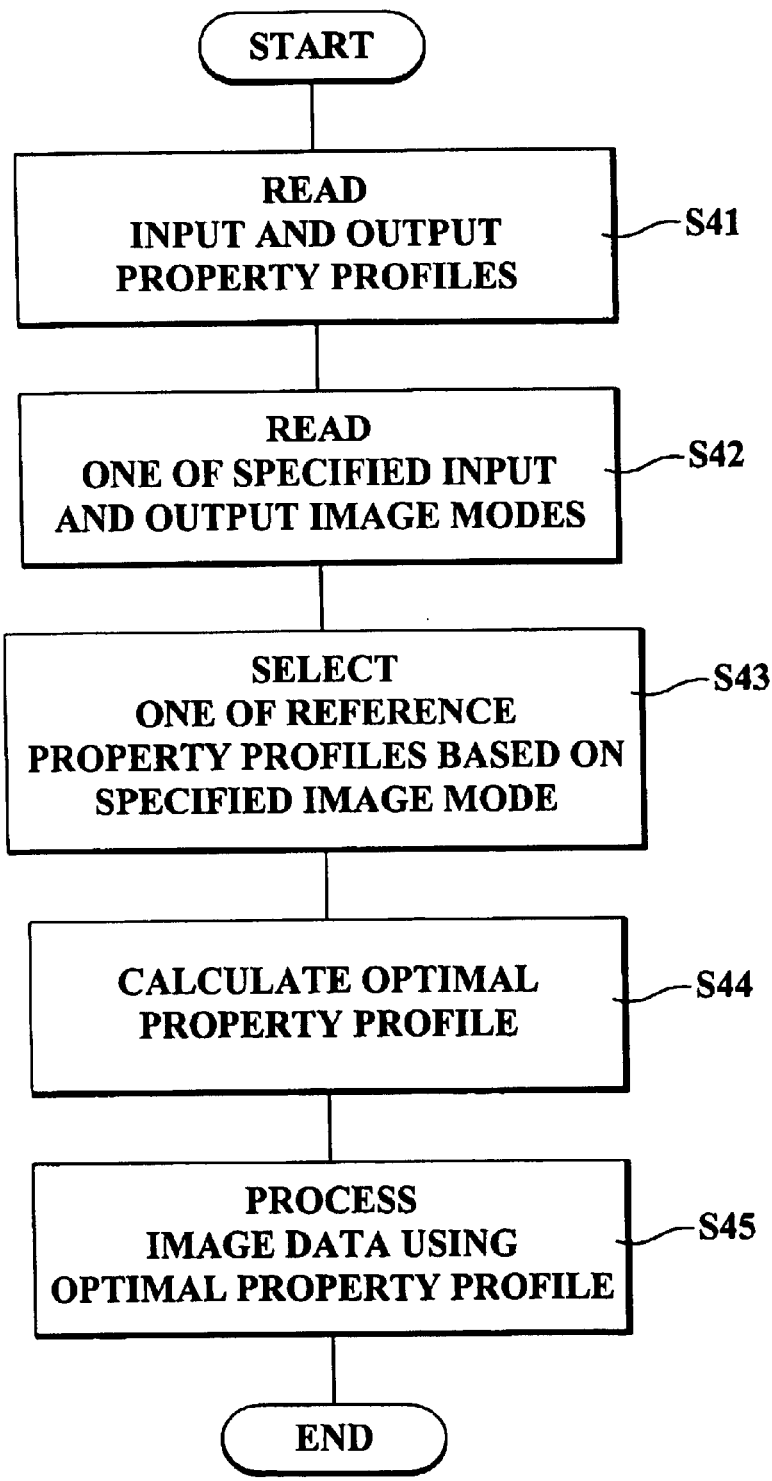
FIG. 7 is a flowchart for explaining an exemplary image forming operation of the image forming system of FIG. 6.

FIG. 7 shows an exemplary image processing operation of the above-described image forming apparatus 400. When the image forming apparatus 400 starts an image processing operation, the property recognizer 4 of the image processing unit 432 reads and recognizes an input property profile (i.e., a scanner profile) of the input property profile manager 21 and an output property profile (i.e., a printer profile) of the output property profile manager 22, in Step S41. Then, the first mode recognizer 407 reads and recognizes at least one of a specified input image mode from the input image-mode manager 426 and a specified output image mode from the output image-mode manager 427 and sends a signal representing an image mode information to the second reference selector 408, in Step S42. Then, the second reference selector 408 selects one of the plurality of the reference property profiles stored in the reference property memory 323 so that the property calculator 305 reads and recognizes a reference property profile selected based on the specified image mode information, in Step S43. Then, the property calculator 305 calculates an optimal property profile based on the input and output property profiles and the selected reference property profile, in Step S44. After that, in Step S45, the image processing mechanism 2 processes the image using the optimal property profile calculated in Step S44. Then, the process ends.

Figure 8:
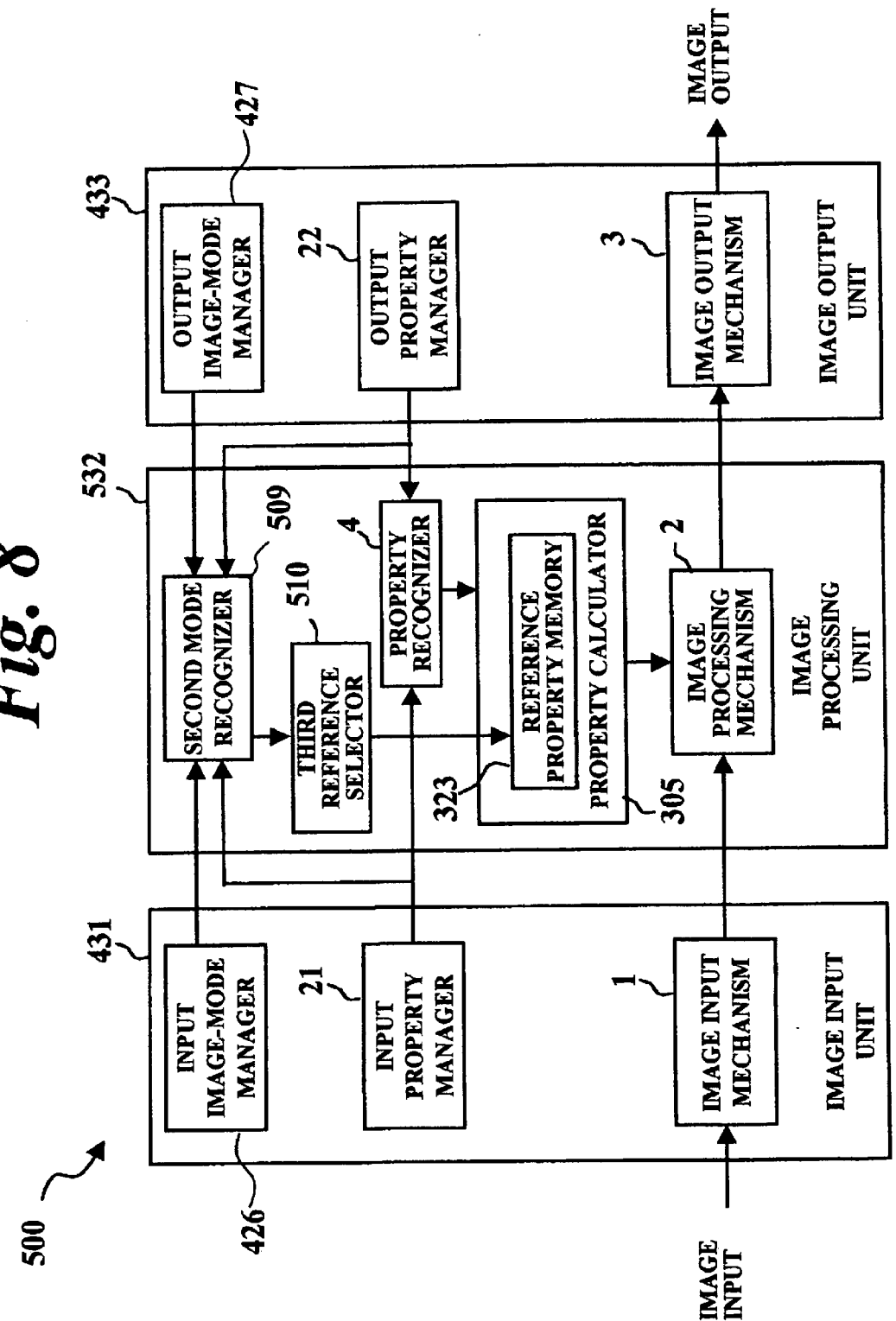
FIG. 8 is a schematic block diagram of an exemplary image forming system according to a fifth embodiment of the present invention.

Referring to FIG. 8, an image forming apparatus 500 according to a fifth embodiment of the present invention will be explained. The image forming apparatus 500 of FIG. 8 has a configuration similar to that of the image forming apparatus 400 of FIG. 6, except for an image processing unit 532. That is, each of the image input and output units remain similar, and the image processing unit 532 includes a second mode recognizer 509, instead of the first mode recognizer 407, and a third reference selector 510, instead of the second reference selector 408. Further, the second mode recognizer 509 receives signals from the input property manager 21 and the output property manager 22 as well as from the input image-mode manager 426 and the output image-mode manager 427.

In the image forming apparatus 500, the basic data flows from the image input unit 431 to the property recognizer 4 of the image processing unit 532 and from property recognizer 4 of the image processing unit 532 to the image output unit 433 are similar to those of the image forming apparatus 400. Also, the function of the property calculator 305 is similar to that of the image forming apparatus 400.

In the thus-configured image forming apparatus 500, the second mode recognizer 509 of the image processing unit 532 receives at least one of a specified input image-mode signal from the input image-mode manager 426 of the image input unit 431 and a specified output image-mode signal from the output image-mode manager 427 of the image output unit 433. In addition, the second mode recognizer 509 receives the signals from the input property manager 21 of the image input unit 431 and the output property manager 22 of the image output unit 433. The second mode recognizer 509 then recognizes the specified input and output image modes and the input and output property profiles, and sends signals representing these specified modes and property profiles to the third reference selector 510. Based on these received signals, the third reference selector 510 generates a signal to send to the plural reference property memory 323 of the property calculator 305 to select one reference property profile from among the plurality of reference property profiles.

Based on the thus-selected reference property profile and the information from the property recognizer 4, the property calculator 305 calculates an optimal property profile which allows the image processing mechanism 2 to optimally process the image. After that, the image processing mechanism 2 sends the image data to the image output mechanism 3 which then outputs an image on a recording sheet in accordance with the received image data.

Figure 9:
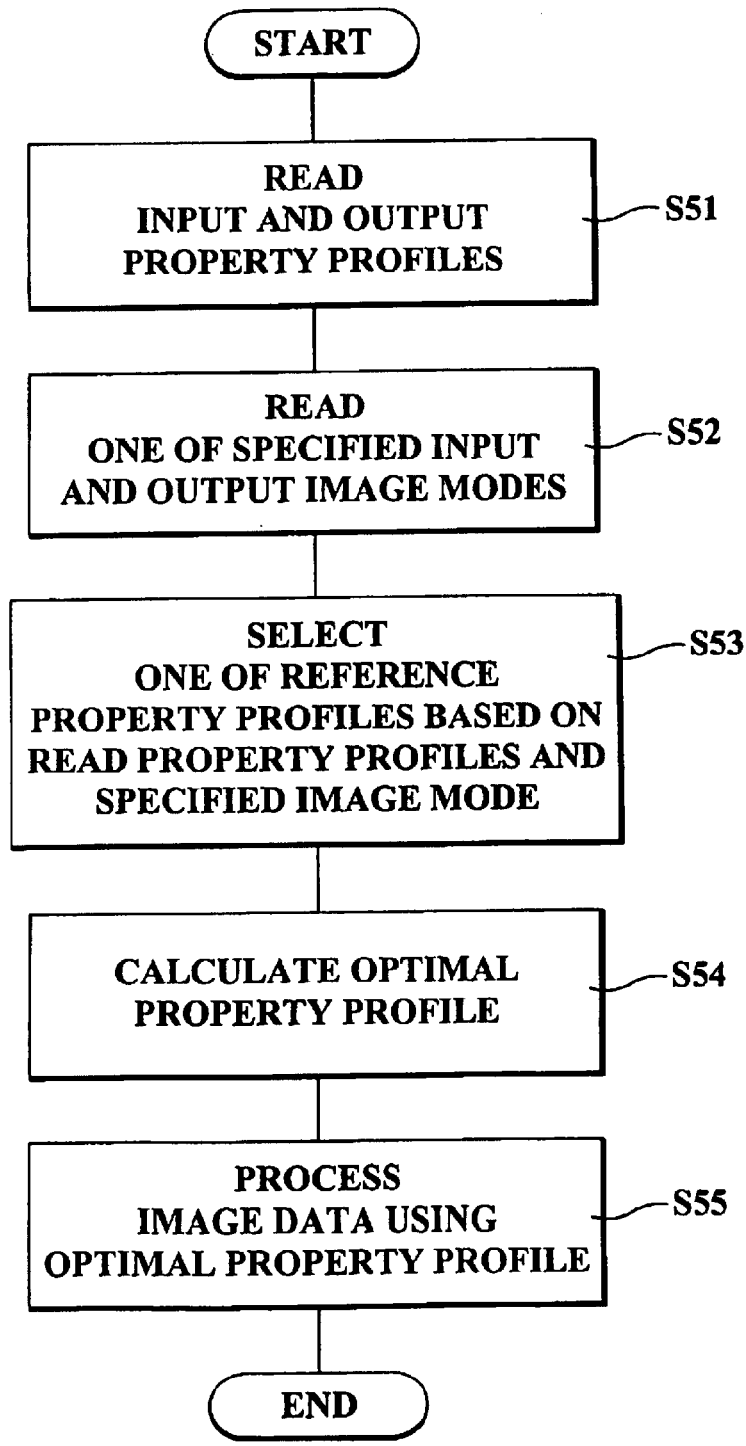
FIG. 9 is a flowchart for explaining an exemplary image forming operation of the image forming system of FIG. 8.

FIG. 9 shows an exemplary image processing operation of the above-described image forming apparatus 500. When the image forming apparatus 500 starts an image processing operation, the property recognizer 4 of the image processing unit 532 reads and recognizes an input property profile (i.e., a scanner profile) of the input property manager 21 and an output property profile (i.e., a printer profile) of the output property manager 22, in Step S51. Then, the second mode recognizer 509 reads and recognizes at least one of a specified input image mode from the input image-mode manager 426 and a specified output image mode from the output image-mode manager 427 and, also, the input property profile (i.e., a scanner profile) of the input property manager 21 and the output property profile (i.e., a printer profile) of the output property manager 22, and sends a signal representing the property and image-mode information, in Step S52. Then, the third reference selector 510 selects one of the plurality of the reference property profiles stored in the plural reference property memory 323 so that the property calculator 305 reads and recognizes a reference property profile selected based on the above property and image-mode information, in Step S53. Then, the property calculator 305 calculates an optimal property profile based on the input and output property profiles and the selected reference property profile, in Step S54. After that, in Step S55, the image processing mechanism 2 processes the image using the optimal property profile calculated in Step S54. Then, the process ends.

Reference to FIG. 10, a detailed description of the image processing mechanism 2 used in the above image forming apparatus 100 is provided below. The image processing mechanism 2 includes a filter 11, a density converter 12, a gamma converter 13, a color converter 14, a gray-scale processor 15, and an image area separator 16. As described above, the image data is sent from the image input mechanism 1 of the image input unit 31 to the image processing mechanism 2 of the image processing unit 32. In the image processing mechanism 2, the image data is input to the filter 11 and the image area separator 16. The image area separator 16 analyzes input image data of a page to judge the property of the image data. Based on the judgment, the image area separator 16 separates the page image into edge image areas and pattern image areas, where the edge image areas include edges of character images, line images, and the like and the pattern image areas includes a gray-scale image such as a print image printed with screens, a photo image, and the like. Depending upon the image property of each image area, the following operation of the filter 11, the gamma converter 12, the color converter 13, and the gray-scale processor 15 are altered, which will be explained later.

The filter 11 provides spatial frequencies to the image data by correcting for a MTF (modulation transfer function) which may be degraded through the scanning operation by the image input unit 31, and reducing with a filter a moire phenomenon appearing on a print image printed with screens. The density converter 12 converts an image resolution when an input image resolution and an output image resolution has a difference, an input image is required to be enlarged or reduced, or the like, for example. The gamma converter 13 provides a desired gray-scale property to the image data. The color converter 14 changes a color system from an RGB system which is typically used by an image input device such as a scanner to a CMYK system which is typically used by an image output device such as a printer. The gray-scale processor 15 provides a gray-scale property to the image data using an organized dithering operation, an error diffusion operation, or the like.

The image data undergoes the various operations performed by the above components and is transferred from the image processing mechanism 2 to the image output mechanism 3 of the image output unit 33 which will reproduce an image in accordance with the thus-transferred image data.

The above description of the image processing mechanism 2 of the image forming apparatus 100 can be applied also to those of the image forming apparatuses 300–500 and to the image processing programs 202 of the computers 244 and 245 of the image forming system 200.

Figure 11A:
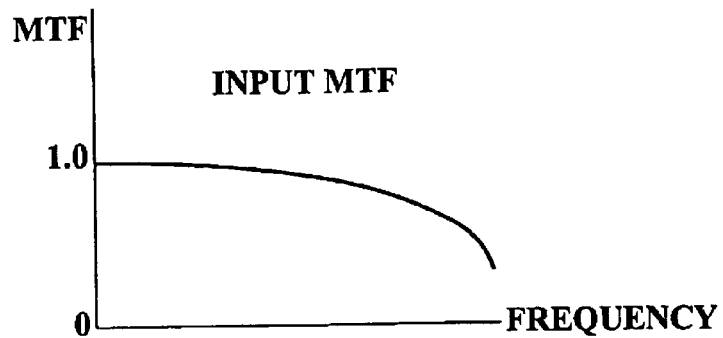
FIGS. 11A–11C are graphs for explaining properties of an MTF.
Figure 11B:
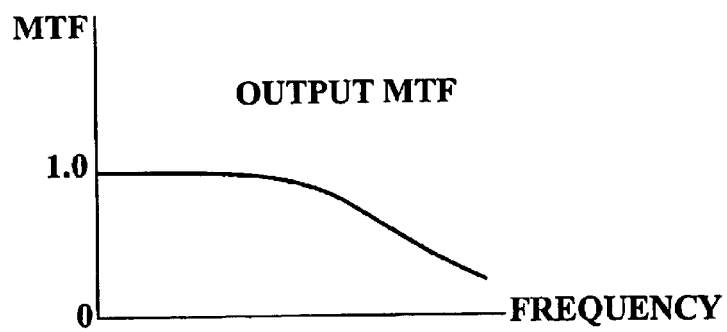

Referring to FIGS. 11A–11C and 12A–12C, a detailed description of the property calculator 5 used in the image forming apparatus 100 is provided below. FIG. 11A shows an exemplary input MTF line of a scanner which is a typical example of the image input unit 31, and FIG. 11B shows an exemplary output MTF line of a printer which is a typical example of the image output unit 33. These input and output MTF lines are recognized by the property recognizer 4 of the image processing unit 32 as an input property profile and an output property profile, respectively.

For example, when an scanner having the input MTF line of FIG. 11A reads an original image and a printer having the output MTF line of FIG. 11B prints an image in accordance with the image read by the scanner, a resultant output MTF is obtained by multiplying the output MTF by the input MTF. Accordingly, the resultant output MTF has a frequency property degraded by a relatively great extent as compared with the original image.

Figure 11C:
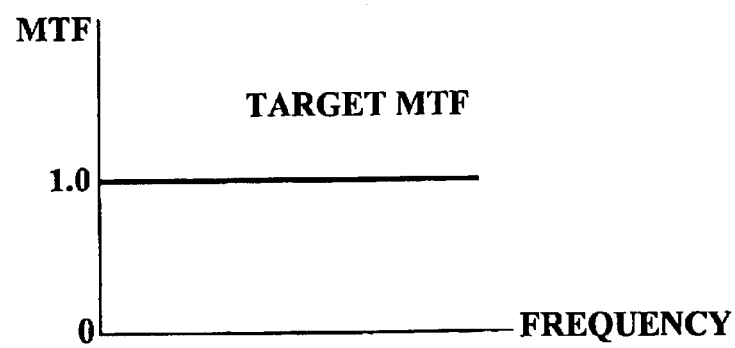

To avoid the above MTF degradation, the image processing unit 32 is provided in the reference property memory 23 with a predetermined target MTF representing a line as shown in FIG. 11C. As described, the input property manager 21 stores the input MTF of FIG. 11A and the output property manager 22 stores the output MTF of FIG. 11B. The property calculator 5 calculates a filter coefficient needed to produce an MTF close to the predetermined target MTF based on the data of the input and output MTFs stored in the input and output property managers 21 and 22, respectively. The filter 11 of the image processing mechanism 2 filters the image data using this calculated MTF which causes an effect such that the whole processing property from the entry of an original image into the image input unit 31 through to the output of an output image from the image output unit 33 is processed using the MTF close to the predetermined target MTF.

The above description of the MTF property optimization performed by the property calculator 5 and the image processing mechanism 2 of the image forming apparatus 100 can be applied also to those of the image forming apparatuses 300–500 as well as to the property calculation programs 205 and the image processing programs 202 of the computers 244 and 245 of the image forming system 200.

Figure 12A:
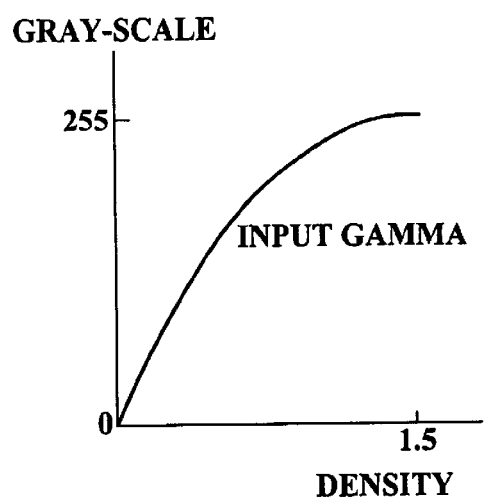
FIGS. 12A–12D are graphs for explaining properties of a gamma.
Figure 12B:
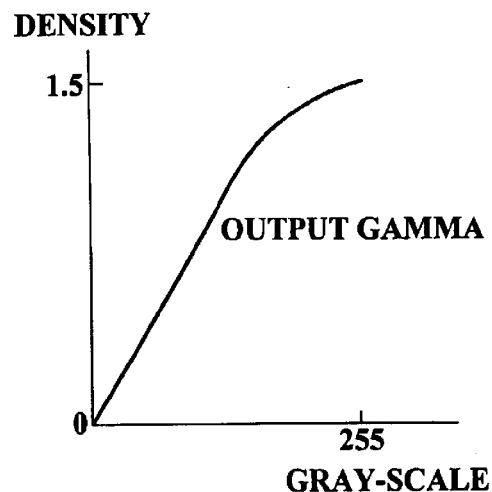
Figure 12C:
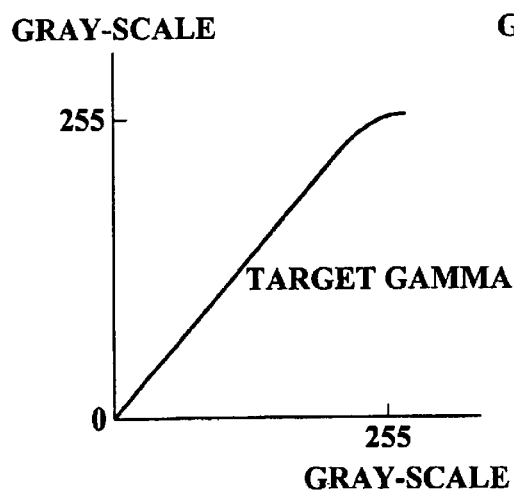
Figure 12D:
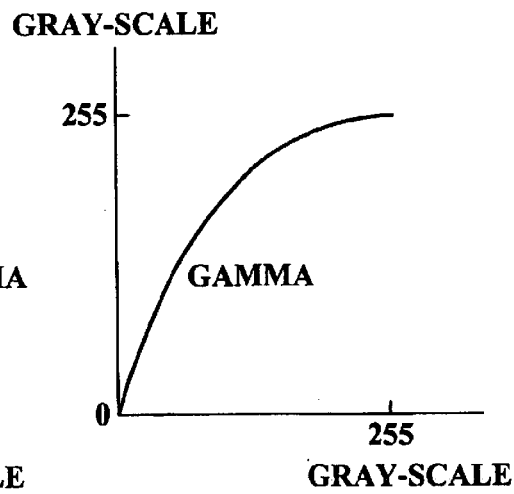

Referring to FIGS. 12A–12D, an optimization of a gamma line is explained. FIG. 12A shows a graph of an input gamma stored in the input property manager 21, with a horizontal axis representing a density at which an original image is read and a vertical axis representing an output gray-scale level from the image input unit 31. FIG. 12B shows a graph of an output gamma stored in the output property manager 22, representing a relationship between a gray-scale level input into the image input unit 33 and an output print density. FIG. 12C shows a graph of a predetermined target gamma line through a whole image processing operation from the entry of an original image into the image input unit 31 to an output of an output image from the image output unit 33, representing a relationship between an input gray-scale level and an output gray-scale level. Such a gamma line is prestored in the reference property memory 23 so that the property calculator 5 calculates an optimal gamma having an exemplary shape as shown in FIG. 12D based on the input gamma of FIG. 12A, the output gamma of FIG. 12B, and the predetermined target gamma of FIG. 12C. The gamma converter 13 converts the gamma using the optimal gamma thus calculated by the property calculator 5.

The above description of the gamma property optimization performed by the property calculator 5 and the image processing mechanism 2 of the image forming apparatus 100 can be applied also to those of the image forming apparatuses 300–500 as well as to the property calculation programs 205 and the image processing programs 202 of the computers 244 and 245 of the image forming system 200.

FIGS. 13A and 13B are exemplary tables provided to the image forming apparatus 400 of FIG. 6 for use in an operation for selecting a reference property profile. In image forming apparatus 400, the first mode recognizer 407 recognizes an input image mode from the input image-mode manager 426 and an output image mode from the output image-mode manager 427, and sends the recognized modes to the second reference selector 408. Based on the image modes sent from the first mode recognizer 407, the second reference selector 408 sends a signal to the property calculator 305 to select one appropriate reference property profile from among the plurality of the reference property profiles prestored in the plural reference property memory 323 of the property calculator 305. With this arrangement, the property calculator 305 can perform the calculation using an appropriate reference property profile without a problem of determining which property profile to use even in a case in which the input image mode and the output image mode do not match with each other. For example, it happens when the image input unit 31 and the image output unit 33 specify image modes different with each other or when either one of the image input unit 31 and the image output unit 33 specifies no image mode.

More specifically, in a case of using the table of FIG. 13A, an appropriate reference property profile will be selected based on a predetermined (default) image mode when none of the input and output image modes is specified or when the first mode recognizer 407 recognizes no input or output image mode. Also, an appropriate reference property profile will be selected based on a specified image mode when only one of the input and output image modes is specified. Also, an appropriate reference property profile will be selected based on the output image mode when the input image mode and the output image mode are specified but have a conflict with each other. In this way, the image processing unit 2 can perform an image processing operation giving a priority to the output image mode.

In a case of using the table of FIG. 13B, an appropriate reference property profile will be selected based on a predetermined (default) image mode when none of the input and output image modes is specified or when the first mode recognizer 407 recognizes no input or output image mode. Also, an appropriate reference property profile will be selected based on a specified image mode when only one of the input and output image modes is specified. Also, an appropriate reference property profile will be selected based on the input image mode when the input image mode and the output image mode are specified but have a conflict with each other. In this way, the image processing unit 2 can perform an image processing operation giving a priority to the input image mode.

FIGS. 14A and 14B are exemplary tables provided to the image forming apparatus 500 of FIG. 8 for use in an operation for selecting a reference property profile. In image forming apparatus 500, the second mode recognizer 509 recognizes at least one of an input image mode from the input image-mode manager 426 and an output image mode from the output image-mode manager 427 and at least one of resolutions of the image input unit 431 and the image output unit 433. The second mode recognizer 509 then sends the recognized information to the third reference selector 510. Based on the information sent from the second mode recognizer 509, the third reference selector 510 sends a signal to the property calculator 305 to select one appropriate reference property profile from among the plurality of the reference property profiles prestored in the plural reference property memory 323 of the property calculator 305. With this arrangement, the property calculator 305 can perform the calculation using the selected appropriate reference property profile without a problem of determining which property profile to use even in a case in which the input side information and the output side information do not match with each other. For example, it happens when the image input unit 31 and the image output unit 33 specify image modes or resolutions which fall different with each other.

More specifically, in a case of using the table of FIG. 14A, an appropriate reference property profile will be selected based on a predetermined (default) image mode, regardless of values of the input and output resolutions, when none of the input and output image modes is specified or when the first mode recognizer 407 recognizes no input or output image mode. Also, an appropriate reference property profile will be selected based on a specified image mode, regardless of values of the input and output resolutions, when only one of the input and output image modes is specified. Also, an appropriate reference property profile will be selected based on the input image mode when a value of the input resolution of the image input unit 431 is equal to or smaller than that of the image output unit 433. Also, an appropriate reference property profile will be selected based on the output image mode when a value of the input resolution of the image input unit 431 is greater than that of the image output unit 433.

In a case of using the table of FIG. 14B, an appropriate reference property profile will be selected based on a predetermined (default) image mode, regardless of values of the input and output resolutions, when none of the input and output image modes is specified or when the first mode recognizer 407 recognizes no input or output image mode. Also, an appropriate reference property profile will be selected based on a specified image mode, regardless of values of the input and output resolutions, when only one of the input and output image modes is specified. Also, an appropriate reference property profile will be selected based on the input image mode when a value of the input resolution of the image input unit 431 is equal to or greater than that of the image output unit 433. Also, an appropriate reference property profile will be selected based on the output image mode when a value of the input resolution of the image input unit 431 is smaller than that of the image output unit 433.

In the image forming apparatuses and system according to the present invention, the respective input and output property managers handle the plurality of the input and output property information which includes color properties inherent to the image input and output units, as described earlier. More specifically, the property recognizer (i.e., the property recognizer 4) recognizes whether the image input unit (i.e., the image input unit 31) is a color image input device or whether the image output unit (i.e., the image output unit 33) is a color image output device, based on the color property information. With this recognition, the reference selector (i.e., the first reference selector 306) selects one reference color property from among the plurality of the reference color properties, as a part of one reference property profile, stored in the reference property memory (i.e., the reference property memory 323). In this case, the color or the monochrome is the only condition for selecting the reference color property. So, a combination of the color and the monochrome or more detailed color property information may be arranged as alternative conditions.

Figure 15:
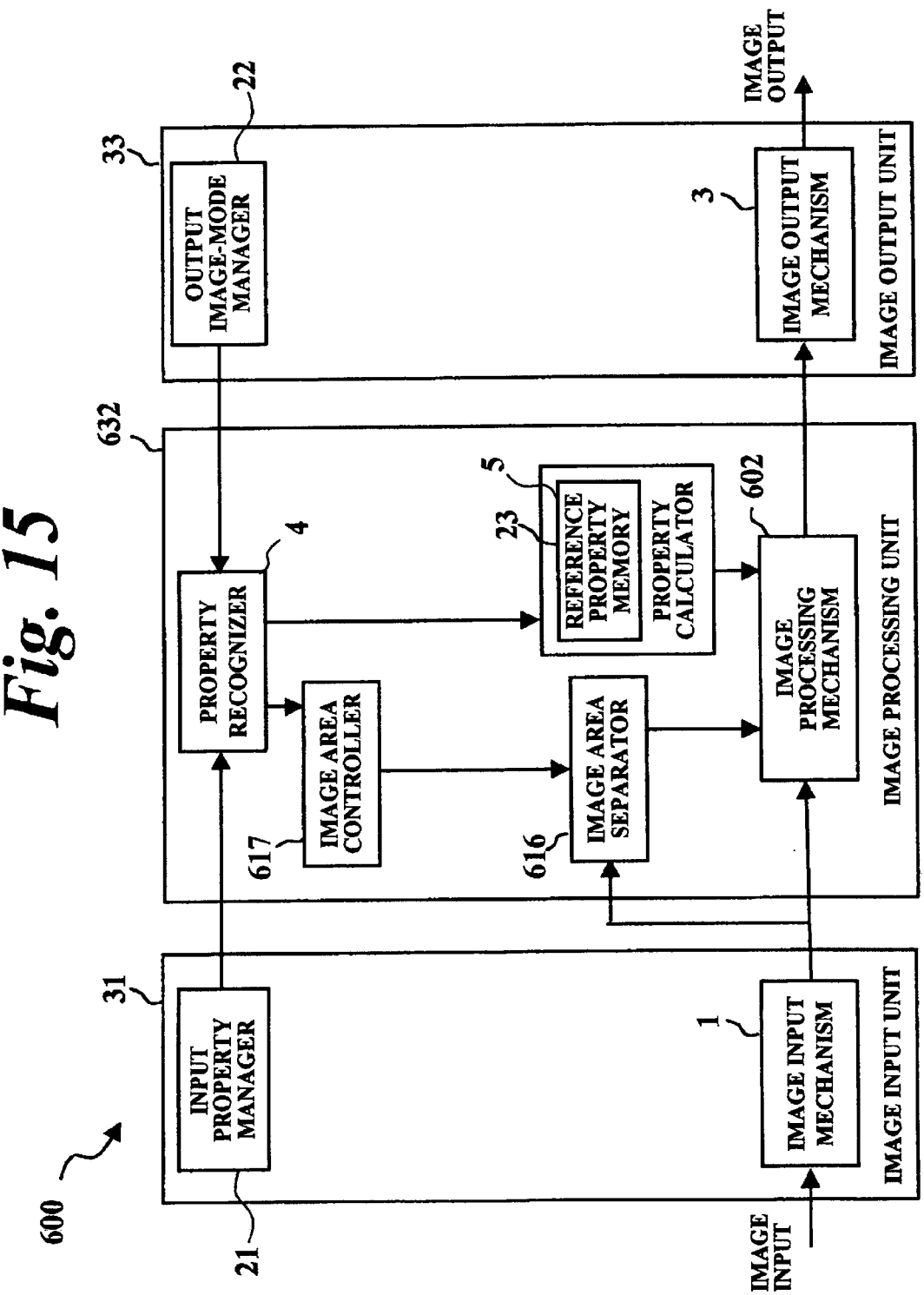
FIG. 15 is a schematic block diagram of an exemplary image forming system according to a sixth embodiment of the present invention.

Next, an image forming apparatus 600 according to a sixth embodiment of the present invention is explained with reference to FIG. 15. The image forming apparatus 600 of FIG. 15 has a configuration similar to the image forming apparatus 100 of FIG. 1, except for an image processing unit 632. The image processing unit 632 includes an image area controller 617, an image area separator 616, and an image processing mechanism 602. The image area controller 617 is an addition to the image processing unit 32 of the image forming apparatus 100 of FIG. 1. A combination of the image area separator 616 and the image processing mechanism 602 are approximately equivalent to the image processing mechanism 2 of the image forming apparatus 100. As explained earlier with referring to FIG. 10, the image area separator 16 is provided inside the image processing mechanism 2 of the image forming apparatus 100 and, therefore, it is not shown in FIG. 1. However, for the purpose of making a description of the sixth embodiment readily understood, this component is illustrated outside the image processing mechanism 2. It should be therefore understood that the image processing mechanism 602 actually includes the image area separator 16. In addition, it should be noted that the image area separator 16 can be located either inside or outside the image processing mechanism 2.

Figure 16:
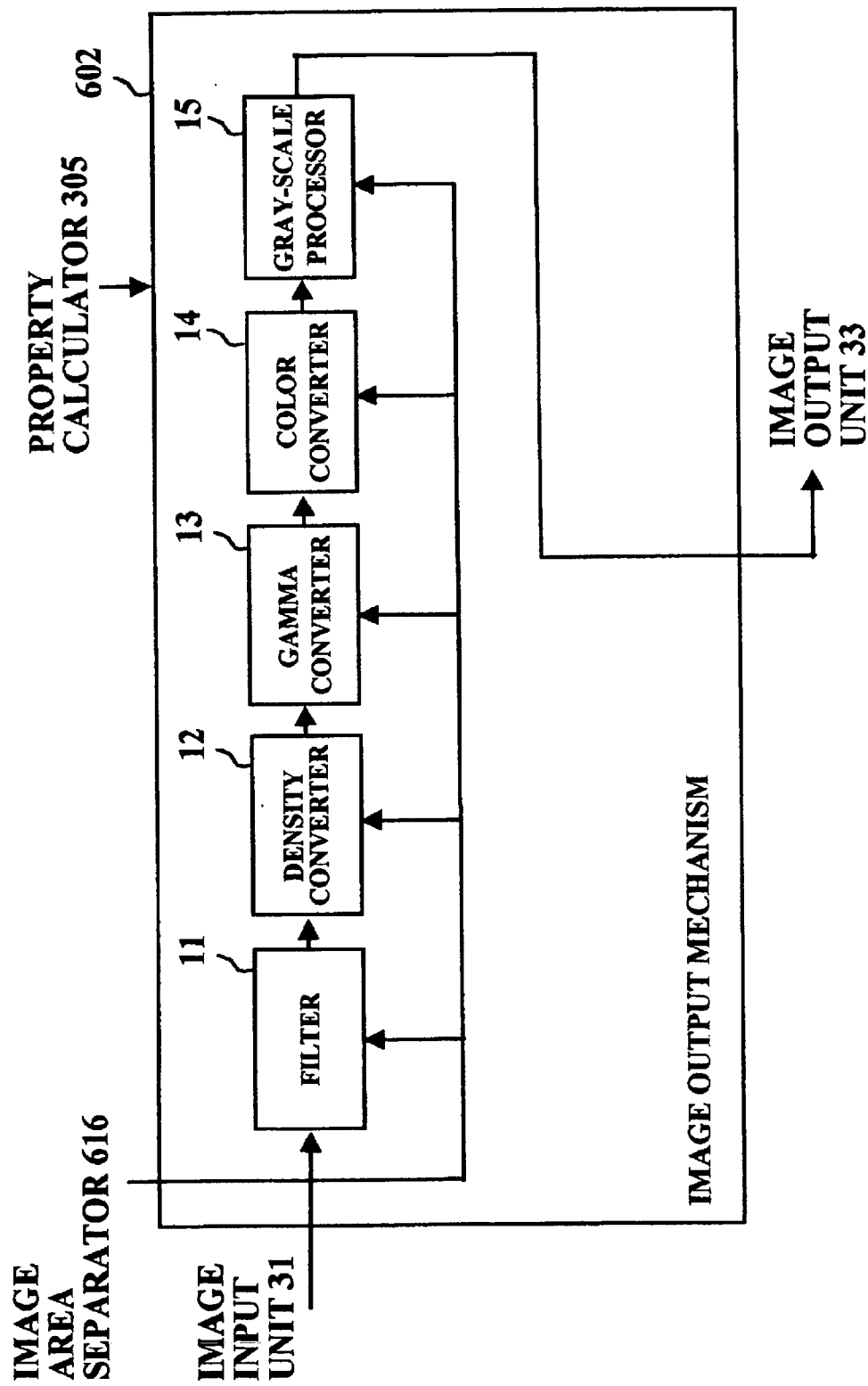
FIG. 16 is a block diagram of an image processing mechanism of an image processing unit of the image forming system of FIG. 15.

A detailed view of the image processing mechanism 602 used in the image forming apparatus 600 is shown in FIG. 16, similar to that of FIG. 10, except for the exclusion of the image area separator 616 as described above. That is, functions and operations of the image processing mechanism 602 remain similar to those of the image processing mechanism 2 of FIG. 10. Therefore, it should be understood that the description for the image processing mechanism 602 of FIG. 16 is omitted.

The basic data flows from the image input unit 31 to the image processing unit 632 and from the image processing unit 632 to the image output unit 33 are similar to those of the image forming apparatus 100. The image area controller 617 of the image processing unit 632 receives the property information from the property recognizer 4 and, based on the received property information, generates the conditions for the image area separating operation performed by the image area separator 616.

In the thus-configured image forming apparatus 600, the property recognizer 4 receives signals from the input property manager 21 of the image input unit 31 and the output property manager 22 of the image output unit 33, recognizes types and values of the upper and output property profiles, and sends signals representing these types and values to the image area controller 617 and the property calculator 5. Based on these received signals, the image area controller 617 generates a signal representing the conditions for the image area separating operation performed by the image area separator 616. Using the received conditions, the image area separator 616 performs the image area separation operation with respect to the input image data of a page image and transmits the resultant image data to the image processing mechanism 602.

The property calculator 5 receives the property information from the property recognizer 4 and calculates an optimal property profile based on the information from the property recognizer 4 and the reference property profile stored in the reference property manager 23. Using the optimal property profile, the image processing mechanism 602 optimally processes the image on a separated-area basis. After that, the image processing mechanism 602 sends the image data to the image output mechanism 3 which then outputs an image on a recording sheet in accordance with the received image data.

Figure 17:
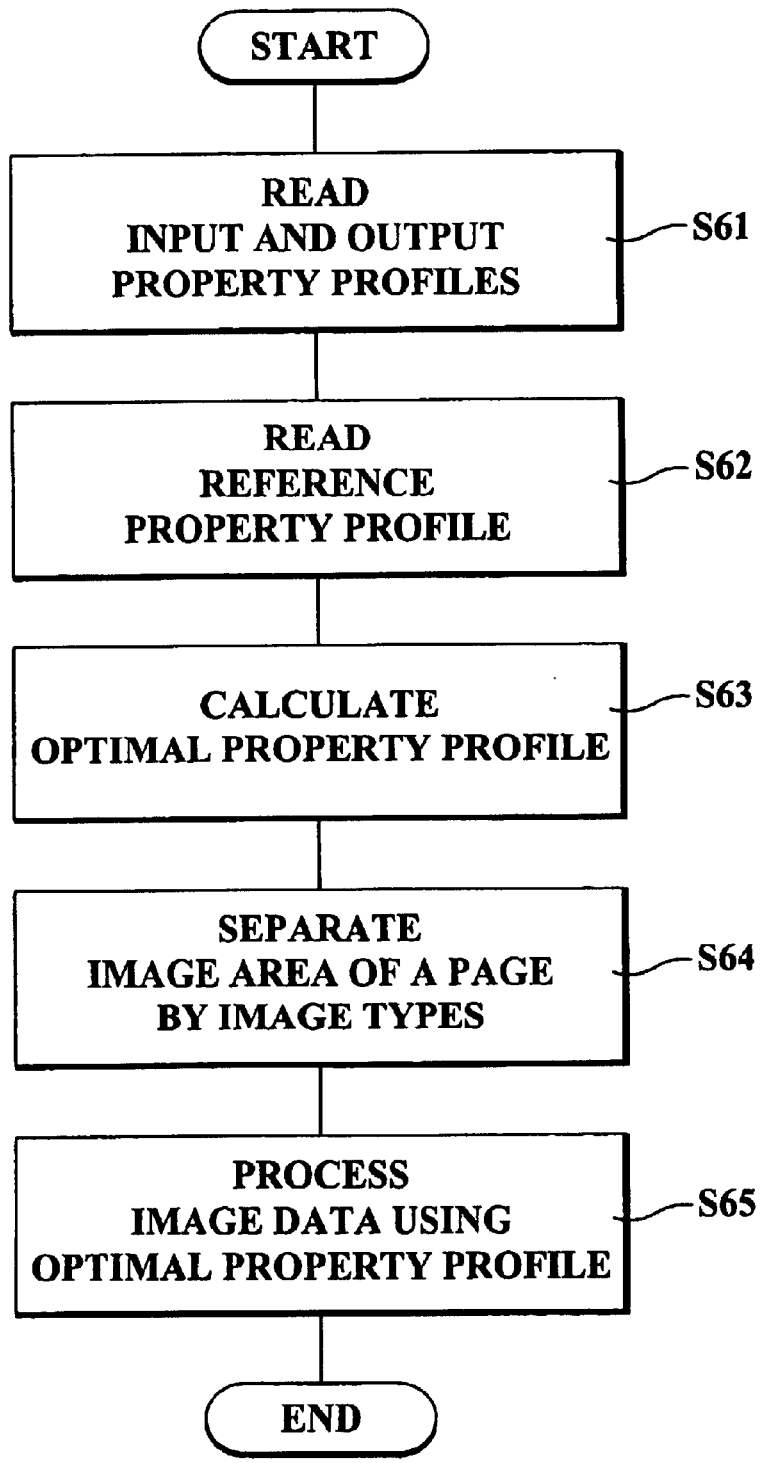
FIG. 17 is a flowchart for explaining an exemplary image forming operation of the image forming system of FIG. 15.

FIG. 17 shows an exemplary image processing operation of the above-described image forming apparatus 600. When the image forming apparatus 600 starts an image processing operation, the property recognizer 4 of the image processing unit 632 reads and recognizes an input property profile (i.e., a scanner profile) of the input property manager 21 and an output property profile (i.e., a printer profile) of the output property manager 22, in Step S61. Then, the property calculator 5 reads and recognizes a reference property profile, in Step S62. Then, the property calculator 5 calculates an optimal property profile based on the input and output property profiles and the reference property profile, in Step S63. Then, in Step S64, the image area separator 616 separates the image data of a page image in accordance with the separation conditions generated by the image area controller 617 based on the property information from the property recognizer 4. After that, in Step S65, the image processing mechanism 602 processes the image data in each image area separated in accordance with the type of the image, using the optimal property profile calculated in Step S63. Then, the process ends.

Figure 18:
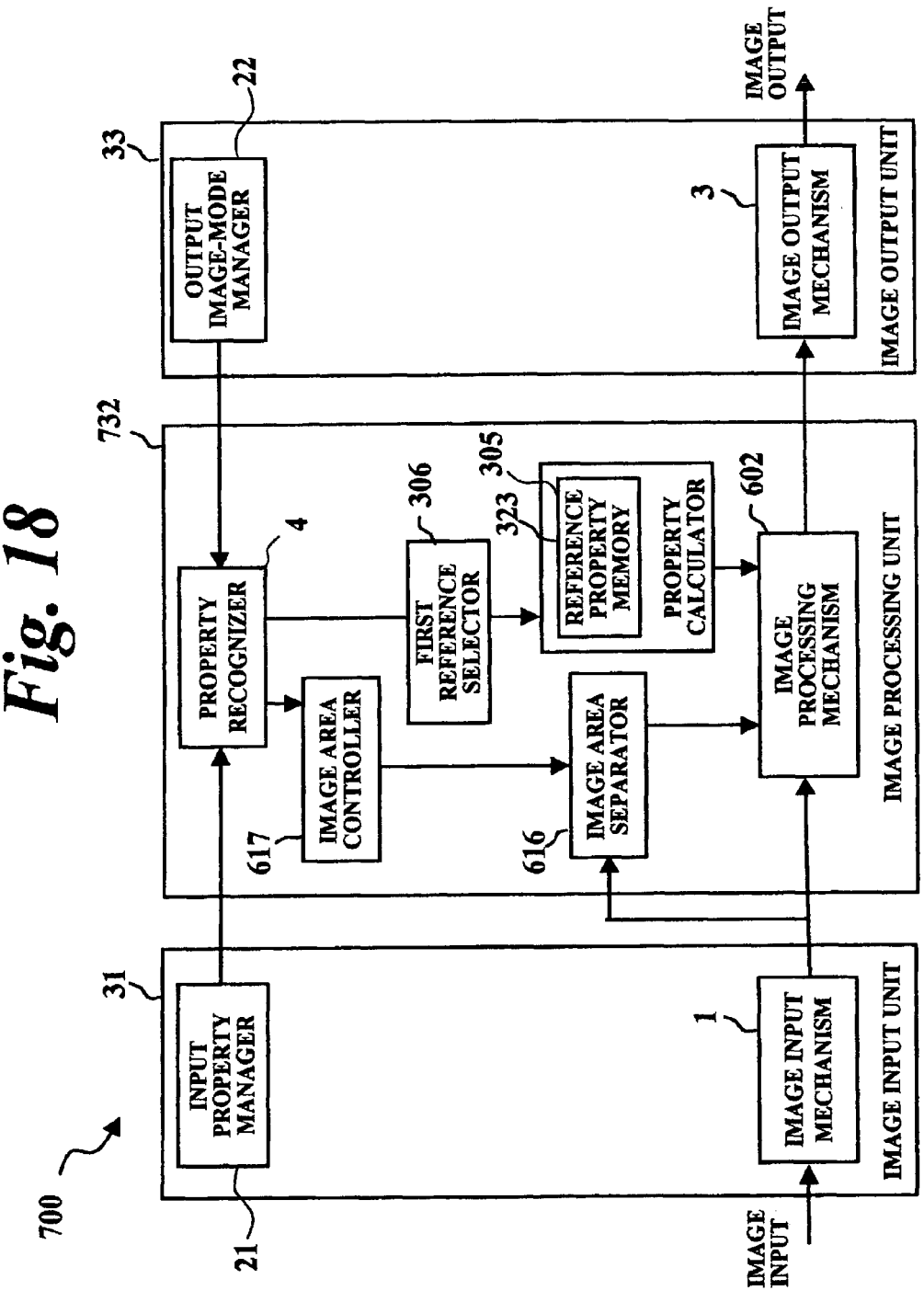
FIG. 18 is a schematic block diagram of an exemplary image forming system according to a seventh embodiment of the present invention.

Next, an image forming apparatus 700 according to a seventh embodiment of the present invention is explained with reference to FIG. 18. The image forming apparatus 700 of FIG. 18 has a configuration similar to the image forming apparatus 300 of FIG. 4, except for an image processing unit 732. The image processing unit 732 includes the image area controller 617, the image area separator 616, and the image processing mechanism 602, which are explained in the above description with reference to FIG. 15.

The basic data flows from the image input unit 31 to the image processing unit 732 and from the image processing unit 732 to the image output unit 33 are similar to those of the image forming apparatus 300. The image area controller 617 of the image processing unit 732 receives the property information from the property recognizer 4 and, based on the received property information, generates the conditions for the image area separating operation performed by the image area separator 616.

In the thus-configured image forming apparatus 700, the property recognizer 4 receives signals from the input property manager 21 of the image input unit 31 and the output property manager 22 of the image output unit 33, recognizes types and values of the input and output property profiles, and sends signals representing these types and values to the image area controller 617, the first reference selector 306, and the property calculator 305. Based on these received signals, the image area controller 617 generates a signal representing the conditions for the image area separating operation performed by the image area separator 616. Using the received conditions, the image area separator 616 performs the image area separation operation with respect to the input image data of a page image and transmits the resultant image data to the image processing mechanism 602.

The first reference selector 306 receives the property information including the input property profile of the image input unit 31 and the output property profile of the image output unit 33 from the property recognizer 4 and, based on the received property information, generates a signal for selecting one reference property profile from among the plurality of reference property profiles stored in the plural property reference profile memory 323. The property calculator 305 receives the property information from the property recognizer 4 and calculates an optimal property profile based on the information from the property recognizer 4 and the reference property profile selected by the first reference selector 306. Using the optimal property profile, the image processing mechanism 602 optimally processes the image on a separated-area basis. After that, the image processing mechanism 602 sends the image data to the image output mechanism 3 which then outputs an image on a recording sheet in accordance with the received image data.

Figure 19:
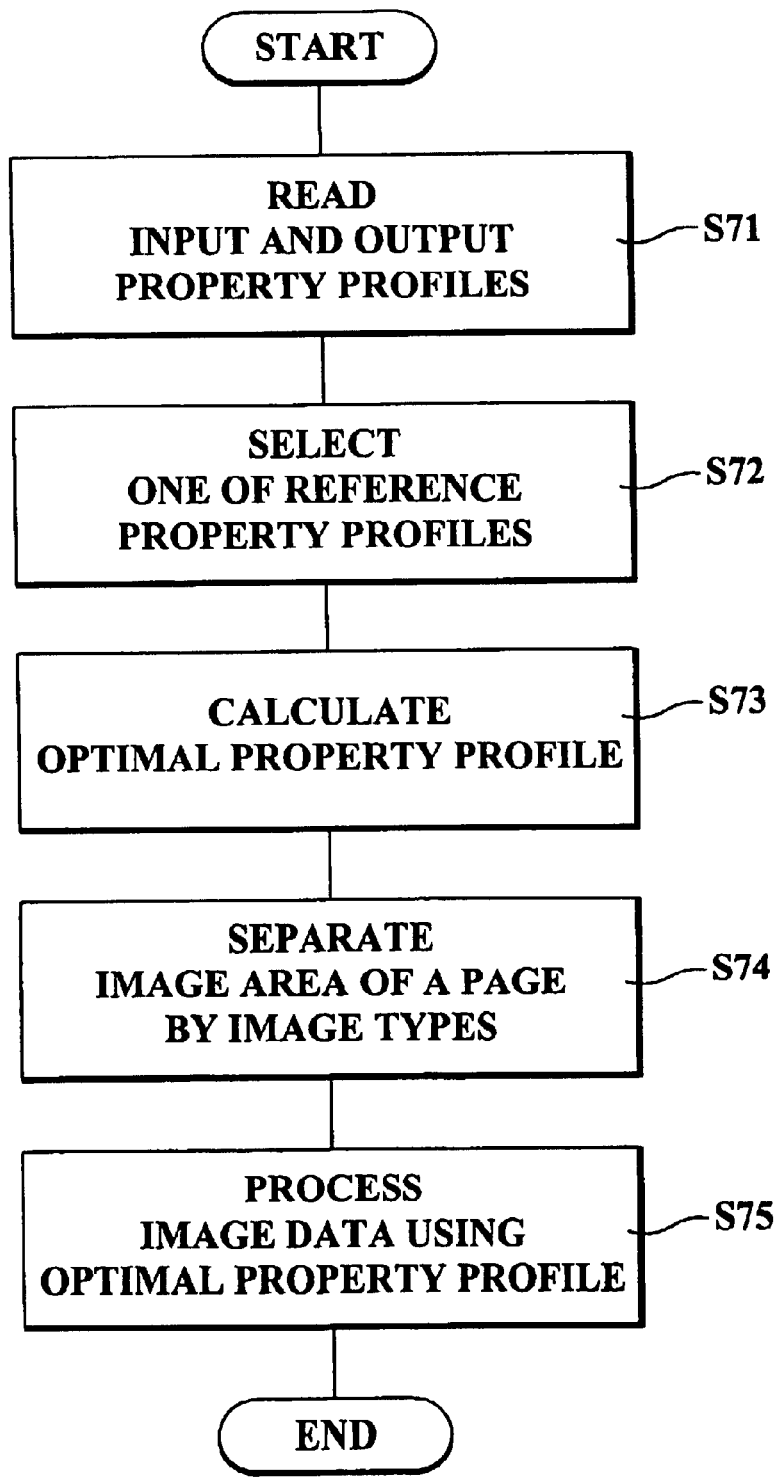
FIG. 19 is a flowchart for explaining an exemplary image forming operation of the image forming system of FIG. 18.

FIG. 19 shows an exemplary image processing operation of the above-described image forming apparatus 700. When the image forming apparatus 700 starts an image processing operation, the property recognizer 4 of the image processing unit 732 reads and recognizes an input property profile (i.e., a scanner profile) of the input property manager 21 and an output property profile (i.e., a printer profile) of the output property manager 22, in Step S71. Then, the first reference selector 306 selects one of the plurality of the reference property profiles stored in the referenced property memory 323 so that the property calculator 305 reads and recognizes one reference property profile selected based on the property information of the above input and output property profiles, in Step S72. Then, the property calculator 305 calculates an optimal property profile based on the input and output property profiles and the reference property profile, in Step S73. Then, in Step S74, the image area separator 616 separates the image data of a page image in accordance with the separation conditions generate by the image area controller 617 based on the property information from the property recognizer 4. After that, in Step S75, the image processing mechanism 602 processes the image data in each image area separated in accordance with the type of the image, using the optimal property profile calculated in Step S73. Then, the process ends.

Figure 20:
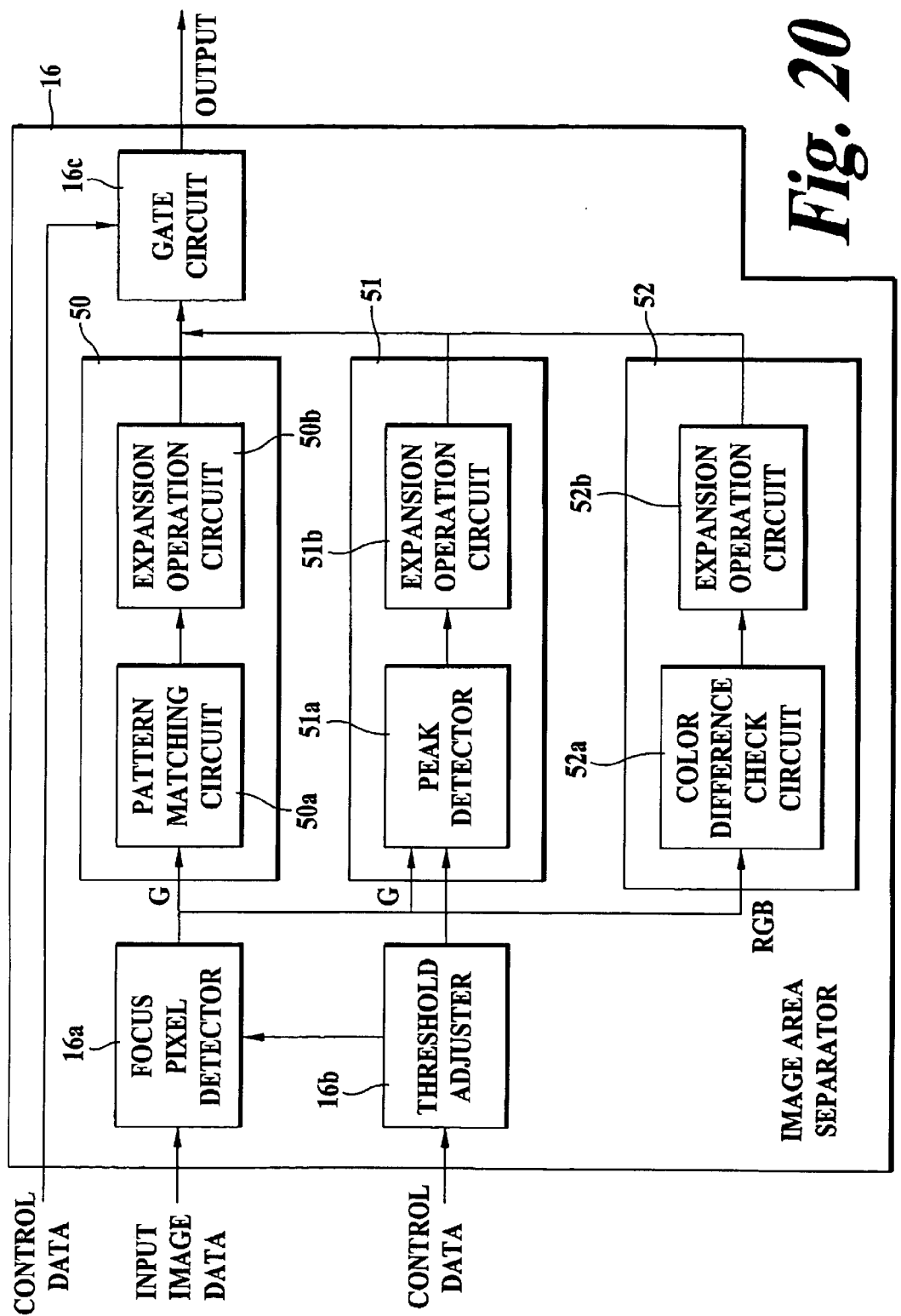
FIG. 20 is a block diagram of an image area separator of an image processing mechanism included in the image forming system of FIG. 1.

Referring to FIG. 20, a detailed configuration of the image area separator 16 of the image processing mechanism 2 is explained. This explanation is also applied to the image area separator 616 of the image processing mechanism 602. As shown in FIG. 20, the image area separator 16 includes a focus pixel detector 16a, a threshold adjuster 16b, an edge pixel detector 50, a screened-print pixel detector 51, a color pixel detector 52, and a gate circuit 16c.

The focus pixel detector 16a extracts a focus pixel from the input image data and detects property of the focus pixel. The threshold adjuster 16b receives image area control data from the image area controller 17 and, based on the received image area control data, adjusts the threshold level at which the focus pixel detector 16a extracts a focus pixel.

The edge pixel detector 50 includes a pattern matching circuit 50a and an expansion operation circuit 50b, and receives data representing G (green) out of RGB data to detect edges included in a character and a line image by performing a pattern matching operation using a matrix of a predetermined size.

An exemplary 3-by-3 image data pattern for judging a focus pixel is shown in FIG. 21, which includes pixels a to h around a center pixel which is a focus pixel and is indicated by an asterisk. Exemplary edge detect patterns prestored in the pattern matching circuit 50a are shown in FIGS. 22A to 22D.

In FIGS. 21 and 22A to 22D, an asterisk indicates a focus pixel, a black circle indicates a black pixel, and a white circle indicates a white pixel. A black pixel and a white pixel are obtained by a tri-value operation in which the input image data undergoes a threshold operation which specifies two predetermined threshold levels and each pixel of the input image data is judged if it is a black, white, or gray pixel. That is, if a focus pixel is in one of patterns shown in FIGS. 22A to 22D, this focus pixel is determined as a potential edge image and receives an expansion operation by the expansion operation circuit 50b. The thus-obtained area is handled as an edge area.

The screened-print pixel detector 51 includes a peak detector 51a and an expansion operation circuit 51b. The peak detector 51a receives data representing G (green) out of RGB data to detect a screened-print image printed with a screen by performing a peak detecting operation using a matrix of a predetermined size. The peak detector 51a detects a peak of a focus pixel. The peak detector 51a also receives the image area control data from the image area controller 17 via the threshold adjuster 16b, based on the received image area control data, adjusts the threshold level at which the peak detector 51a performs the peak detect operation. In this peak detect operation, a focus pixel situated in the pattern of FIG. 21 is handled as a potential screened-print image (a crest) if the focus pixel has a value greater than those of the surrounding pixels a–h and if a difference between the value of the focus pixel and a mean value of the pixels a–h has an absolute value greater than a predetermined threshold level. In a similar manner, a focus pixel situated in the pattern of FIG. 21 is handled as a potential screened-print image (a trough) if the focus pixel has a value smaller than those of the surrounding pixels a–h and if a difference between the value of the focus pixel and a mean value of the pixels a–h has an absolute value smaller than a predetermined threshold level. These potential screened-print images are transferred to the expansion operation circuit 51b to receive an expansion operation and are then handled each as a screened-print image area.

The color pixel detector 52 includes a color difference check circuit 52a and an expansion operation circuit 52b.

The color difference check circuit 52a checks a color difference between the RGB data and the focus pixel, in which the focus pixel judged as a potential color pixel if a difference between the RGB and the focus pixel has a value greater than a predetermined threshold value. After that, the potential color pixel is expanded by the expansion operation circuit 52b and is then handled as a color image area.

The gate circuit 16c stores data representing a truth table, as shown in FIG. 23, and uses this truth table to perform a total judgement relative to the resultant signals such as an edge output from the edge pixel detector 50, a screen-print image area output from the screened-print pixel detector 51, and a color image area output from the color pixel detector 52. Through this total judgement, the image area is separated into a black character area, a color and black character area, and a pattern area.

In this way, the image processing mechanism 2 can perform an optimal image processing operation in accordance with the result of the image area separation operation performed by the image area separator 16.

Next, an exemplary operation for adjusting the threshold value of the threshold adjuster 16b of the image area separator 616 in the image forming apparatus 600, for example, with reference to FIGS. 24A–31. This is a case in which the values of the resolution and MTF properties from the image input unit 31 are changed. If such a change occurs and each of the values is changed within a predetermined value, the image processing mechanism 602 can adjust the threshold value of the threshold adjuster 16b of the image area separator 616 so as to maintain the performance of the image processing operation optimal.

Figure 24A:
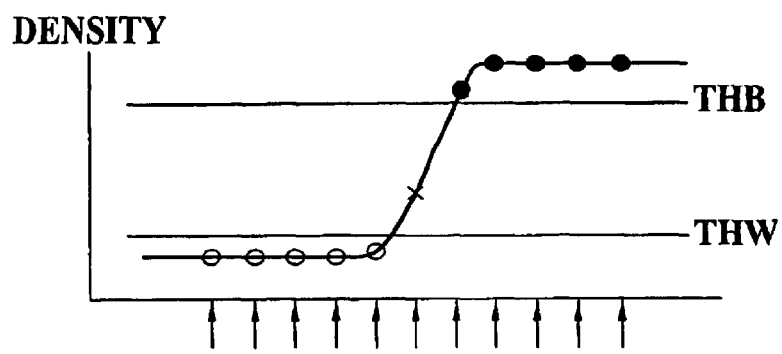
FIGS. 24A–24C are illustrations for explaining relationships between a threshold level of the edge image detection and a resolution property.

Adjustment of the threshold value of the edge pixel detection in response to the variations of the resolution will be described below with referring to FIGS. 24A–24C and 25. FIG. 24A shows a case in which the threshold value of the edge pixel detection performed by the edge pixel detector 50 is appropriate relative to the value of the resolution property of the image input unit 31. In FIG. 24A, a series of pixels included in the input image data are represented by white circles, a cross mark, and black circles, each of which is entered through the image input mechanism (i.e., a scanning mechanism) at each timing indicated by an arrow. A plurality of the arrows are aligned at an equal interval and, therefore, the resolution is represented by the distance between two arrows. The edge pixel detector 50 performs the edge pixel detection using a black pixel threshold this and a white pixel threshold THW to judge each pixel of the input image data. As a result of the edge pixel detection, the pixels are separated into a white pixel which has a value smaller than the white threshold THW, a gray pixel which has a value intermediate between the white threshold thw and the black threshold THB and a black pixel which has a value greater than the black threshold THB.

Each of the above pixels passing through the edge pixel detection is in turn handled as a focus pixel and forms a 3-by-3 matrix pattern with the neighboring pixels. Such a matrix pattern of the input image data is checked with the test matrix patterns shown in FIGS. 22A–22D, by the pattern matching circuit 50a. In this case, the matrix pattern of the input image data matches the test matrix pattern of FIG. 22C and, as a result, the pixel marked with a cross is detected as a potential edge pixel. In this case, the resolution of the image input mechanism matches the edge pixel detection threshold values including the black pixel threshold thb and the white pixel threshold THW and, therefore, the edge pixel detector 50 can output a desirable detection result.

Figure 24B:
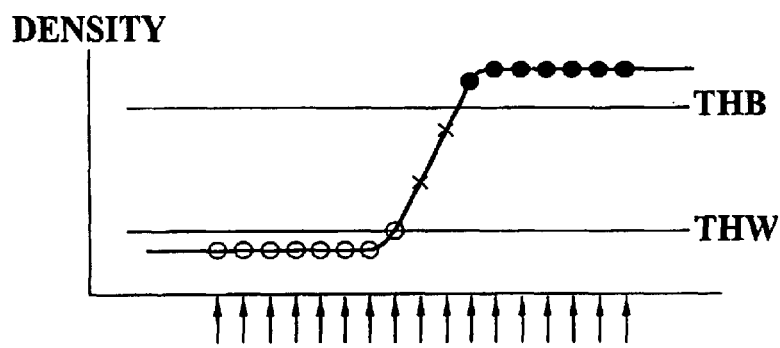

FIG. 24B shows a case in which the resolution of the image input unit 31 (i.e., a scanner) is increased. In this case, the data input speed is faster, that is, the data input interval is smaller. As a result, two pixels near an edge are detected, which are marked each with a cross. The pattern matching check using the test matrix patterns of FIGS. 22A–22D will fail in this case and cannot find a matched pattern. Accordingly, the edge pixel detector 50 finds no potential edge pixel.

Figure 24C:
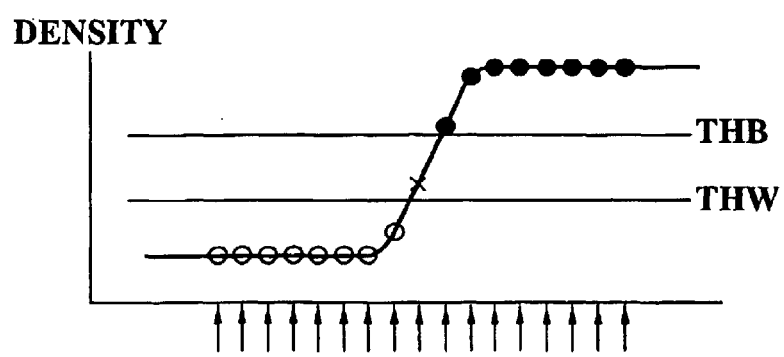

An adjustment of the threshold value can avoid this problem. That is, a slight decrease of THB and a slight increase of THW will make the band narrow and allow one pixel—be marked with a cross, as shown in FIG. 24C. So, the pattern matching check will find a matched test pattern and the edge pixel detector 50 can output a desirable edge detect result.

When the resolution is made smaller on the contrary to the above described case, it will readily be understood that the threshold adjuster 16b is caused to increase THB and decrease THW so that the edge pixel detector 50 can appropriately detect an edge pixel.

Figure 25:
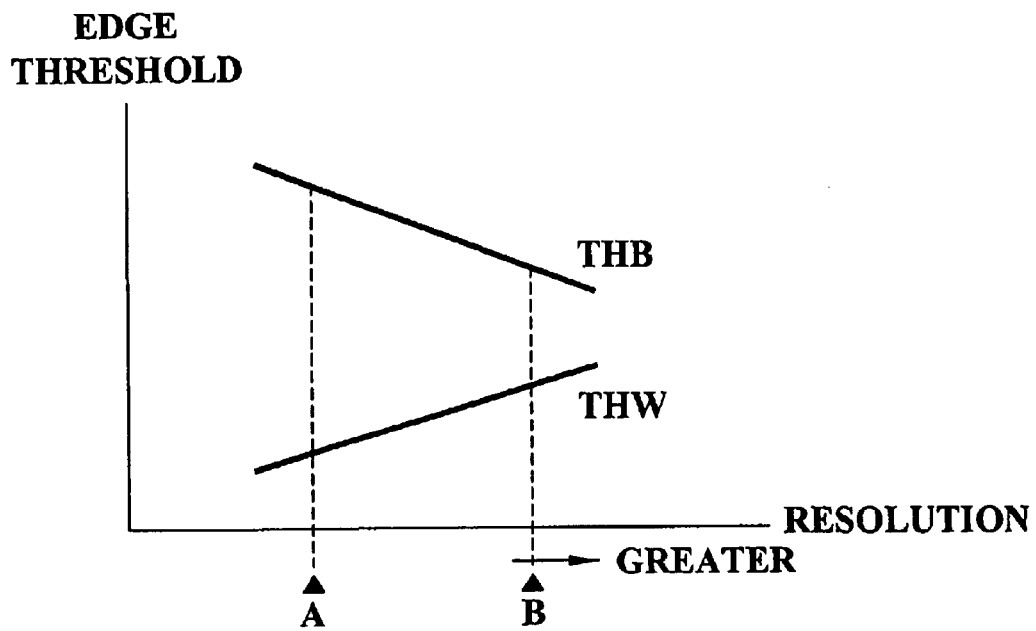
FIG. 25 is a graph for explaining a way of maintaining a performance of the edge image detection constant in response to variations of the resolution property.

That is, when the image input unit 31 has a resolution relatively small and when the edge pixel detector 50 has the black and white threshold values having a relatively great difference with each other, as illustrated in FIG. 24A, a relationship between the edge detect threshold and the resolution will exist around an area indicated by a letter A in FIG. 25. On the contrary, when the image input unit 31 has a resolution relatively great and when the edge pixel detector 50 has the black and white threshold values having a relatively small difference with each other, a relationship between the edge detect threshold and the resolution will exist around an area indicated by a letter B in FIG. 25. In addition, when the image input unit 31 has a resolution intermediate between those illustrated in FIGS. 24A and 24C, a relationship between the edge detect threshold and the resolution will exist around an intermediate area between the above two cases in FIG. 25.

On the other hand, when the resolution is increased above a value of a potential upper limit, the difference of the black and white threshold values indicated by the letter B in FIG. 25 will be made smaller. With such a relatively low margin, a focus pixel indicated with a cross mark as shown in FIG. 24A or 24C will erroneously be judged as a black pixel or a white pixel due to various unstable factors such as electrical noises then generated in the associated circuits.

When the resolution is decreased below a value of a potential lower limit, the difference of the black and white threshold values indicated by the letter A in FIG. 25 will be made much greater. This makes an average white pixel level come closer to the white threshold level or an average black pixel level come closer to the black threshold level, both of which will cause an occurrence of erroneous judgement with a help of various unstable factors such as electrical noises then generated in the associated circuits. In this case, a black pixel and a white pixel will erroneously be judged as gray pixels. That is, a pixel which should be judged as an edge pixel will be wrongly judged as a pixel other than an edge pixel.

As countermeasures to these erroneous events, the image processing unit 632 stops the operation of the image area separator 616 when the resolution is changed out of a predetermined range. In this case, the image processing unit 632 handles an image as totally a pattern image or a character image depending upon aims so as to avoid a frequent mixture of pattern and character images which may cause a degradation of image quality.

In addition, it is advisable to avoid using the image area separation such as the edge pixel detection of the screened-print pixel detection when the input property information of the image input unit 31 includes no resolution property. This is because the image area separation may adversely affect an image with a relatively low resolution or a relatively high resolution, in particular. Accordingly, in such a case, the image processing unit 31 can stop using the functions of the image area separator 16 and cause the image mechanism 602 to handle the image as totally a pattern image area or a character image area so as to avoid a degradation of an image quality.

An adjustment of the threshold value of the edge pixel detection in response to the variations of the MTF will now be described with reference to FIGS. 26A–26C and 27. A white circle, a cross mark, and a black circle are defined in the same way as those of FIGS. 24A–24C. Also, in the same way as those of FIGS. 24A–24C, each focus pixel forms a 3-by-3 matrix pattern with the neighboring pixels which is then checked with the test matrix patterns shown in FIGS. 22A–22D, by the pattern matching circuit 50a.

Figure 26A:
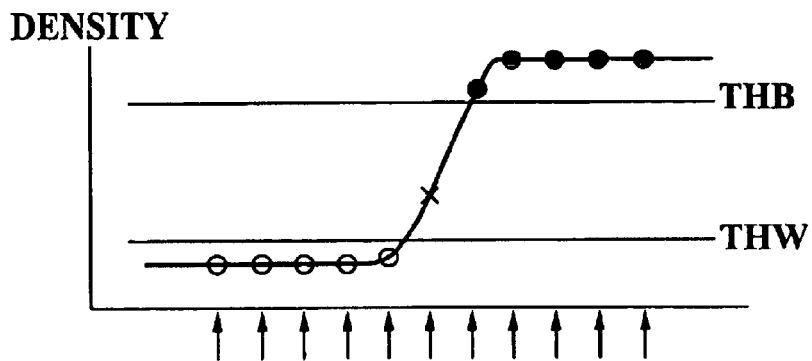
FIGS. 26A–26C are illustrations for explaining relationships between a threshold level of the edge image detection and an MTF property.

FIG. 26A shows a case in which the threshold value of the edge pixel detection performed by the edge pixel detector 50 is appropriate relative to the value of the MTF property of the image input unit 31. In this case, the matrix pattern of the input image data matches the test matrix pattern of FIG. 22C and, as a result, the pixel marked with a cross is detected as a potential edge pixel. Also, in this case, the MTF of the image input mechanism 31 matches the edge pixel detection threshold values including the black pixel threshold THB and the white pixel threshold THW and, therefore, the edge pixel detector 50 can output a desirable detection result.

Figure 26B:
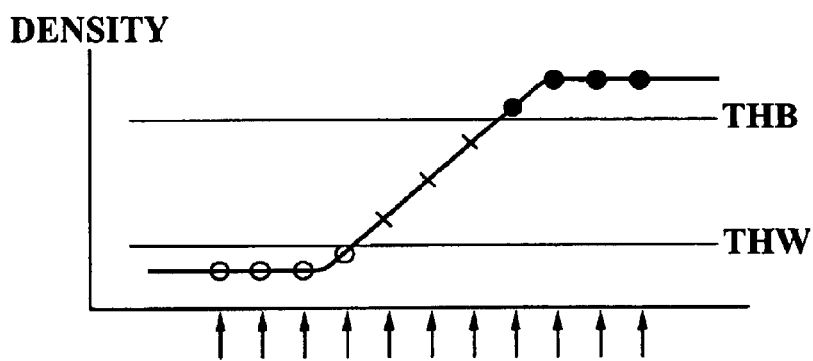
Figure 26C:
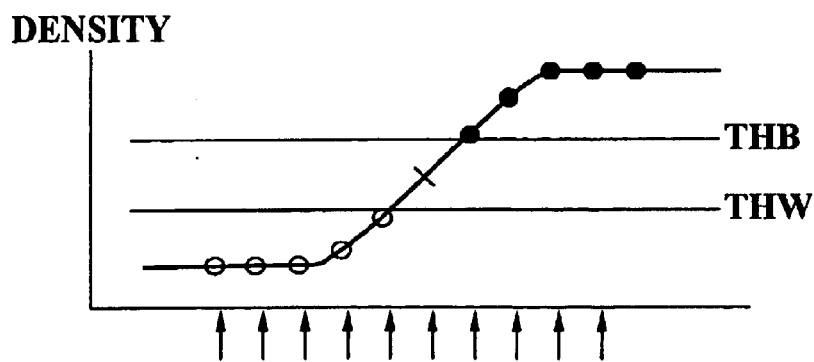

FIG. 26B shows a case in which the MTF of the image input unit 31 (i.e., a scanner) is degraded and is therefore decreased. In this case, the rise time of the image data from the white level to the black level increase, as shown in FIG. 26B. As a result, a number of gray pixels detected near an edge increases. The pattern matching check using the test matrix patterns of FIGS. 22A–22D will fail in this case and cannot find a matched pattern. Accordingly, the edge pixel detector 50 finds no potential edge pixel.

An adjustment of the threshold value can avoid this problem. That is, a slight decrease of THB and a slight increase of THW will make the band narrow and allow one pixel be marked with a cross, shown in FIG. 26C. So, the pattern matching a check will find a matched test pattern and the edge pixel detector 50 can output a desirable edge detect result.

When the MTF is made greater on the contrary to the above described case, it will readily be understood that the threshold adjuster 16b is caused to increase THB and decrease THW so that the edge pixel detector 50 can appropriately detect an edge pixel.

Figure 27:
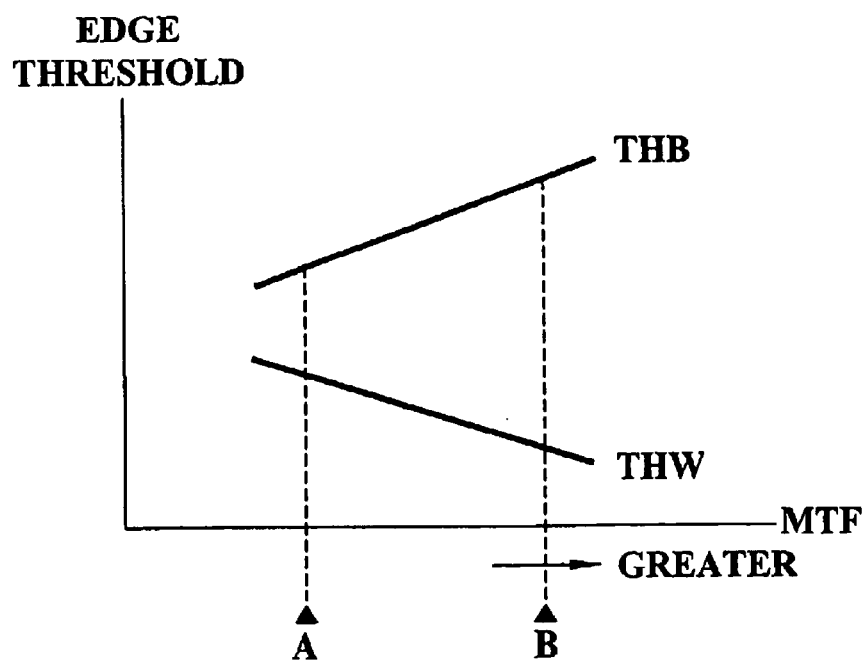
FIG. 27 is a graph for explaining a way of maintaining a performance of the edge image detection constant in response to variations of the MTF property.

That is, when the image input unit 31 has an MTF relatively great and when the edge pixel detector 50 has the black and white threshold values having a relatively great difference with each other, as illustrated in FIG. 26A, a relationship between the edge detect threshold and the MTF will exist around an area indicated by a letter A in FIG. 27. On the contrary, when the image input unit 31 has an MTF relatively small and when the edge pixel detector 50 has the black and white threshold values having a relatively small difference with each other, a relationship between the edge detect threshold and the MTF will exist around an area indicated by a letter B in FIG. 27. In addition, when the image input unit 31 has an MTF intermediate between those illustrated in FIGS. 26A and 26C, a relationship between the edge detect threshold and the MTF will exist around an intermediate area between the above two cases in FIG. 27.

On the other hand, when the MTF is increased above a value of a potential upper limit or when the MTF is decreased below a value of a potential lower limit, a desirable edge detect cannot be achieved by merely changing the black and white threshold values due to various unstable factors such as electrical noises then generated in the associated circuits, as is explained in the relationship between the threshold values and the resolution value.

In this case, the image processing unit 632 stops using the functions of the image area separator 16 and handles an image as totally a pattern image or a character image depending upon aims so as to avoid a frequent mixture of pattern and character images which may cause a degradation of image quality.

Adjustment of the threshold value of the screened-print pixel detection in response to the variation of the resolution will be described below with referring to FIGS. 28A–28C and 29. In these drawings, a density of a plurality of arrows aligned at an equal interval defines a resolution of the image input unit 31, for example, as is so in FIGS. 24A–24C. Black circles with letters B, E, and G, or B', E', and G', are defined each as a potential peak pixel and white circles with letters A, C, D, F, and H, or A', C', D', F', and H', are defined each as a pixel other than a potential peak pixel, by the screened-print pixel detector 51.

Figure 28A:
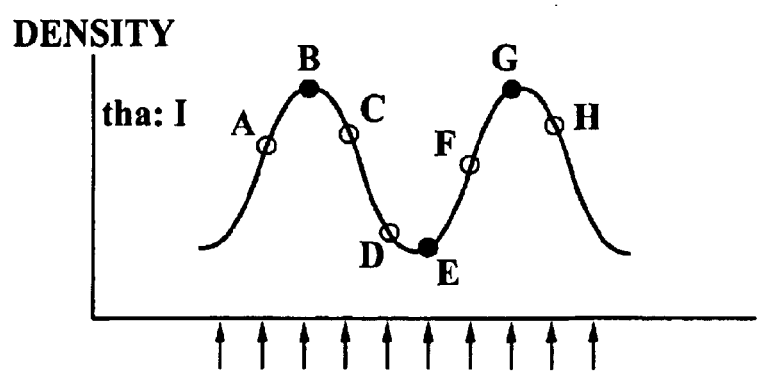
FIGS. 28A–28C are illustrations for explaining relationships between a threshold level of the screened-print image detection and a resolution property.

FIG. 28A shows a case in which the threshold value of the screened-print pixel detection performed by the screened-print pixel detector 51 is appropriate relative to the value of the resolution property of the image input unit 31. In this case, as shown in FIG. 28A, the black pixels detected as the potential peak pixels have density values larger and smaller than other surrounding pixels located in the 3-by-3 matrix of FIG. 21. The screened-print pixel detector 51 performs the screened-print pixel detection in which an absolute value of a difference between a mean value of the 8 surrounding pixels and a value of the potential peak value is compared to a predetermined threshold value preferred to as tha. If the difference is greater than tha, the potential peak pixel is determined as a screened-print pixel. FIG. 28A shows a one-dimensional example having three peak pixels, B, E, and G. If the following as a screened-print pixel;

|(density of B)−(mean density of A and C)|,> tha, but if the following second formula is satisfied, the pixel B is determined as a pixel other than the screened-print pixel;

|(density of B)−(mean density of A and C)|≦ tha,

The screened-print pixel detector 51 will also examine the pixels E and G in the same manner. The screened-print peak pixel is then expanded through the expansion operation circuit 51b and is output as a screened-print area. In this case, the resolution of the image input mechanism matches the threshold values of the screened-print pixel detection and, therefore, the screened-print pixel detector 51 can output a desirable detection result.

Figure 28B:
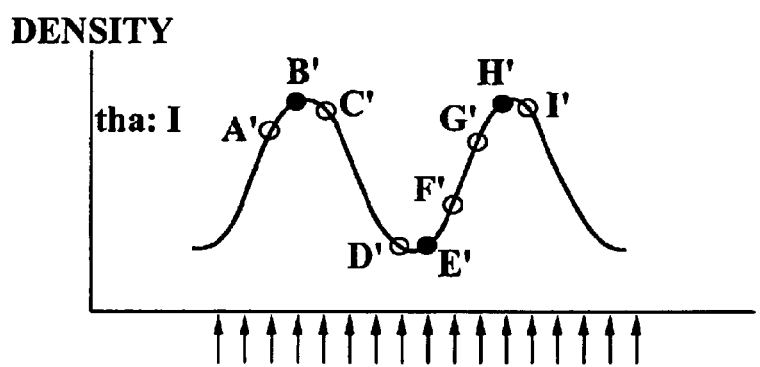

FIG. 28B shows a case in which the resolution of the image input unit 31 (i.e., a scanner) is increased. In this case, the same image data as in FIG. 28A is input but the data input speed is faster, that is, the data input interval is smaller. As a result, a difference of density between two neighboring pixels is smaller. Therefore, with the same threshold tha, the potential peak pixel B' is evaluated as follows;

$|(\text{density of B'})-(\text{mean density of A' and C'})| \leq \text{tha}.$

That is, the pixel B' is not detected as a screened-print peak pixel. Each of the pixels E' and H' are also not detected as screened-print peak pixels.

Figure 28C:
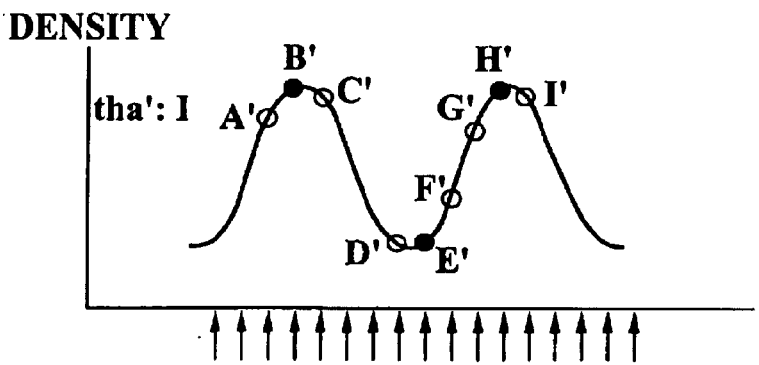

FIG. 28C shows a case in which the threshold tha is slightly decreased to tha', that is, a slight increase of detection sensitivity. With this adjustment, the potential peak pixel B' is evaluated as follows;

$|(\text{density of B'})-(\text{mean density of A' and C'})| > \text{tha}.$

That is, the pixel B' can be detected as a screened-print peak pixel. Each of the pixels E' and H' can also be detected as the screened-print peak pixels. In this way, it becomes possible to obtain a detection result same as that of FIG. 28A.

When the resolution is made smaller, on the contrary to the above-described case, it will readily be understood that the threshold adjuster 16b is caused to increase tha so that the screened-print pixel detector 51 can appropriately detect a screened-print peak pixel.

Figure 29:
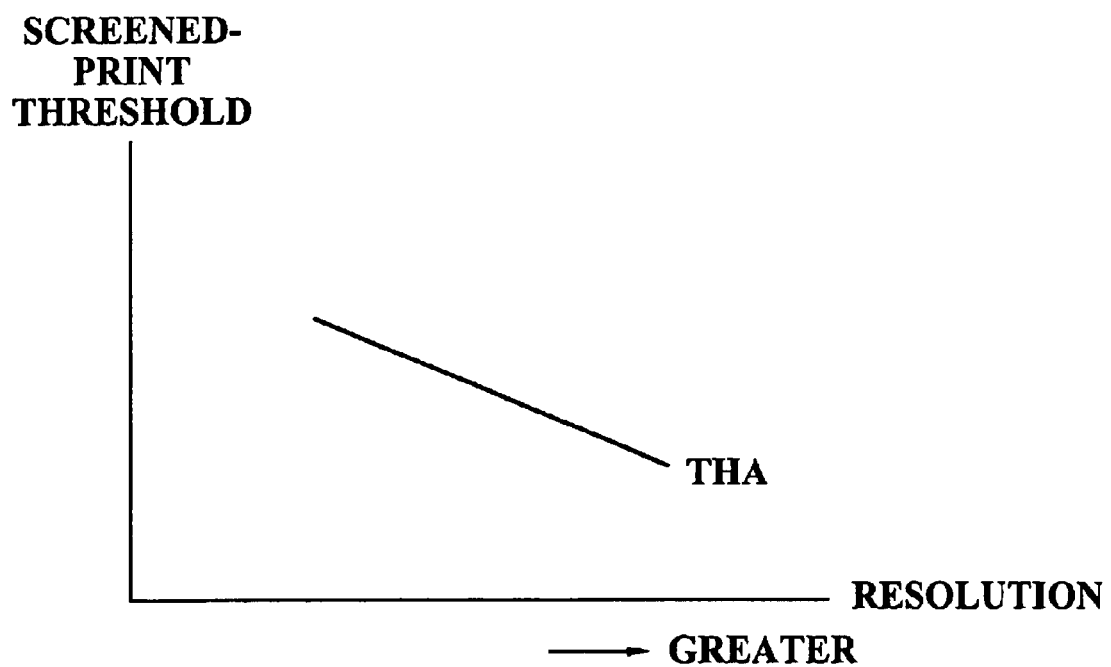
FIG. 29 is a graph for explaining a way of maintaining a performance of the screened-print image detection constant in response to variations of the resolution property.

FIG. 29 shows a relationship between the variations of the resolution of the image input unit 31 and the threshold value tha. According to this graph, a constant accuracy of the screened-print detection can be obtained along the line appeared therein. That is, when the image input unit 31 increases the resolution, the threshold value tha needs to be decreased in response to it.

However, when the image input unit 31 has a resolution greater than a value of a potential upper limit or smaller than a value of a potential lower limit, such an adjustment of the threshold value tha may no longer be workable and the screened-print detection cannot be carried out in an appropriate manner. For example, if the image input unit 31 has a greater resolution than that shown in FIG. 28C and inputs the image data and if the threshold value tha is therefore adjusted to a smaller value in accordance with the graph of FIG. 29, the screened-print pixel detector 51 may be prone to erroneously detect an electrical noise, for example, overlaid on the image data signal as screened-print peak pixel.

On the contrary, if the image input unit 31 has a smaller resolution than that shown in FIG. 28A and inputs the image data and if the threshold value tha is therefore adjusted to a greater value in accordance with the graph of FIG. 29, the density variations of the surrounding pixels, which are to be compared to the focus pixel, become relatively greater than the screened-print pixel detector 51 may be prone to erroneously detect a focus pixel, which should normally be detected as a non-screened-print pixel, as screened-print peak pixel.

An adjustment of the threshold value of the screened-print pixel detection in response to the variations of the MTF will now be described with reference to FIGS. 30A–30C and 31. In these drawings, a density of a plurality of arrows aligned at an equal interval defines a resolution of the image input unit 31, for example, as is so in FIGS. 28A–28C. Black circles with letters B, E, and G, or B', E', and G', are defined each as a potential peak pixel and white circles with letters A, C, D, F, and H, or A', C', D', F', and H', are defined each as a pixel other than a potential peak pixel, by the screened-print pixel detector 51.

Figure 30A:
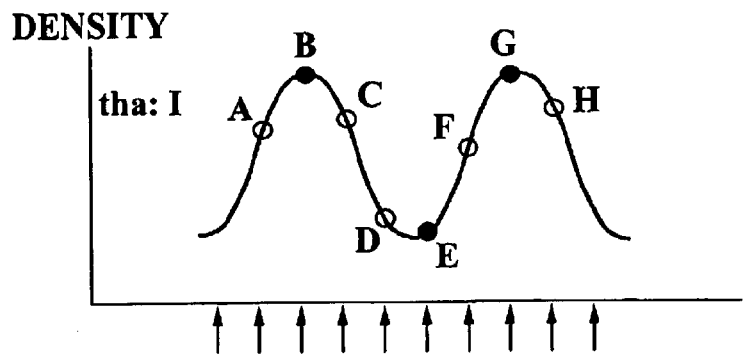
FIGS. 30A–30C are illustrations for explaining relationships between a threshold level of the screened-print image detection and an MTF property.

FIG. 30A shows a case in which the threshold value of the screened-print pixel detection performed by the screened-print pixel detector 51 is appropriate relative to the value or the MTF property of the image input unit 31. In this case, the matrix pattern of the input image data matches the test matrix pattern of FIG. 22C and the following formula is satisfied;

$|(\text{density of B})-(\text{mean density of A and C})| > \text{tha}.$

As a result, the pixel B is detected as a potential screened-print pixel. Accordingly, the pixels E and G will also be determined each as a potential screened-print pixel in the same manner. The screened potential pixel detector 51 can thus output a desirable detection result.

Figure 30B:
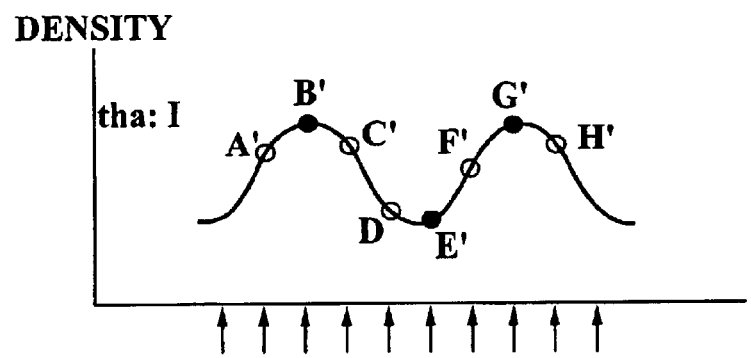

FIG. 30B shows a case in which the MTF of the image input unit 31 (i.e., a scanner) is degraded and the value thereof is therefore decreased. In this case, the same image data as in FIG. 30A is input but the MTF is smaller, that is, the gap between the crest and trough peak densities is smaller, as illustrated in FIG. 30B. As a result, a difference of density between two neighboring pixels is smaller. Therefore, with the same threshold tha, the potential peak pixel B' is evaluated as follows;

$|(\text{density of B'})-(\text{mean density of A' and C'})| \leq \text{tha}.$

That is, the pixel B' is not detected as a screened-print peak pixel. Each of the pixels E' and H' are also not detected as screened-print peak pixels.

Figure 30C:
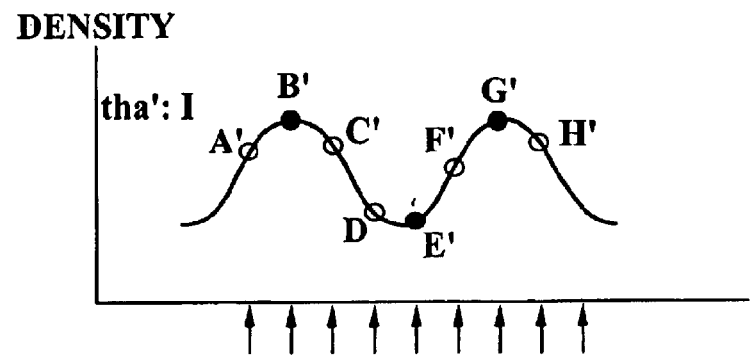

FIG. 30C shows a case in which the threshold tha is slightly decreased to tha', that is, a slight increase of detection sensitivity. With this adjustment, the potential peak pixel B' is evaluated as follows;

$|(\text{density of B'})''(\text{mean density of A' and C'})| \leq \text{tha}.$

That is the pixel B' can be detected as a screened-print peak pixel. Each of the pixels E' and H' can also be detected as the screened-print peak pixels. In this way, it becomes possible to obtain a detection result same as that of FIG. 28A.

When the MTF is made greater, on the contrary to the above-described case, it will readily be understood that the threshold adjuster 16b is caused to increase tha so that the screened-print pixel detector 51 can appropriately detect a screened-print peak pixel.

Figure 31:
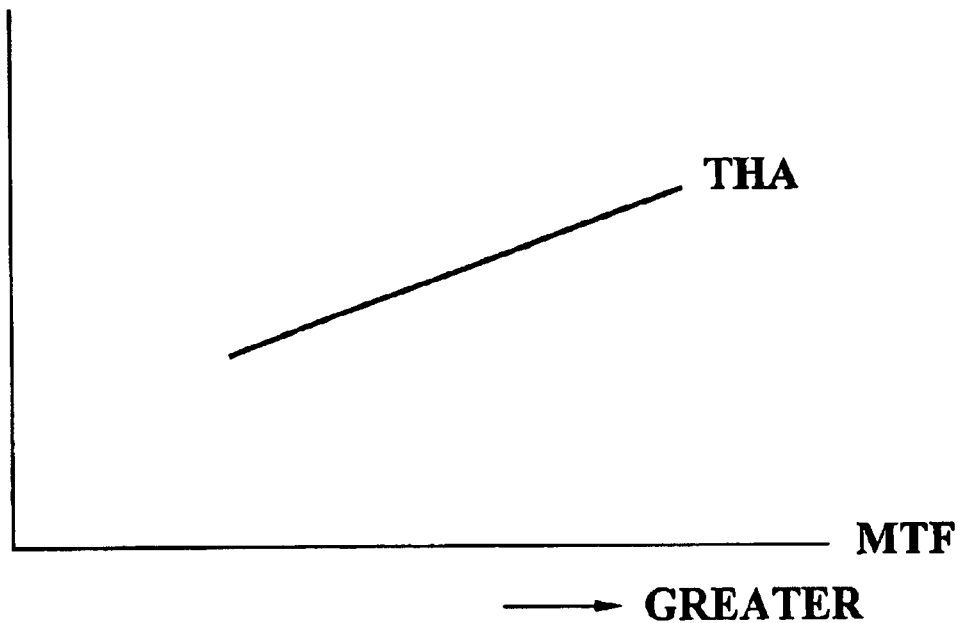
FIG. 31 is a graph for explaining a way of maintaining a performance of the screened-print image detection constant in response to variations of the MTF property.

FIG. 31 shows a relationship between the variations of the MTF of the image input unit 31 and the threshold value tha. According to this graph, a constant accuracy of the screened-print detection can be obtained along the line appeared therein. That is, when the image input unit 31 increases the MTF, the threshold value the needs to be increased in response to it.

However, when the image input unit 31 has the MTF greater than a potential upper-limit value or smaller than a potential lower-limit value, such an adjustment of the threshold value tha may no longer be workable and the screened-print detection cannot be carried out in an appropriate manner. For example, if the image input unit 31 has a smaller MTF than that shown in FIG. 30C and inputs the image data and if the threshold value tha is therefore adjusted to a smaller value in accordance with the graph of FIG. 31, the screened-print pixel detector 51 may be prone to erroneously detect an electrical noise, for example, overlaid on the image data signal as screened-print peak pixel.

On the contrary, if the image input unit 31 has a greater MTF than that shown in FIG. 30A and inputs the image data and if the threshold value tha is therefore adjusted to a greater value in accordance with the graph of FIG. 31, the density variations of the surrounding pixels, which are to be compared to the focus pixel, become relatively greater and the screened-print pixel detector 51 may be prone to erroneously detect a focus pixel, which should normally be detected as a non-screened-print pixel, as screened-print peak pixel.

As described above, if the resolution or the MTF falls outside the potential limits, an accuracy of the peak pixel detection is decreased due to electrical noises generated in the circuitry of the image input unit and the image processing unit. As a result, a quality of an output image may be degraded. Countermeasures for this problem is explained with reference to FIGS. 32–38A and 38B.

Figure 32:
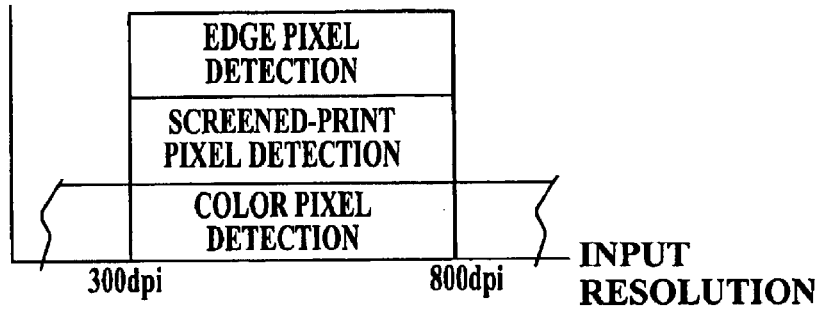
FIG. 32 is an illustration for explaining a band of the resolution where the image area separation operations are performed.
Figure 33:
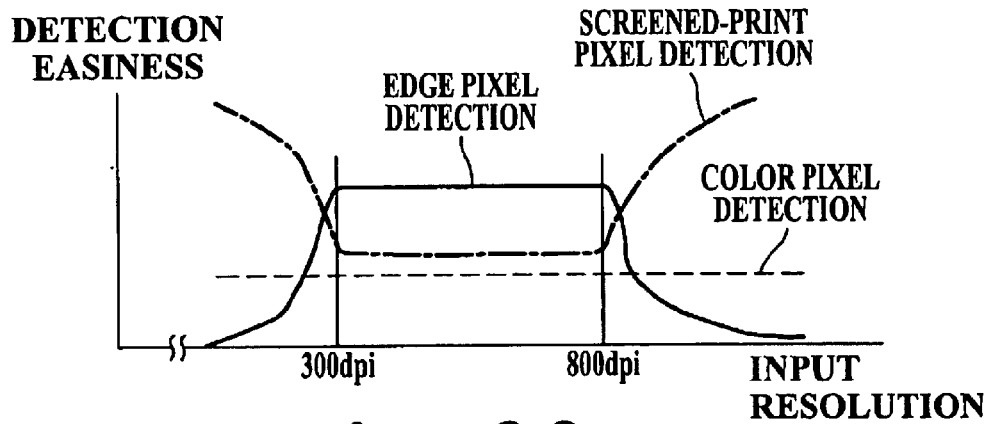
FIGS. 33 and 34 are illustrations for explaining ways of adjusting detection performance in an area out of the band limits of the resolution.
Figure 34:
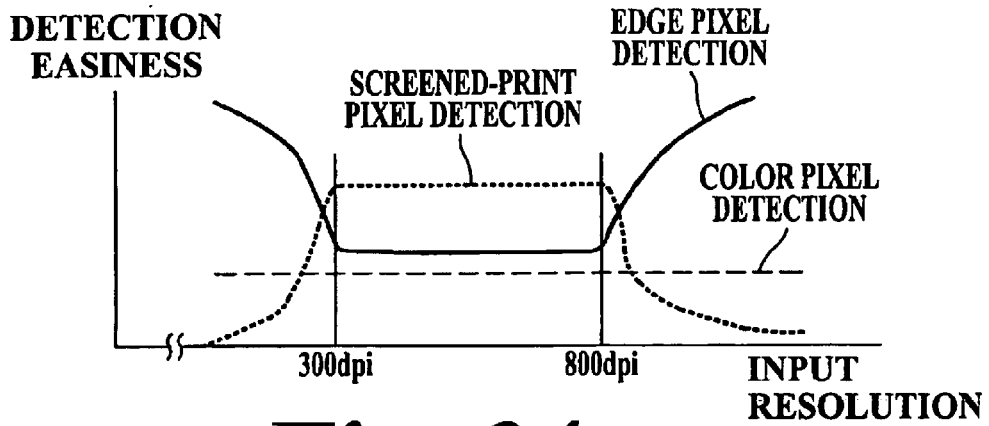

FIGS. 32–34 are for the case of variations of resolution. FIG. 32 shows a range of an input resolution handled by the image area separator 616 in accordance with a control of the image area controller 617. In this case, the image area separator 616 performs the edge pixel detection, screened-print pixel detection, and the color pixel detection with the resolution from the image input unit 31 having a range of from 300 dpi to 800 dpi.

Within this range, the detection accuracy of the peak pixel is maintained by decreasing the black pixel threshold value THB and increasing the white pixel threshold value THW in response to an increase of the resolution value, as explained above with reference to FIG. 25. This is represented by the level lines of the edge pixel detection and the screened-print pixel detection within the bandwidth of from 300 dpi to 800 dpi, as shown in FIG. 33, wherein the edge pixel detection level is indicated by a solid line and the screened-print detection level is indicated by a chained-line.

In addition, as illustrated in FIG. 33, the image area separator 616 is controlled by the image area controller 617 such that the solid line for the edge pixel detection is quickly decreased and that the chained-line for the screened-print pixel detection is quickly increased, out of the 300 dpi-to-800 dpi range. In this case, the vertical axis represents a parameter of a status of density detection easiness, that is, easiness is increased as the level goes upward along the vertical axis. This means that the image area separator 616 is controlled by the image area controller 617 such that the edge pixel detection will be made more difficult as the resolution is apart from the 300 dpi-to-800 dpi range and that the screened-print pixel detection will be made easier as the resolution is apart from the 300 dpi-to-800 dpi range. The ways for making the pixel detection easier and more difficult are described above with reference to FIGS. 24A–24C to 31 and are therefore omitted. In addition, the color pixel detection is arranged to maintain a constant accuracy, regardless of the variations of the resolution, as illustrated with a dotted-line in FIG. 33.

With this configuration, the image area separator 616 decreases the sensitivity of the edge pixel detection and can avoid an event in which a focus pixel in a pattern area is erroneously judged as an edge peak pixel of a character due to electrical noises and the like. Also, the image area separator 616 increases the sensitivity of the screened-print pixel detection and can avoid an event in which a character area is erroneously judged as a part of a pattern area and a degradation of an image quality is thus caused. That is, the image area separator 616 judges an area more as a pattern area when examining the input image with the resolution beyond the potential upper or lower limit.

This type of arrangement shown in FIG. 33 may be suitable for a case in which an image is handled as a pattern image rather than a character image since the pattern image is more weighted than the character image, particularly when the resolution is out of the predetermined range.

On the contrary, as illustrated in FIG. 34, the solid line for the edge pixel detection is quickly increased and that the chained-line for the screened-print pixel detection is quickly decreased, out of the 300 dpi-to-800 dpi range. This means that the image area separator 616 is controlled by the image area controller 617 such that the edge pixel detection will be made more difficult as the resolution is apart from the 300 dpi-to-800 dpi range and that the screened-print pixel detection will be made easier as the resolution is apart from the 300 dpi-to-800 dpi range. In addition, the color pixel detection is arranged to maintain a constant accuracy, regardless of the variations of the resolution, as illustrated with a dotted-line in FIG. 34.

With this configuration, the image area separator 616 decreases the sensitivity of the screened-print pixel detection and can avoid an event in which a focus pixel in a character area is erroneously judged as a screened pixel peak pixel of an edge due to electrical noises and the like. Also, the image area separator 616 increase the sensitivity of the edge pixel detection and can avoid an event in which an edge is erroneously judged as a part of a character area and a degradation of an image quality is thus caused. That is, the image area separator 616 judges an area more as a character area when examining the input image with the resolution beyond the potential upper or lower limit.

This type of arrangement shown in FIG. 34 may be suitable for a case in which an image is handled as a character image rather than a pattern image since the character image is more weighted than the pattern image, particularly when the resolution is out of the predetermined range.

Figure 35:
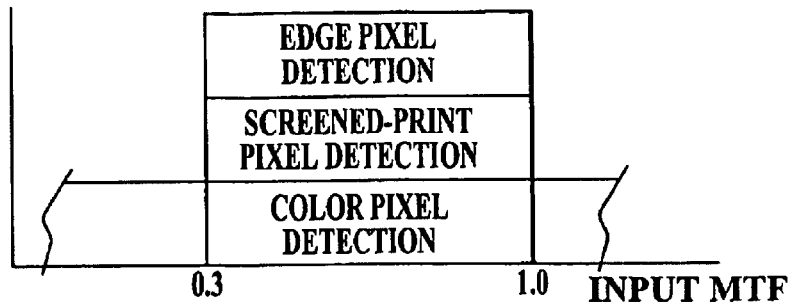
FIG. 35 is an illustration for explaining a band of the resolution where the image area separation operations are performed.
Figure 36:
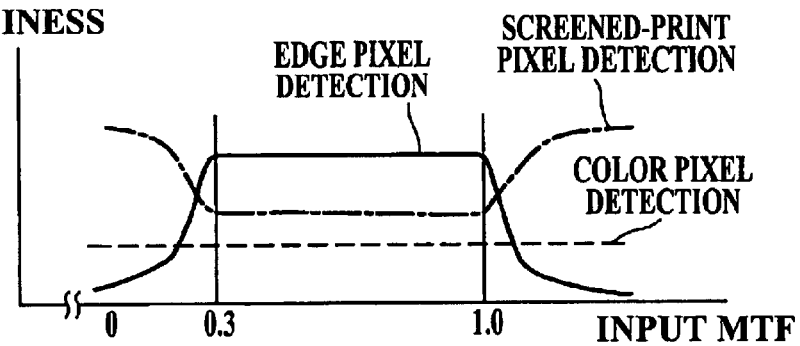
FIGS. 36 and 37 are illustrations for explaining ways of adjusting detection performance in an area out of the band limits of the resolution.
Figure 37:
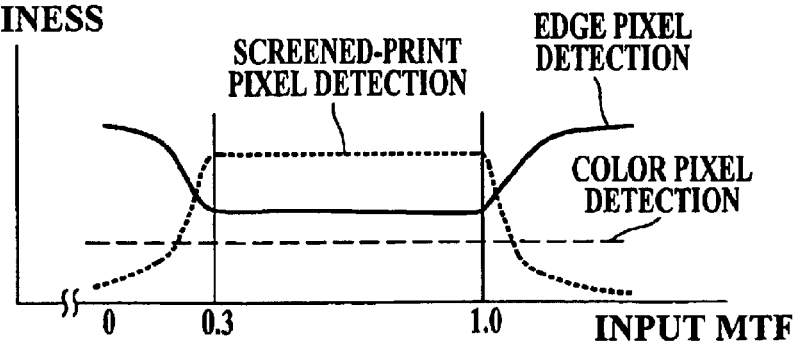

FIGS. 35–37 are for the case of variations of MTF. FIG. 35 shows a range of an input MTF handled by the image area separator 616 in accordance with a control of the image area controller 617. In this case, the image area separator 616 performs the edge pixel detection, screened-print pixel detection, and the color pixel detection with the MTF from the image input unit 31 having a range of a Nyquist frequency from 0.3 to 1.0.

Within this range, the detection accuracy of the peak pixel is maintained by the ways explained above with reference to FIGS. 27 and 31. This is represented by the level lines of the edge pixel detection and the screened-print pixel detection within the bandwidth of from 0.3 to 1.0, as shown in FIG. 36, wherein the edge pixel detection level is indicated by a solid line and the screened-print detection level is indicated by a chained-line.

In addition, as illustrated in FIG. 36, the image area separator 616 is controlled by the image area controller 617 such that the solid line for the edge pixel detection is quickly decreased and that the chained-line for the screened-print pixel detection is quickly increased, out of the 0.3-to-1.0 range. Since the vertical axis represents a parameter of a status of density detection easiness in the same way as that of FIGS. 33 and 34, the image area separator 616 is controlled by the image controller 617 such that the edge pixel detection will be made more difficult as the MTF is apart from the 0.3-to-1.0 range and that the screened-print pixel detection will be made easier as the MTF is apart from the 0.3-to-1.0 range. The ways for making the pixel detection easier and more difficult are described above with reference to FIGS. 24A–24C to 31 and are therefore omitted. In addition, the color pixel detection is arranged to maintain a constant accuracy, regardless of the variations of the MTF, as illustrated with a dotted-line in FIG. 36.

With this configuration, the image area separator 616 decreases the sensitivity of the edge pixel detection and can avoid an event in which a focus pixel in a pattern area is erroneously judged as an edge peak pixel of a character due to electrical noises and the like. Also, the image area separator 616 increases the sensitivity of the screened-print pixel detection and can avoid an event in which a character area is erroneously judged as a part of a pattern area and a degradation of an image quality is thus caused. That is, the image area separator 616 judges an area more as a pattern area when examining the input image with the MTF beyond the potential upper or lower limit.

This type of arrangement shown in FIG. 36 may be suitable for a case in which an image is handled as a pattern image rather than a character image since the pattern image is more weighted than the character image, particularly when the MTF is out of the predetermined range.

On the contrary, as illustrated in FIG. 37, the solid line for the edge pixel detection is quickly increased and that the chained-line for the screened-print pixel detection is quickly decreased, out of the 0.3-to-1.0 range. This means that the image area separator 616 is controlled by the image area controller 617 such that the edge pixel detection will be made more difficult as the MTF is apart from the 0.3-to-1.0 range and that the screened-print pixel detection will be made easier as the MTF is apart from the 0.3-to-1.0 range. In addition, the color pixel detection is arranged to maintain a constant accuracy, regardless of the variations of the MTF, as illustrated with a dotted-line in FIG. 37.

With this configuration, the image area separator 616 decreases the sensitivity of the screened-print pixel detection and can avoid an event in which a focus pixel in a character area is erroneously judged as a screened-print peak pixel of an edge due to electrical noises and the like. Also, the image area separator 616 increases the sensitivity of the edge pixel detection and can avoid an event in which an edge is erroneously judged as a part of a character area and a degradation of an image quality is thus caused. That is, the image area separator 616 judges an area more as a character area when examining the input image with the MTF beyond the potential upper or lower limit.

This type of arrangement shown in FIG. 37 may be suitable for a case in which an image is handled as a character image rather than a pattern image since the character image is more weighted than the pattern image, particularly when the MTF is out of the predetermined range.

In addition, each of the ranges of the resolution and the MTF specified above depends on the algorithms used. The above-described example specified as the 300 dpi-to-800 dpi resolution range and the 0.3-to-1.0 MTF range based on the Nyquist frequency are not limited thereto and can be set to other ranges. For example, a predetermined resolution is set to a range above 300 dpi and, the edge pixel, screened-print pixel, and color pixel detection operations are performed relative to image data with the resolution above 300 dpi and only the color pixel detection operation is performed relative to the image with the resolution below 300 dpi.

Figure 38A:
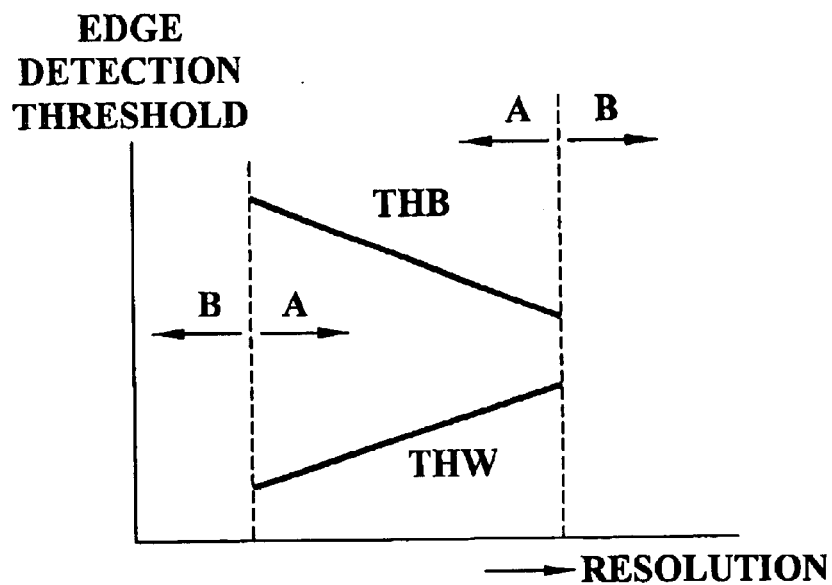
FIGS. 38A and 38B are illustrations for explaining the manners of changing the ranges of the resolution in response to the change of the MTF in the edge and screened-print image detection operations, respectively.
Figure 38B:
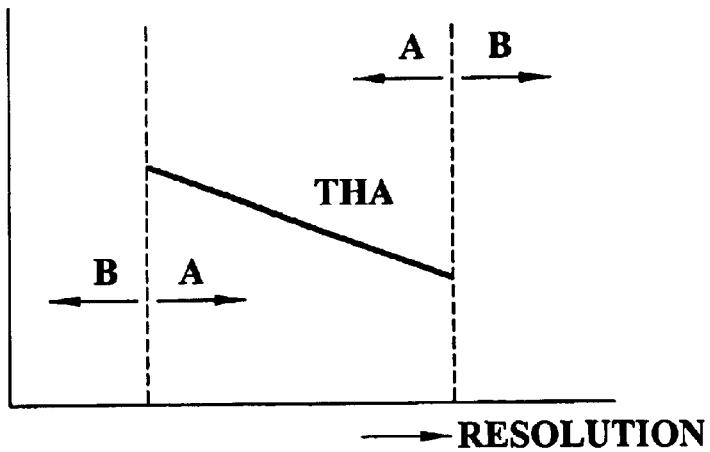

FIGS. 38A and 38B illustrate graphs in which the predetermined resolution range of the image input unit 31 is adjusted in accordance with the variations of MTF. The dotted lines in each of FIGS. 30A and 30B specify a range of resolution within which the edge pixel detection and the screened-print pixel detection can properly be performed relative to the normal MTF property. The above description with reference to FIGS. 25 and 29 are met with the conditions that the MTF is within the normal range. This can be understood from FIG. 30B in which the HTF is smaller and the gap between the crest peak become smaller and in which the screened-peak pixel detection can properly be performed without an adjustment of the threshold level tha.

As a countermeasure for this phenomenon, the image area separator 616 adjusts the threshold value THB and THW so as to change the resolution range as indicated by letters A in FIG. 38A when the MTF is decreased from a predetermined value, and also adjust THB and THW so as to change the resolution range as indicated by letters B in FIG. 38A when the MTF is increased from a predetermined value. Also, the image area separator 616 adjusts the threshold value tha so as to change the resolution range as indicated by letters A in FIG. 38B when the MTF is decreased from a predetermined range as also adjusts tha so as to change the resolution range as indicated by letters B in FIG. 38B when the MTF is increased from a predetermined value.

Figure 39:
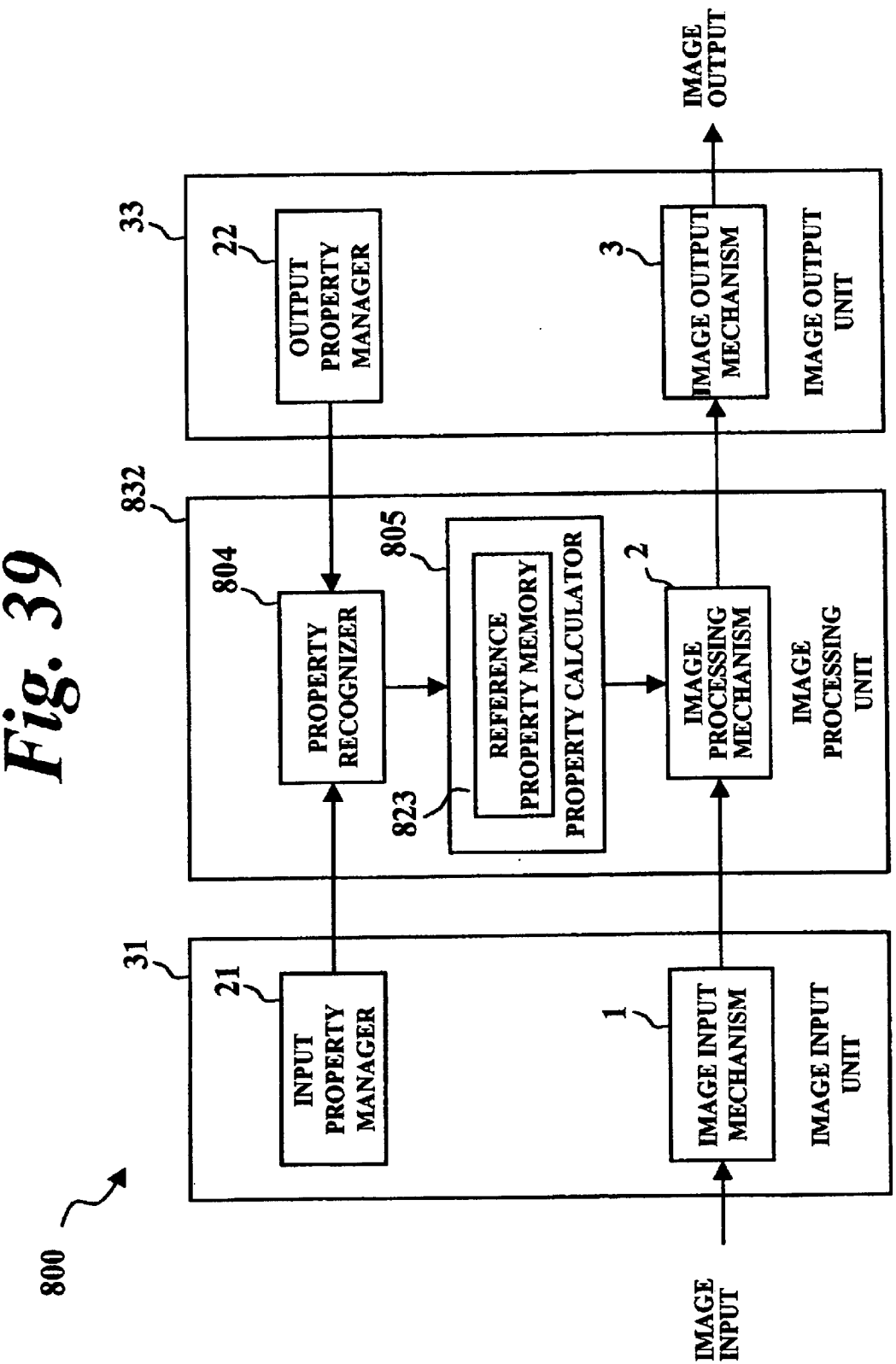
FIG. 39 is a schematic block diagram of an exemplary image forming system according to an eighth embodiment of the present invention.

Referring to FIG. 39, an image forming apparatus 800 according to an eighth embodiment of the present invention will be explained. The image forming apparatus 800 in FIG. 39 has a configuration similar to the image forming apparatus 100 of FIG. 1, except for an image processing unit 832. The basic data flows from the image input unit 31 to the image processing unit 832 and from the image processing unit 832 to the image output unit 33 which are also similar to those of the image forming apparatus 100. Accordingly, a description provided below mostly concentrates on the structure and the operations of the image processing unit 832.

The image processing unit 832 of the image forming apparatus 800 shown in FIG. 39 is similar to the image processing unit 32 of the image forming apparatus 100 of FIG. 1, except for a property recognizer 804 and a property calculator 805. The property recognizer 804 is provided to the image processing unit 832 in place of the property recognizer 4 and the property calculator 805 is provided thereto in place of the property calculator 5. The property calculator 805 includes a reference property memory 823 for prestoring a reference spatial frequency property and excludes the reference property memory 23.

In the thus-configured image forming apparatus 800, the property recognizer 804 receives signals from the input property manager 21 of the image input unit 31 and the output property manager 22 of the image output unit 33, recognizes an input spatial frequency property of the image input unit 31 and an output spatial frequency property of the image output unit 33, and sends signals representing these spatial frequency properties to the property calculator 305. Based on the reference property prestored in the reference property memory 823 and the information from the property recognizer 804, the property calculator 805 calculates an optimal property profile which allows the image processing mechanism 2 to optimally process the image. After that, the image processing mechanism 2 sends the image data to the image output mechanism 3 which then outputs an image on a recording sheet in accordance with the received image data.

Figure 40:
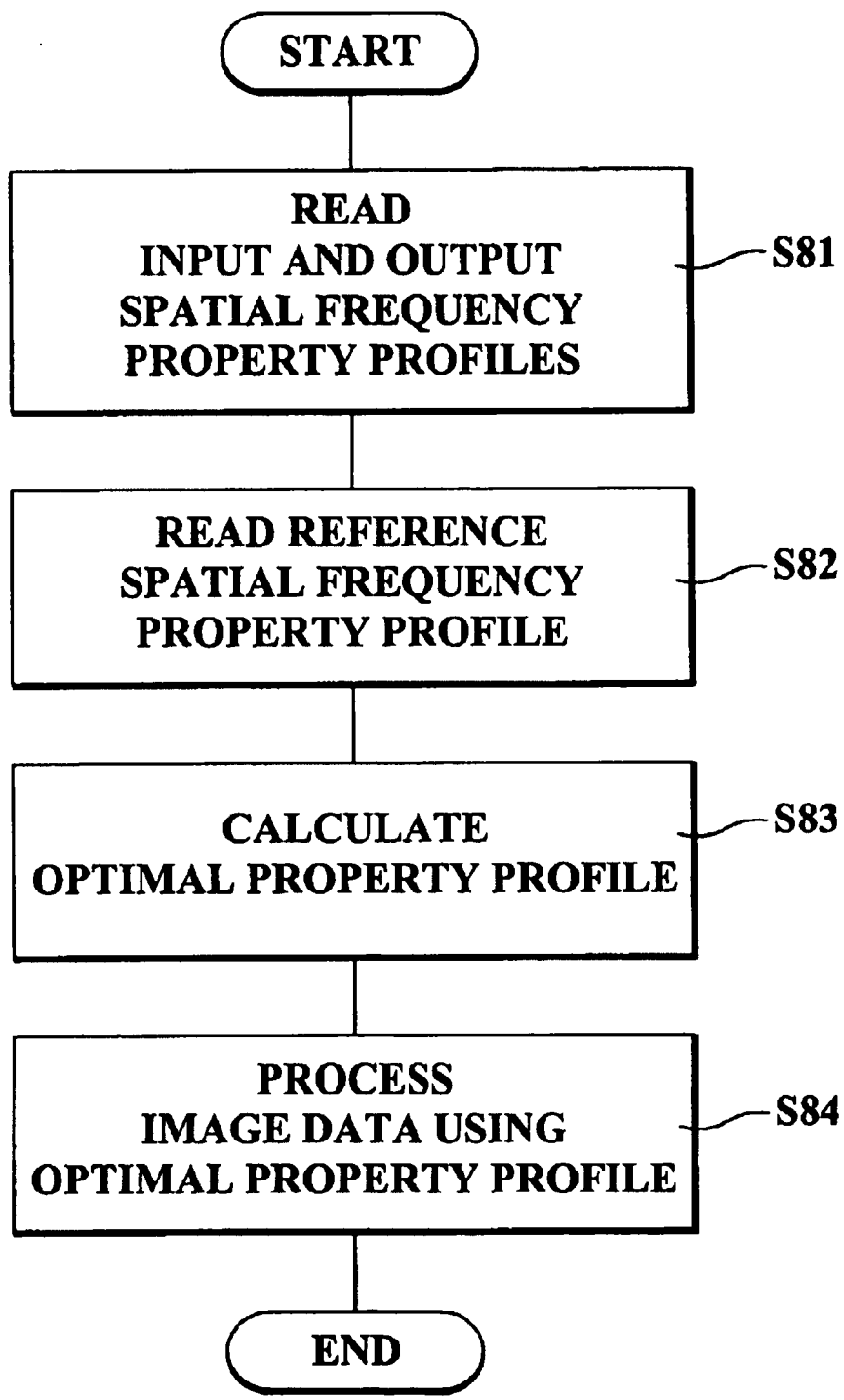
FIG. 40 is a flowchart for explaining an exemplary image forming operation of the image forming system of FIG. 39.

FIG. 40 shows an exemplary image processing operation of the above-described image forming apparatus 800. When the image forming apparatus 800 starts an image processing operation, the property recognizer 804 of the image processing unit 832 reads an input property profile (i.e., a scanner profile) of the input property manager 21 and an output property profile (i.e., a printer profile) of the output property manager 22, recognizes an input spatial frequency property of the image input unit 31 and an output spatial frequency property of the image output unit 33, and sends a signal representing these properties to the property calculator 805, in Step S81. Then, the property calculator 805 receives this signal and reads the reference spatial frequency property prestored in the reference property memory 823, in Step S82. Then, the property calculator 805 calculates an optimal property profile based on the received input and output frequency properties and the reference spatial frequency property, in Step S83. After that, in Step S84, the image processing mechanism 2 processes the image using the optimal property profile calculated in Step S83. Then, the process ends.

Figure 41:
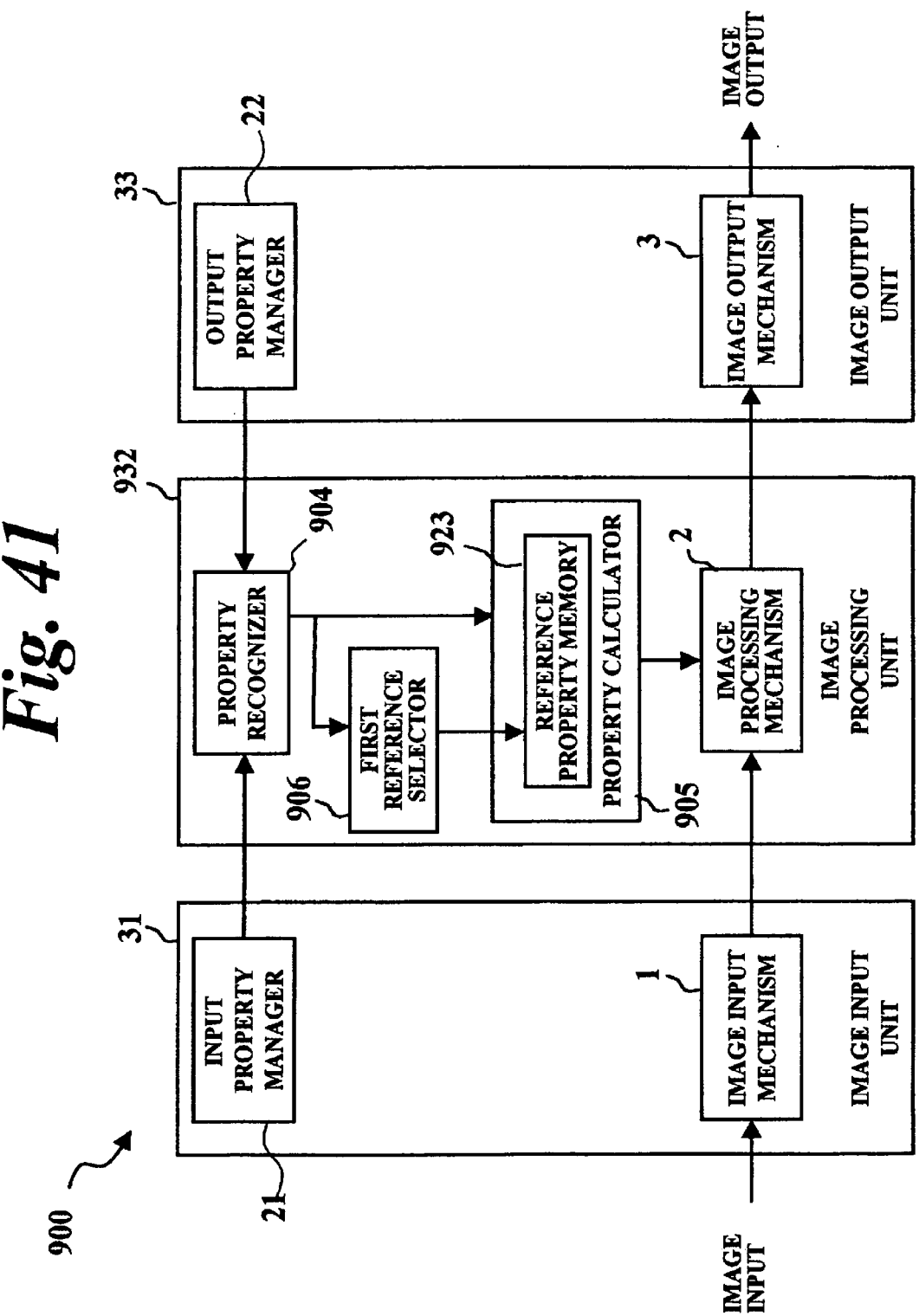
FIG. 41 is a schematic block diagram of an exemplary image forming system according to a ninth embodiment of the present invention.

Referring to FIG. 41, an image forming apparatus 900 according to a ninth embodiment of the present invention will be explained. The image forming apparatus 900 of FIG. 41 has a configuration similar to the image forming apparatus 800 of FIG. 39, except for an image processing unit 932. The basic data flows from the image input unit 31 to the image processing unit 932 and from the image processing unit 932 to the image output unit 33 are also similar to those of the image forming apparatus 800. Accordingly, a description provided below mostly concentrates on the structure and the operations of the image processing unit 932.

The image processing unit 932 or the image forming apparatus 900 shown in FIG. 39 is similar to the image processing unit 832 of the image forming apparatus 800 of FIG. 39, except for a first reference selector 906 and a property calculator 905. The property calculator 905 includes a plural reference property memory 923 which stores a plurality of reference property profiles with respect to the spatial frequency property, while the reference property memory 823 of the property calculator 805 of FIG. 39 stores only one reference property profile with respect to the spatial frequency property. The first reference selector 906 receives the input spatial frequency property information of the image input unit 31 and the output spatial frequency property of the image output unit 33 from the property recognizer 4 and, based on the received information, generates a signal for selecting one reference property profile from among the plurality of reference property profiles.

In the thus-configured image forming apparatus 900, the property recognizer 904 receives signals from the input property manager 21 of the image input unit 31 and the output property manager 22 of the image output unit 33, recognizes the input and output spatial frequency properties, and sends signals representing these properties to the first reference selector 906 and the property calculator 905. Based on these received signals, the first reference selector 906 generates a signal to send to the plural reference property memory 923 of the property calculator 905 to select one reference property profile from among the plurality of reference property profiles. Based on the thus-selected reference property profile and the information from the property recognizer 904, the property calculator 905 calculates an optimal property profile which allows the image processing mechanism 2 to optimally process the image. After that, the image processing mechanism 2 sends the image data to the image output mechanism 3 which then outputs an image on a recording sheet in accordance with the received image data.

Figure 42:
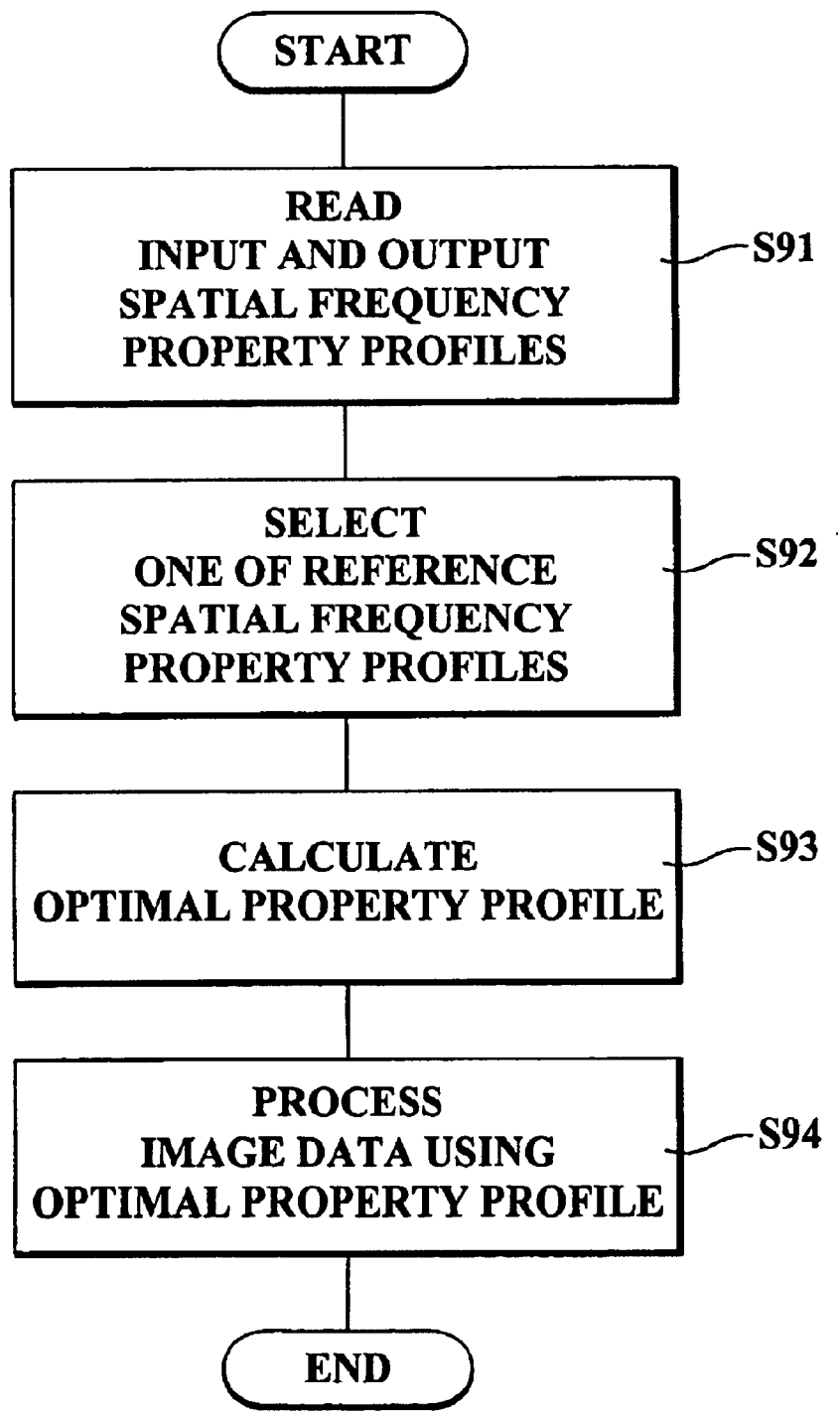
FIG. 42 is a flowchart for explaining an exemplary image forming operation of the image forming system of FIG. 41.

FIG. 42 shows an exemplary image processing operation of the above-described image forming apparatus 900. When the image forming apparatus 900 starts an image processing operation, the property recognizer 904 of the image processing unit 932 reads and recognizes an input spatial frequency property profile (i.e., a scanner profile) of the input property manager 21 and an output spatial frequency property profile (i.e., a printer profile) of the output property manager 22, in Step S91. Then, the first reference selector 906 selects one of the plurality of the reference property profiles stored in the reference property memory 923 so that the property calculator 905 reads and recognizes one reference spatial frequency property profile selected based on the property information of the above input and output spatial frequency property profiles, in Step S92. Then, the property calculator 905 calculates an optimal property profile based on the input and output spatial frequency property profiles and the selected reference spatial frequency property profile, in Step S93. After that, in Step S94, the image processing mechanism 2 processes the image using the optimal property profile calculated in Step S93. Then, the process ends.

Figure 43:
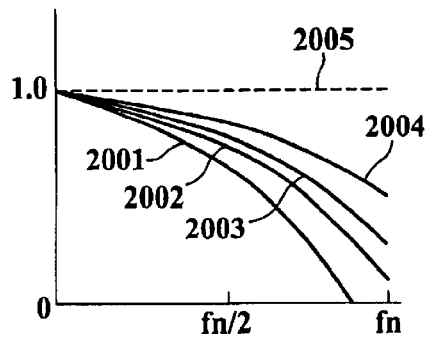
FIGS. 43–49 are illustrations for explaining ways of handling various input frequency properties and reference frequency properties.

FIG. 43 shows a graph presenting a plurality of exemplary input properties 2001–2004, having different input frequency properties with each other, in use for various types of image input units. In FIG. 43, the input property 2004 shows its features such that it suffers a relatively less degradation in the frequency property. After the input property 2004, the input properties 2003, 2002, and 2001, in this order, suffer the degradation of the input frequency property.

In order to make a description provided below readily understood, it is assumed that, in this example being explained, the image output unit 33, for example, has an output property 2005 which is flat throughout a Nyquist frequency range of from 0 to fn, as shown in FIG. 43.

The property recognizer 804, for example, reads and recognizes these input and output frequency properties by reading and interpreting the input and output property profiles of the image input and image output units 31 and 33, respectively.

Figure 44:
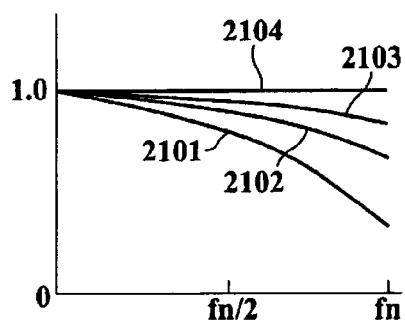

FIG. 44 shows a graph presenting a plurality of reference input properties 2101–2104 prestored in the reference property memory 823, for example. The property calculator 805, for example, reads and recognizes one of these properties. The reference input property 2104 has a frequency property of 100%, which means no degradation and means a level of 1.0 in the graph, throughout the Nyquist frequency range of from 0 to fn. The first reference property selector 906 is configured to select the reference input property 2104 when the image input unit 31 has the input property 2004 of FIG. 43. As the image input unit 31 suffers a degradation of the input property stepwise to the input properties 2003, 2002, and 2001 of FIG. 43, the first reference property selector 906 is configured to select the corresponding reference input properties 2103, 2102, and 2101, respectively.

In this example, the first reference property selector 906 is configured to select the reference input property 2104 so far as the image input unit 31 maintains the 20%-to-100% range of the input frequency property relative to the input frequency property 2104. But, if the range of the input frequency property relative to the input frequency property 2104 reduces below than 20%, the first reference property selector 906 is configured to select the next reference input property 2103. In this way, the first reference property selector 906 selects in turn the reference input properties 2104–2101.

Figure 45:
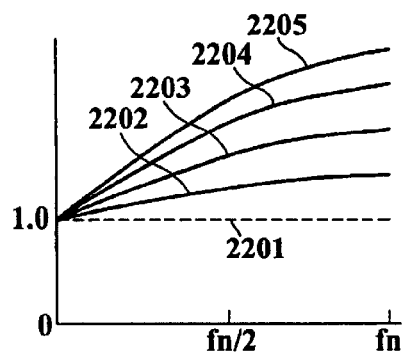
Figure 46:
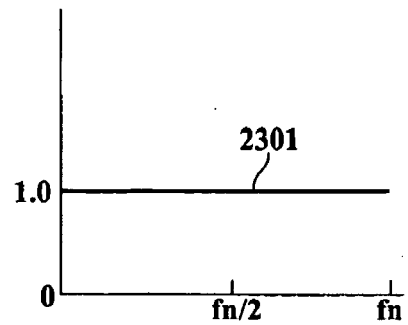

FIG. 45 shows a graph in which input properties 2202–2205, each having an input frequency property of above 100% (equals to 1.0 in the graph) throughout a Nyquist frequency range of from 0 to fn, wherein the image output unit 33, for example, has an output property 2201 which is flat throughout a Nyquist frequency range of from 0 to fn. These input properties may be produced when the image input unit 31 uses a filter, for example, for enhancing the input frequency property. In such as case, the first reference property selector 906 selects a reference property 3001 shown in FIG. 46, which is flat throughout a Nyquist frequency range of from 0 to fn.

Figure 47:
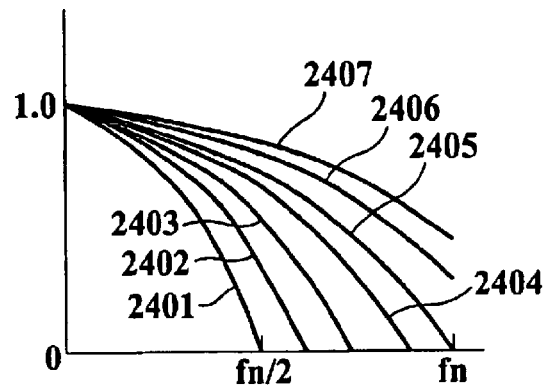
Figure 48:
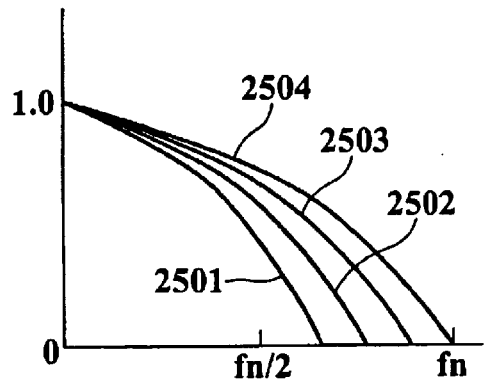
Figure 49:
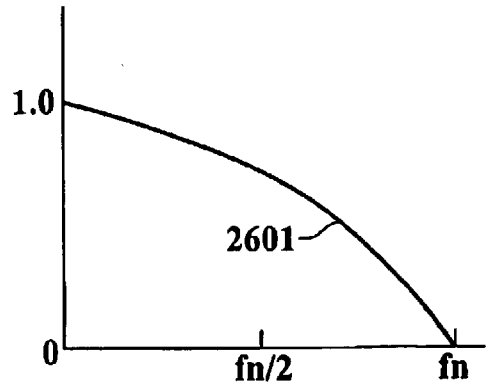

Referring to FIGS. 47–49, an operation for separately handling the character image area and the pattern image area using different filters is explained below. The character area is handled such that the degraded input frequency property of the image input unit 31 is corrected for. So, the first reference property selector 906 selects a reference property in accordance with the operations described above with reference to FIGS. 43–46. The pattern area is handled such that it avoids to generate a moire and, therefore, a reference input frequency property having a value lower than that used for the character area is used for the pattern area.

FIG. 47 shows a graph presenting a plurality of exemplary input properties 2401–2407, having different input frequency properties with each other, in use for various types of image input units. FIG. 48 shows a graph presenting a plurality of reference input properties 2501–2504 prestored in the reference property memory 823, for example. In this case, the first reference property selector 906 is configured to select the reference input property 2504 in response to the input properties 2405, 2406, and 2407, which are higher than the input property 2404.

Further, in this case, the first reference property selector 906 is configured to select a reference input property, such as the reference input properties 2503, 2502, or 2501, lower than the reference input property 2504 in response to the image data of an image input unit having an input frequency property, such as the input properties 2403, 2402, or 2401, lower than the input property 2404. In addition, as the image input unit 31 suffers a degradation of the input property stepwise to the input properties 2403, 2402, and 2401 of FIG. 47, the first reference property selector 906 is configured to select the corresponding reference input properties 2503, 2502, and 2501, respectively. In this way, it is possible to avoid an occurrence of a production of an inferior image caused when the image input unit 31 uses an excessively enhancing filter for correcting a relatively lower input frequency property.

Referring to FIG. 49, another operation of the first reference property selector 906 is explained. In this operation, the first reference property selector 906 selects a lower reference input frequency property lower than the one to be used for the character area when handling a pattern area so as not to produce a moire on the screened-print image. In this case, the input frequency properties of the image input unit 31 are as shown in FIG. 47 and a plurality of reference input properties prestored in the reference property memory 923 are as shown in FIG. 49. For the sake of simplicity, the reference input property 2601 of FIG. 49 is defined as the same property as the input property 2405 of FIG. 47, for example.

In this case, the first reference property selector 906 is configured to select the reference input property 2601 of FIG. 49 in response to the image data of an image input unit having an input frequency property equal to the reference input property 2601 or higher than the reference input property 2601, such as the input properties 2405, 2406, or 2407 of FIG. 47. Further, in this case, the first reference property selector 906 is configured to select no reference input property so that the filtering process is avoided in response to the image data of an image input unit having an input frequency property lower than the reference input property 2601, such as the input properties 2403, 2402, or 2401 of FIG. 47.

In this way, the image forming apparatus 900 recognizes the input-and-output-overlaid spatial frequency property based on the input spatial frequency property from the input spatial frequency property information and the output spatial frequency property from the output spatial frequency property information and compares it with a reference property. As a result of comparison, the image forming apparatus 900 avoid the operation of the filter optimization or the filter process when the recognized spatial frequency property is lower than the reference property. In a case when the recognized spatial frequency property is not lower than the reference property, the image forming apparatus 900 performs the operation of the filter optimization and, based on this filter optimization operation, carries out the filter process. By such a filtering operation, the image forming apparatus 900 can avoid an event in which the frequency property becomes a high frequency enhancing property by the optimized filtering process during the handling of the pattern area such as the screened-print image. Thus, the forming apparatus 900 can produce an image in a relatively high quality.

In addition, it may be efficient to compare the frequency property to the reference frequency property throughout the frequency range or in a relatively high frequency range in connection with the above descriptions with reference to FIGS. 43–49.

Figure 50:
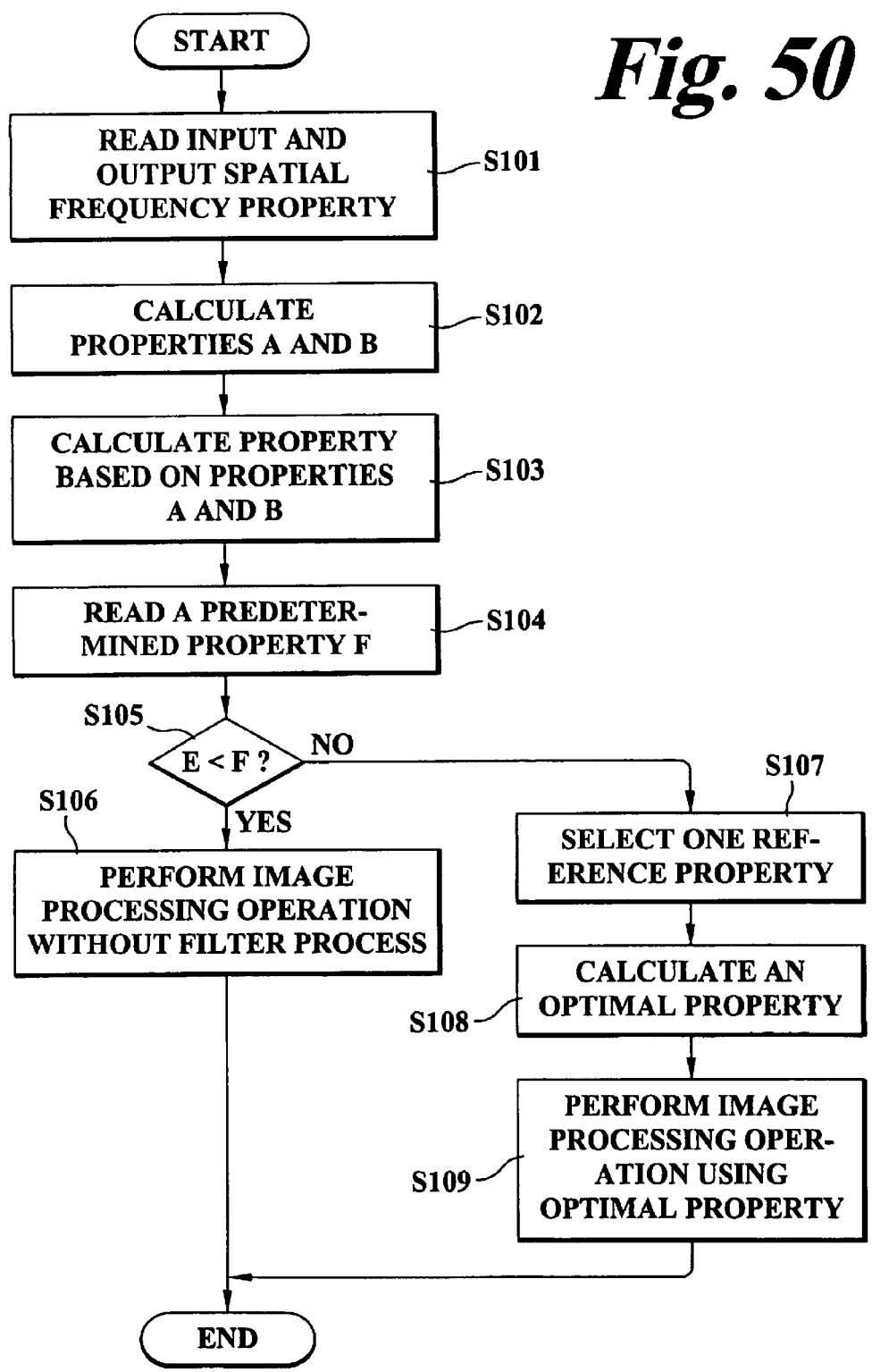
FIG. 50 is a flowchart for explaining an exemplary image forming operation which handles the frequency property of FIGS. 43–49.

An exemplary flow of the above-described operation is explained in the flowchart of FIG. 50. In Step S101 of the flowchart of FIG. 50, the property recognizer 904 reads the property information of the image output unit 31 and the image output unit 33 and recognizes the input spatial frequency property and the output spatial frequency property. Further, in Step S101, the property recognizer 904 sends signals representing the input spatial frequency property and the output spatial frequency property to the first reference selector 906 and the property calculator 905. In Step S102, the first reference selector 906 calculates an input spatial frequency property A based on the input spatial frequency property and an output spatial frequency property B based on the output spatial frequency property. In Step S103, the first reference selector 906 calculates an input and output spatial frequency property E by adding A to B. In Step S104, the first frequency selector 906 reads a predetermined property F. Then, the process ends.

Then, in Step S105, the first reference selector 906 checks if the calculated input and output spatial frequency property E is smaller than the predetermined property F. If the calculated input and output spatial frequency property E is smaller than the predetermined property F and the check result of Step S105 is YES, the first reference selector 906 so notifies the property calculator 905 and the process proceeds to Step S106. In Step S106, the property calculator 905 instructs the image processing mechanism 2 to perform the image processing operation without executing the filtering operations. Then, the process ends.

If the input and output spatial frequency property E is not lower than the predetermined property F and the check result of Step S105 is NO, the first reference property selector 906 so notifies the property calculator 905 and the process proceeds to Step S107. In Step S107, the first reference property selector 906 selects a referenced spatial frequency property from among the plurality of the reference properties prestored in the plural reference property memory 923.

Then, in Step S108, the property calculator 905 calculates an optimal spatial frequency property which is used by the image processing mechanism 2, based on the information representing the input spatial frequency property and the output spatial frequency property sent from the property recognizer 904 and the reference spatial frequency property selected by the first reference property selector 906. Further, in Step 108, the property calculator 905 sends the thus-obtained optimal spatial frequency property to the image processing mechanism 2. In Step 109, the image processing mechanism 2 perform the image processing operation using the optimal spatial frequency property. Then, the process ends.

Figure 51:
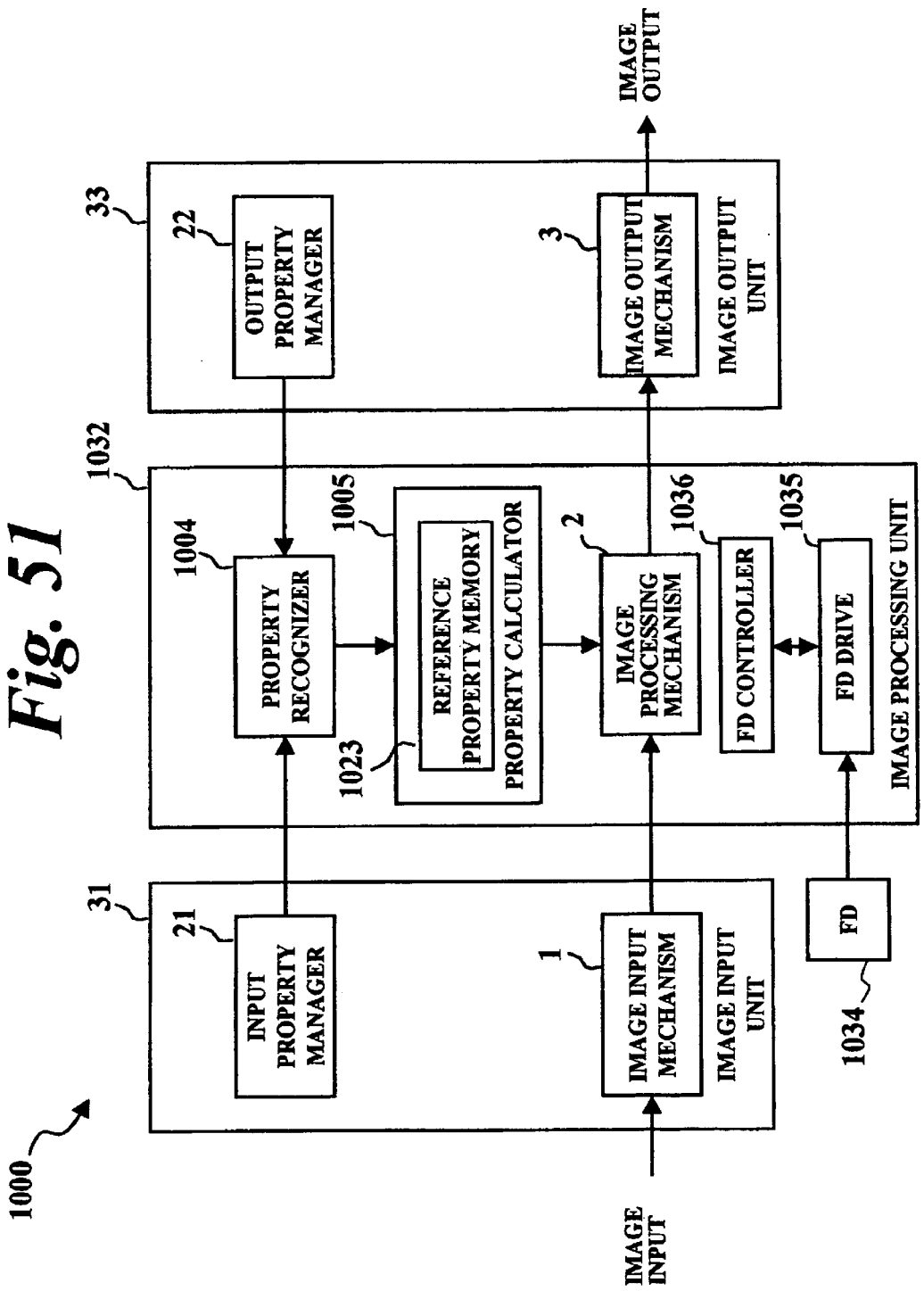
FIG. 51 is a schematic block diagram of an exemplary image forming system according to a tenth embodiment of the present invention.

These input and output property handling operations described above with reference to the flowcharts of FIGS. 2, 5, 7, 9, 16, 18, 42, and 50 can be contained in a form of a computer data on a computer data medium which can be loaded to the image forming apparatus. FIG. 51 shows an exemplary structure of an image forming apparatus 1000 according to a tenth embodiment of the present invention.

The image forming apparatus 1000 of FIG. 51 is similar to that of FIG. 1, except for an image processing unit 1032. The image processing unit 1032 include a property recognizer 1004, a property calculator 1005 including a reference property memory 1023, an image processing mechanism 1002, a floppy disk drive 1035, and a controller 1036. The software implementable functions of the property recognizer 4, the property calculator 5, and the image processing mechanism 2 of the image processing unit 32 of the image forming apparatus 100 are removed therefrom and, thus, the property recognizer 1004, the property calculator 1005, and the image processing mechanism 1002 are made.

The floppy disk drive 1035 reads data including software programs written on a floppy disk 34, for example, under control of the controller 1036. The read data including software programs are respectively sent to the property recognizer 1004, the property calculator 1005, and the image processing mechanism 1002 so that these components can operate functions of the property recognizer 4, the property calculator 5, and the image processing mechanism 2 of the image processing unit 32 of the image forming apparatus 100.

Alternative to the floppy disk 34, other computer data medium, such as ROM, a RAM, an IC card, a hard disk, a CD-ROM, an optical disk, or the like, containing the above-mentioned software programs can be used. In this case, a reading mechanism for reading such an alternative computer data mechanism needs to be installed in the image processing unit 1032 accordingly.

Also, the above-described structure of this program loading from a computer data medium can be implemented in a similar amount to other embodiments such as the image forming apparatuses 200–900.

Figure 52:
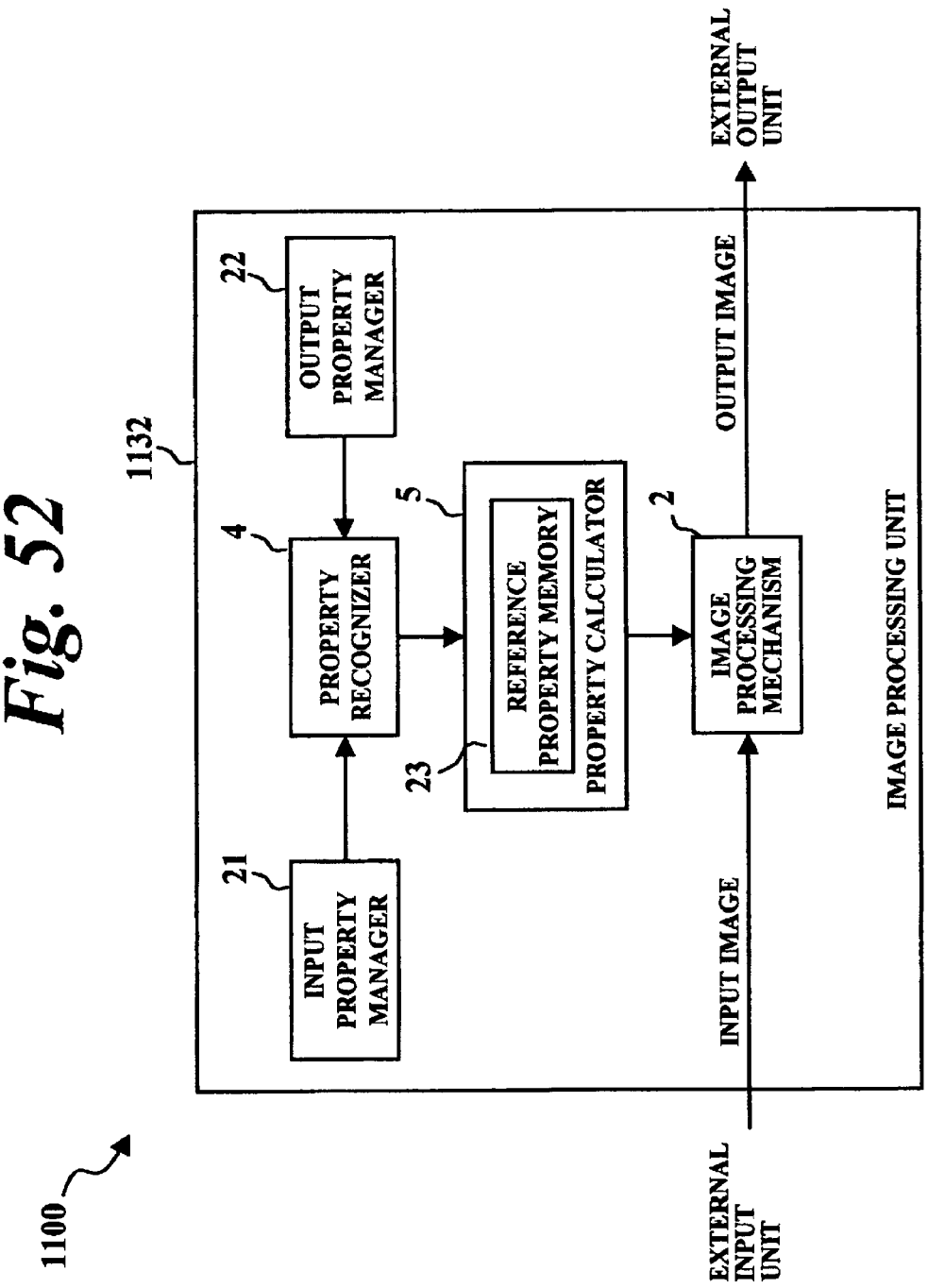
FIG. 52 is a schematic block diagram of an exemplary image forming system according to an eleventh embodiment of the present invention.

Referring to FIG. 52, an image forming apparatus 1100 according to an eleventh embodiment of the present invention is explained. The image forming apparatus 1100 of FIG. 52 has a configuration similar to the image forming apparatus 100 of FIG. 1, except for an image processing unit 1132. In addition to the configuration of the image processing unit 32, the image processing unit 1132 includes the input property manager 21 of the image input unit 31 and the output property manager 22 of the image output unit 33. The basic data flows of image data from an external input unit (i.e., the image input unit 31), not shown, to the image processing mechanism 2 and from the image processing mechanism 2 to an external output unit (i.e., the image output unit 33), not shown, are also similar to those of the image forming apparatus 100. Accordingly, a description provided below mostly concentrates on the structure and the operations or the image processing unit 1132.

In the thus-configured image forming apparatus 1100, the property recognizer 4 receives signals from the input property manager 21 and the output property manager 22, recognizes types and values of the input and output property profiles, and sends signals representing these types and values to the property calculator 5 which then reads a reference property profile from the reference property memory 23. Based on these received property information and the reference property profile, the property calculator 5 calculates an optimal property profile which allows the image processing mechanism 2 to optimally process the image input from the external image input unit. After that, the image processing mechanism 2 sends the image data to the external output unit which then outputs an image on a recording sheet in accordance with the received image data.

Figure 53:
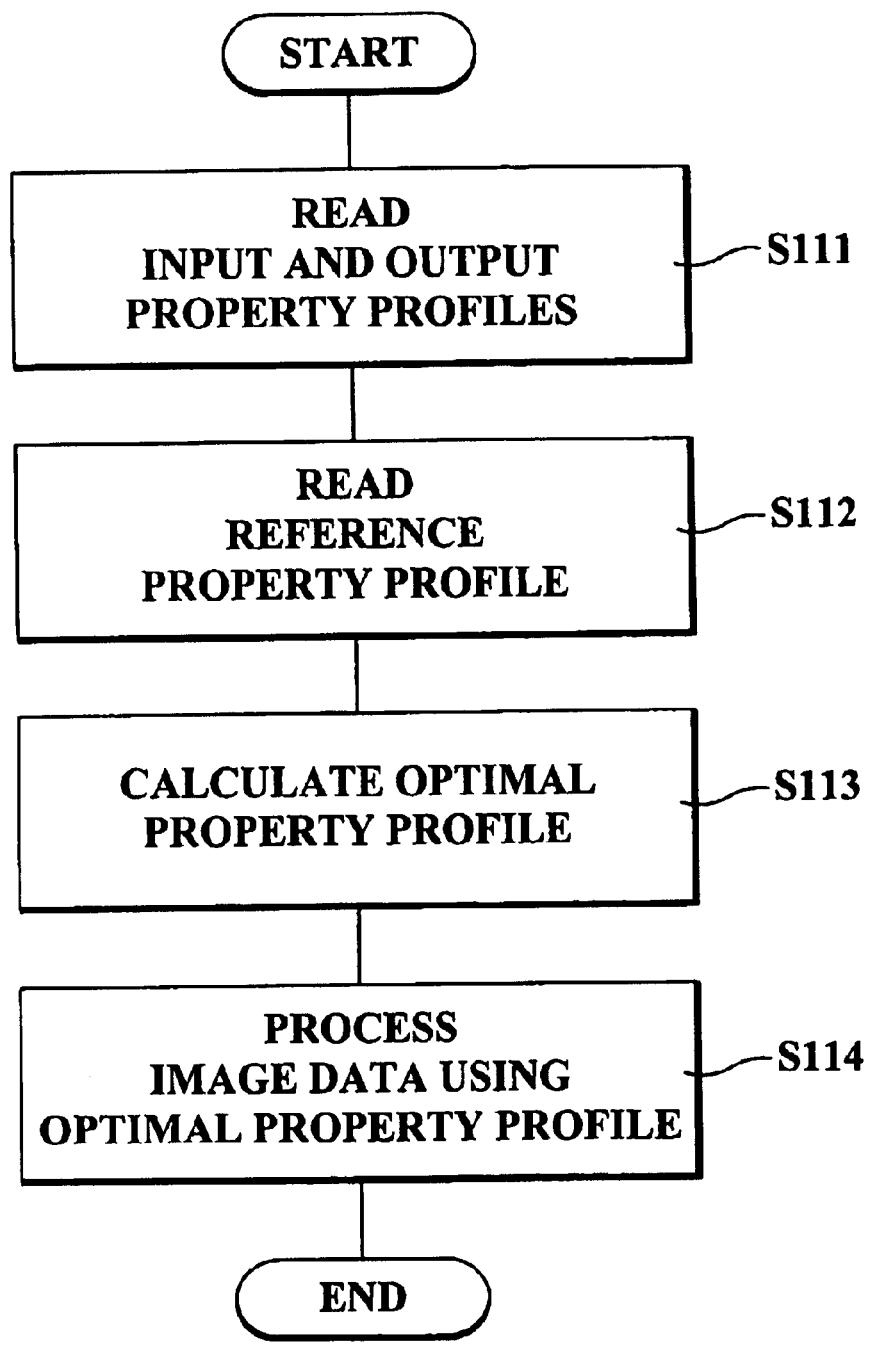
FIG. 53 is a flowchart for explaining an exemplary image forming operation of the image forming system of FIG. 52.

FIG. 53 shows an exemplary image processing operation of the above-described image forming apparatuses 1100. When the image forming apparatus 1100 starts an image processing operation, the property recognizer 4 of the image processing unit 1132 reads and recognizes an input property profile (i.e., a scanner profile) of the input property manager 21 and an output property profile (i.e., a printer profile) of the output property manager 22, in Step S111. Then, the property calculator 5 reads and recognizes reference property information prestored in the reference property memory 23, in Step S112. Then, the property calculator 5 calculates an optimal property profile based on the input and output property profiles and the reference property profile, in Step S113. After that, in Step S114, the image processing mechanism 2 processes the image using the information of the optimal property profile calculated in Step S113. Then, the process ends.

Figure 54:
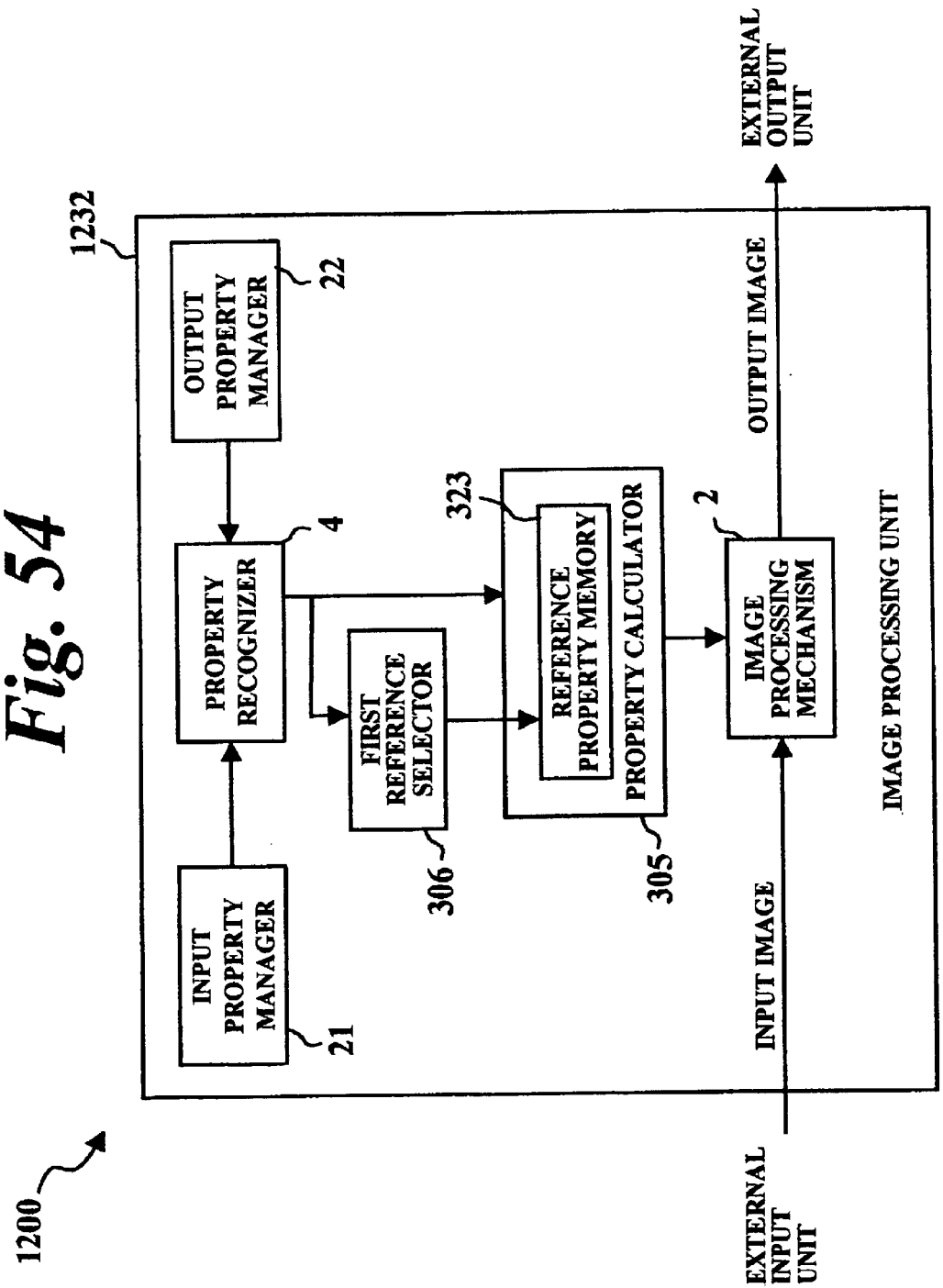
FIG. 54 is a schematic block diagram of an exemplary image forming system according to a twelfth embodiment of the present invention.

Referring to FIG. 54, an image forming apparatus 1200 according to a twelfth embodiment of the present invention is explained. The image forming apparatus 1200 of FIG. 54 has a configuration similar to the image forming apparatus 300 of FIG. 4, except for an image processing unit 1232. In addition to the configuration of the image processing unit 332, the image processing unit 1232 includes the input property manager 21 of the image input unit 31 and the output property manager 22 of the image output unit 33. The basic data flows of image data from an external input unit (i.e., the image input unit 31), not shown, to the image processing mechanism 2 and from the image processing mechanism 2 to an external output unit (i.e., the image output unit 33), not shown, are also similar to those of the image forming apparatus 300. Accordingly, a description provided below mostly concentrates on the structure and the operations of the image processing unit 1232.

In the thus-configured image forming apparatus 1200, the property recognizer 4 receives signals from the input property manager 21 and the output property manager 22, recognizes types and values of the input and output property profiles, and sends signals representing these types and values to the first reference selector 306 and the property calculator 305. Based on the received signals, the first reference selector 306 selects one of the plurality of reference property profiles stored in the reference property memory 323. Then, the property calculator 305 reads the reference property profile selected by the first reference profile selector 306. Based on these received property information and the reference property profile, the property calculator 305 calculates an optimal property profile which allows the image processing mechanism 2 to optimally process the image input from the external image input unit. After that, the image processing mechanism 2 sends the image data to the external output unit which then outputs an image on a recording sheet in accordance with the received image data.

Figure 55:
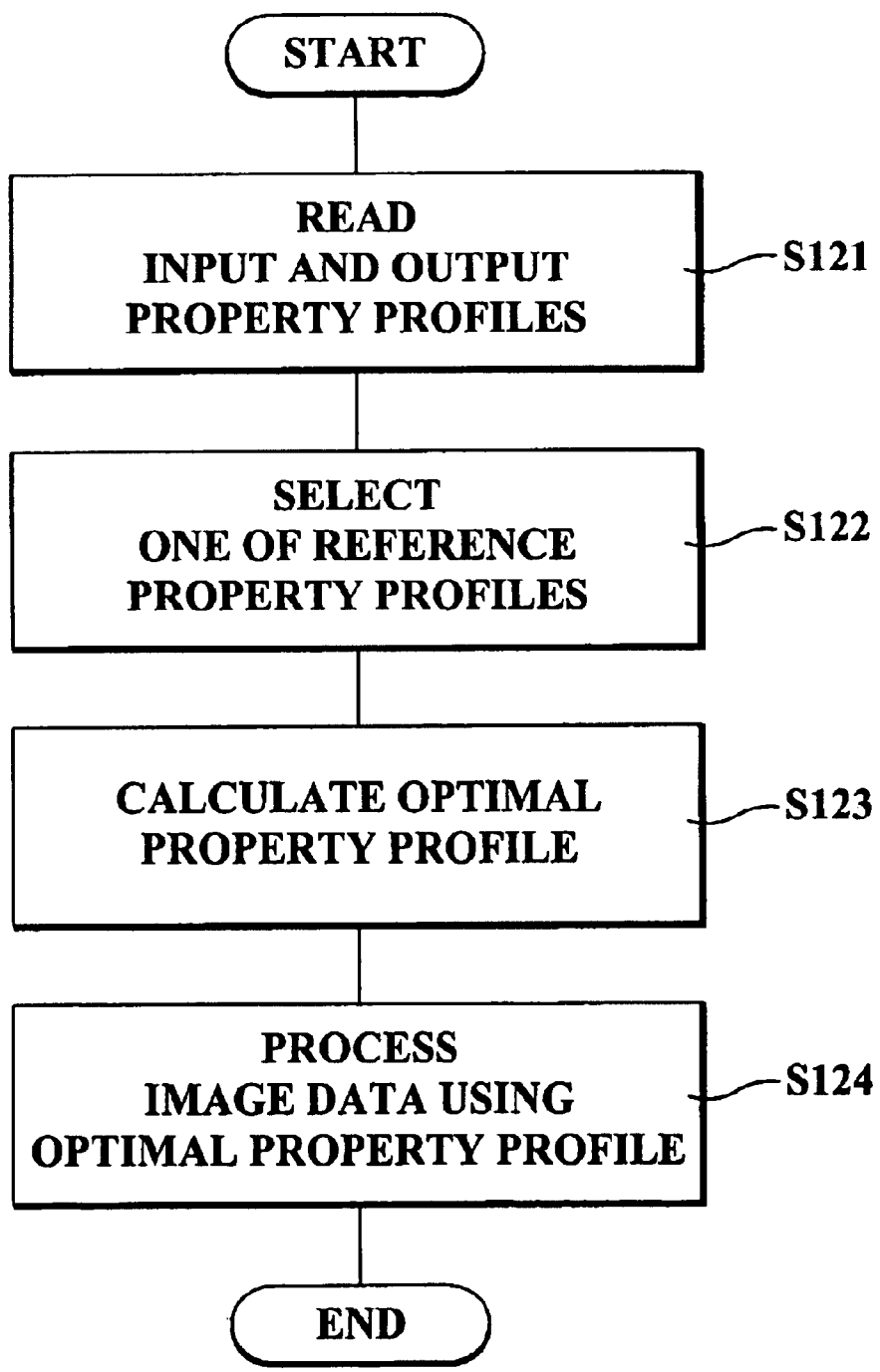
FIG. 55 is a flowchart for explaining an exemplary image forming operation of the image forming system of FIG. 54.

FIG. 55 shows an exemplary image processing operation of the above-described image forming apparatus 1200. When the image forming apparatus 1200 starts an image processing operation, the property recognizer 4 of the image processing unit 1232 reads and recognizes an input property profile (i.e., a scanner profile) of the input property manager 21 and an output property profile (i.e., a printer profile) of the output property manager 22, in Step S121. Then, the first reference selector 306 selects one of the plurality of the reference property profiles stored in the reference property memory 323 so that tha property calculator 305 reads and recognizes one reference property profile selected by the first reference selector 306 based on the property information of the above input and output property profiles, in Step S122. Then, the property calculator 305 calculates an optimal property profile based on the input and output property profiles and the selected reference property profile, in Step S123. After that, in Step S124, the image processing mechanism 2 processes the image using the optimal property profile calculated in Step S123. Then, the process ends.

Figure 56:
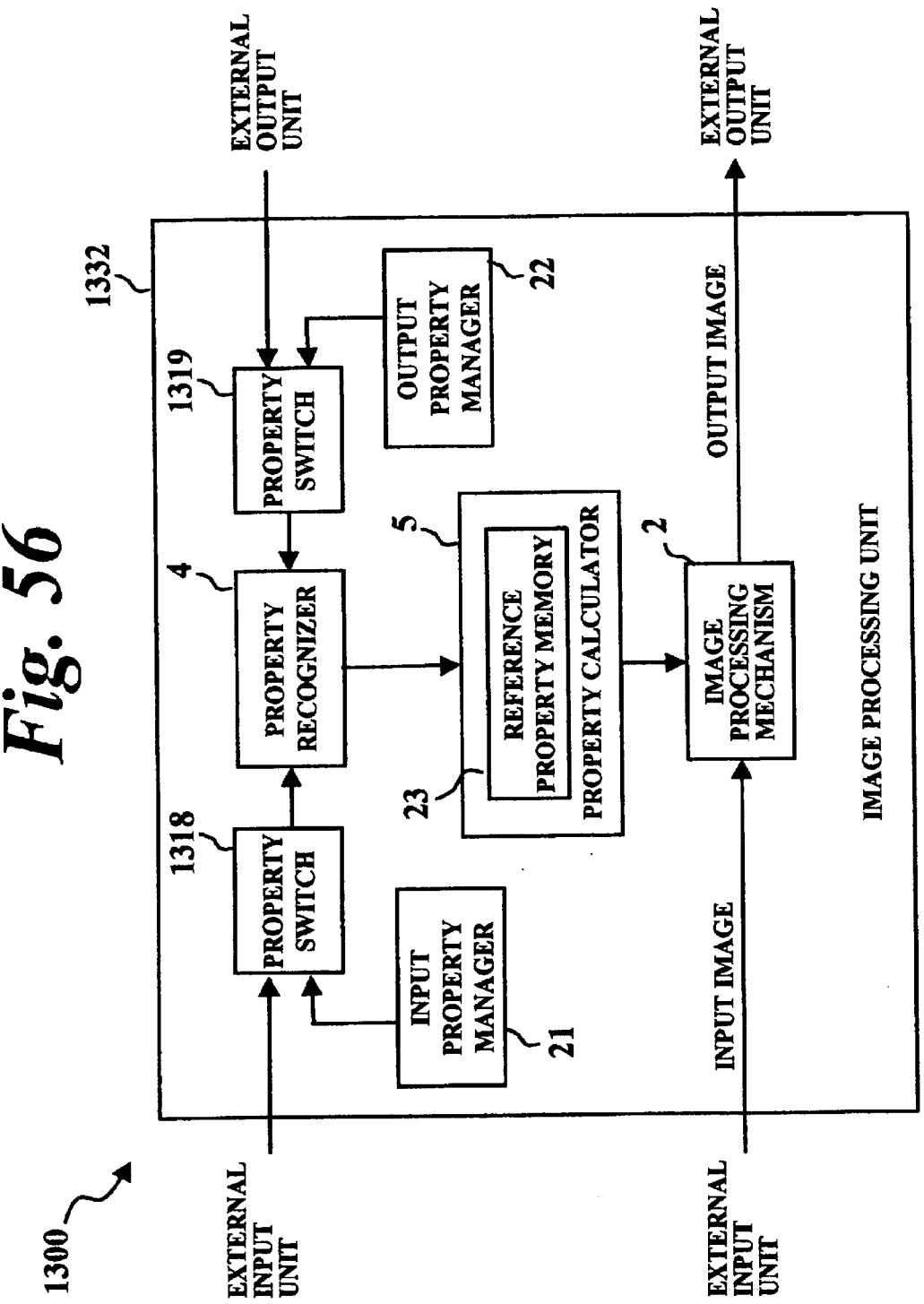
FIG. 56 is a schematic block diagram of an exemplary image forming system according to a thirteenth embodiment of the present invention.

Referring to FIG. 56, an image forming apparatus 1300 according to a thirteenth embodiment of the present invention is explained. The image forming apparatus 1300 of FIG. 56 has configured similar to the image forming apparatus 1100 of FIG. 52, except for an image processing unit 1332. In addition to the configuration of the image processing unit 1132, the image processing unit 1332 includes property switches 1318 and 1319. The property switch 1318 receives input property profiles sent from an external input unit (i.e., the image input unit 31), not shown, and the input property manager 21 and selects one of these profiles to send to the property recognizer 4. The property switch 1319 receives output property profiles sent from an external output unit (i.e., the image input unit 31), not shown, and the output one of these profiles to send to the property recognizer 4. The basic data flows of image data from an external input unit (i.e, the image input unit 31), not shown, to the image processing mechanism 2 and from the image processing mechanism 2 to an external output unit (i.e., the image output unit 33), not shown, are also similar to those of the image forming apparatus 100. Accordingly, a description provided below mostly concentrates on the structure and the operations of the image processing unit 1332.

In the thus-configured image forming apparatus 1300, the property recognizer 4 receives an input property profile from the property switch 1318 and an output property profile from the property switch 1319, recognizes types and values of the input and output property profiles, and sends signals representing these types and values to the property calculator 5 which then reads a reference property profile from the reference property memory 23. Based on these received property information and the reference property profile, the property calculator 5 calculates an optimal property profile which allows the image processing mechanism 2 to optimally process the image input from the external image input unit. After that, the image processing mechanism 2 sends the image data to the external output unit which then outputs an image on a recording sheet in accordance with the received image data.

Figure 57:
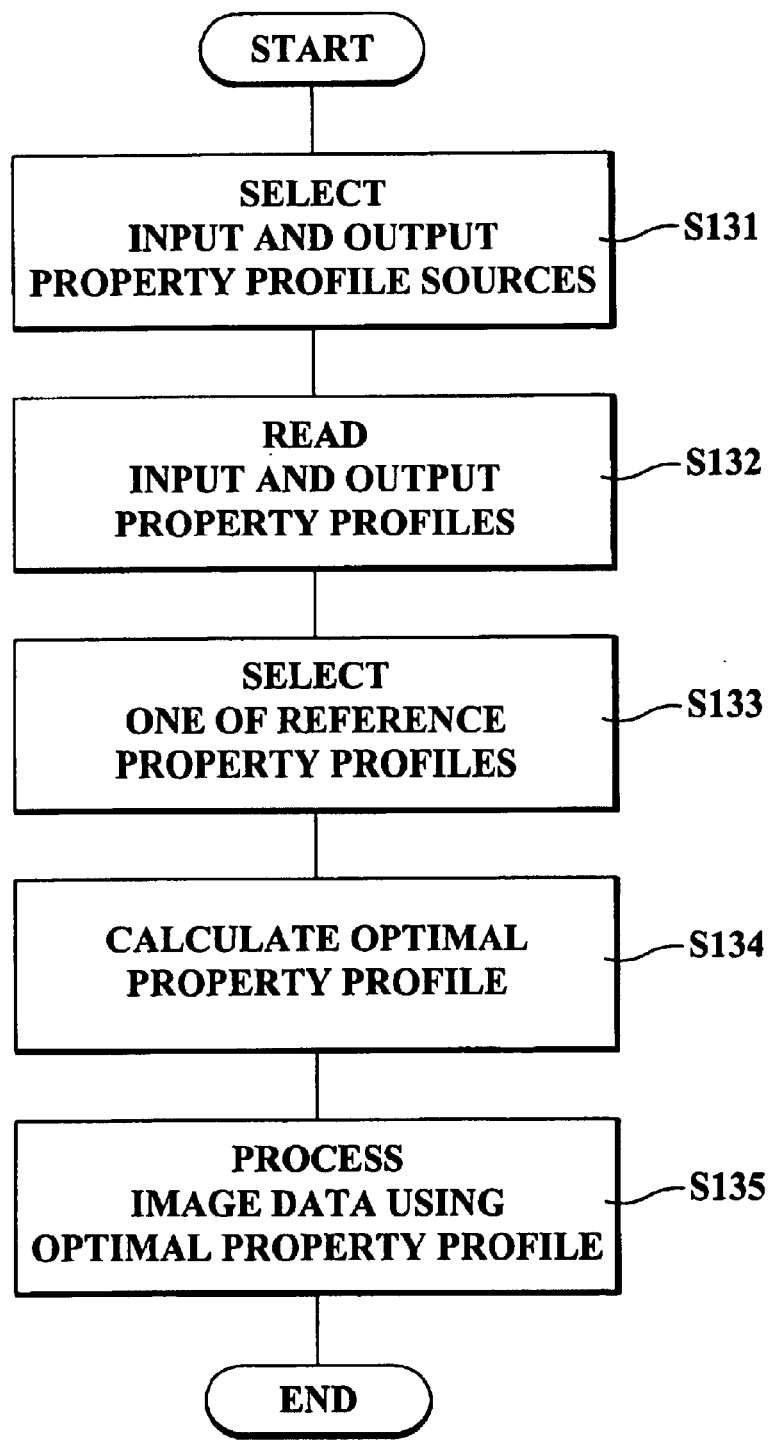
FIG. 57 is a flowchart for explaining an exemplary image forming operation of the image forming system of FIG. 56.

FIG. 57 shows an exemplary image processing operation of the above-described image forming apparatus 1300. When the image forming apparatus 1300 starts an image processing operation, the property switch 1318 selects one of the input property profiles sent from the external input unit and the input property manager 21, Step S131. Also, in Step S131, the property switch 1319 selects one of the output property profiles sent from the external output unit and the output property manager 22. Then, the property recognizer 4 of the image processing unit 1332 reads and recognizes an input property profile (i.e., a scanner profile) sent from the property switch 1318 and an output property profile (i.e., a printer profile) sent from the property switch 1319, in Step S132. Then, the property calculator 5 reads and recognizes reference property information prestored in the reference property memory 23, in Step S133. Then, the property calculator 5 calculates an optimal property profile based on the input and output property profiles and the reference property profile, in Step S134. After that, in Step S135, the image processing mechanism 2 processes the image using the information of the optimal property profile calculated in Step S134. Then, the process ends.

Figure 58:
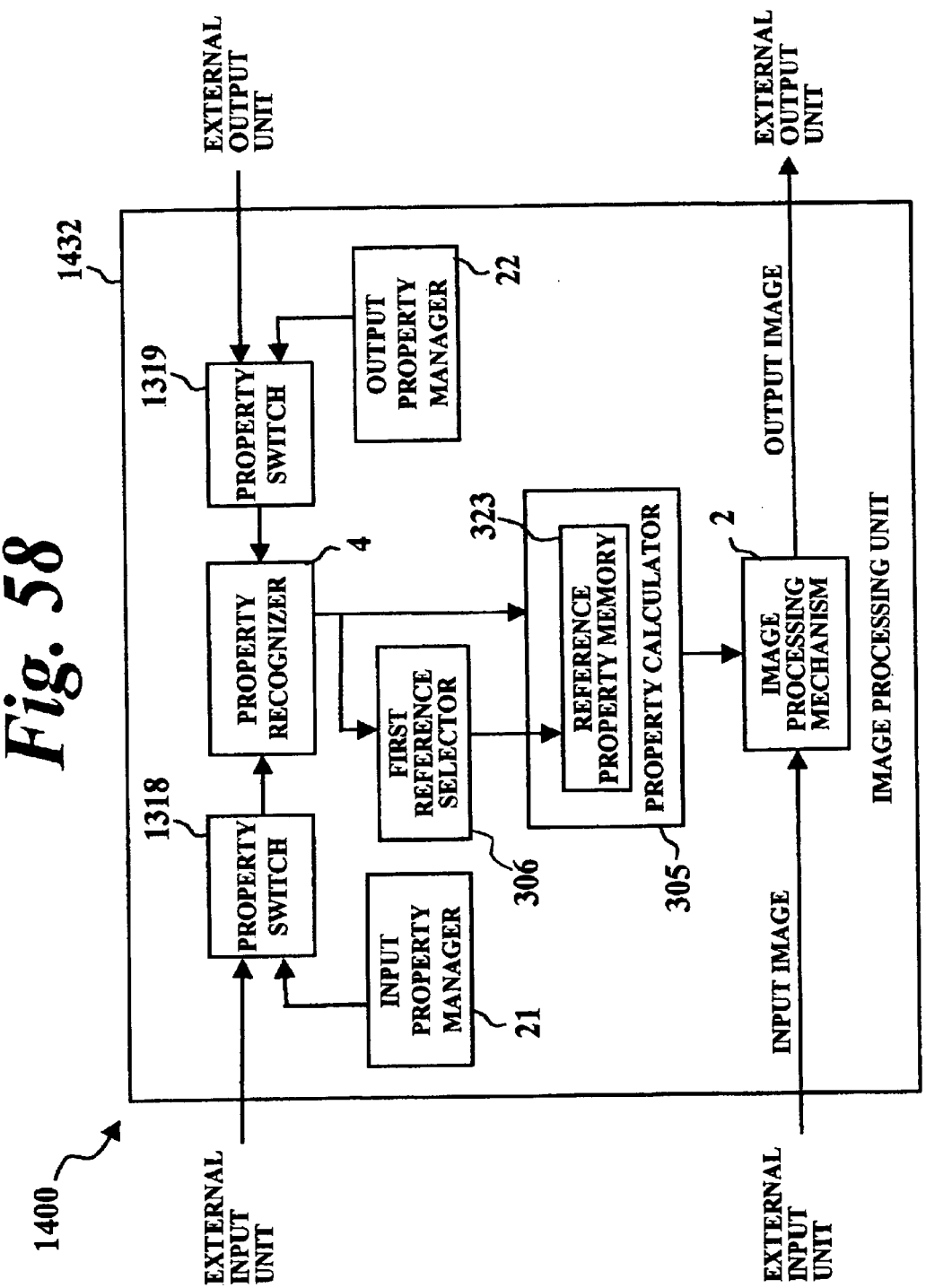
FIG. 58 is a schematic block diagram of an exemplary image forming system according to a fourteenth embodiment of the present invention.

Referring to FIG. 58, an image forming apparatus 1400 according to a fourteenth embodiment of the present invention is explained. The image forming apparatus 1400 of FIG. 58 has a configuration similar to the image forming apparatus 1200 of FIG. 54, except for an image processing unit 1432. In addition to the configuration of the image processing unit 1232, the image processing unit 1432 includes the property switches 1318 and 1319 of the image forming apparatus 1300 of FIG. 56. The basic data flows of image data from an external input unit (i.e., the image input unit 31), not shown, to the image processing mechanism 2 and from the image processing mechanism 2 to an external output unit (i.e., the image output unit 33), not shown, are also similar to those of the image forming apparatus 1200. Accordingly, a description provided below mostly concentrates on the structure and the operations of the image processing unit 1432.

In the thus-configured image forming apparatus 1400, the property recognizer 4 receives an input property profile from the property switch 1318 and an output property profile from the property switch 1319, recognizes types and values of the input and output property profiles, and sends signals representing these types and values to the first reference selector 306 and the property calculator 305. Based on the received signals, the first reference selector 306 selects one of the plurality of reference property profiles stored in the reference property memory 323. Then, the property calculator 305 reads the reference property profile selected by the first reference profile selector 306. Based on these received property information and the reference property profile, the property calculator 305 calculator an optimal property profile which allows the image processing mechanism 2 to optimally process the image input from the external image input unit. After that, the image processing mechanism 2 sends the image data to the external output unit which then outputs an image on a recording sheet in accordance with the received image data.

Figure 59:
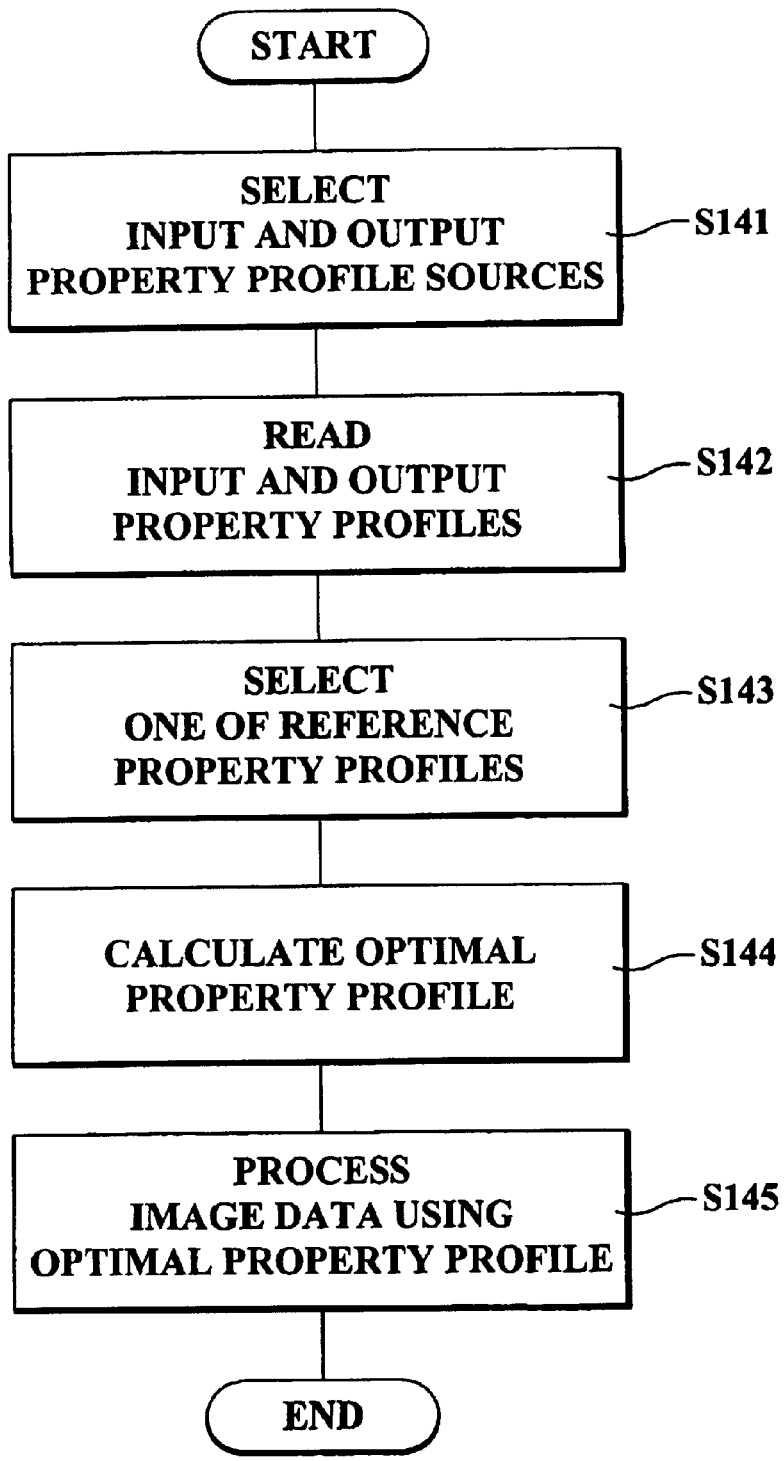
FIG. 59 is a flowchart for explaining an exemplary image forming operation of the image forming system of FIG. 58.

FIG. 59 shows an exemplary image processing operation of the above-described image forming apparatus 1400. When the image forming apparatus 1400 starts an image processing operation, the property switch 1318 selects one of the input property profiles sent from the external input unit and the input property manager 21, Step S141. Also, in Step S141, the property switch 1319 selects one of the output property profiles sent from the external output unit and the output property manager 22. Then, the property recognizer 4 of the image processing unit 1432 reads and recognizes an input property profile (i.e., a scanner profile) of the input property manager 21 and an output property profile (i.e., a printer profile) of the output property manager 22, in Step S142. Then, the first reference selector 306 selects one of the plurality of the reference property profiles stored in the reference property memory 323 so that the property calculator 305 reads and recognizes one reference property profile selected by the first reference selector 306 based on the property information of the above input and output property profiles, in Step S143. Then, the property calculator 305 calculates an optimal property profile based on the input and output property profiles and the selected reference property profile, in Step S144. After that, in Step S145, the image processing mechanism 2 processes the image using the optimal property profile calculated in Step S144. Then, the process ends.

These input and output property handling operations described above with reference to the flowcharts of FIGS. 53, 55, 57, and 59 can be contained in a form of a computer data on a computer data medium which can be loaded to the image forming apparatus. FIG. 60 shows an exemplary structure of an image forming apparatus 1500 according to a fifteenth embodiment of the present invention.

The image forming apparatus 1500 of FIG. 60 is similar to the image forming apparatus 1000 of FIG. 51, except for an image processing unit 1532. In addition to the configuration of the image processing unit 1032, the image processing unit 1532 includes the input property manager 21 of the image input unit 31 and the output property manager 22 of the image output unit 33. The basic data flows of image data from an external input unit (i.e., the image input unit 31), not shown, to the image processing mechanism 2 and from the image processing mechanism 2 to an external output unit (i.e., the image output unit 33), not shown, are also similar to those of the image forming apparatus 100. Accordingly, a description provided below mostly concentrates on the structure and the operations of the image processing unit 1532.

On the thus-configured image processing apparatus 1500, the floppy disk drive 1035 reads data including software programs written on a floppy disk 34, for example, under control of the controller 1036. The read data including software programs are respectively sent to the property recognizer 1004, the property calculator 1005, and the image processing mechanism 1002 so that these components can operate functions of the property recognizer 4, the property calculator 5, and the image processing mechanism 2 of the image processing unit 1032 of the image forming apparatus 1000.

Alternative to the floppy disk 34, other computer data medium, such as a ROM, a RAM, an IC card, a hard disk, a CD-ROM, an optical disk, or the like, containing the above-mentioned software programs can be used. In this case, a reading mechanism for reading such an alternative computer data medium needs to be installed in the image processing unit 1532 accordingly.

Also, the above-described structure for this program loading from a computer data medium can be implemented in a similar manner to other embodiments such as the image forming apparatuses 1200–1400.

In addition, the image input unit, the image processing unit, and the image output unit of the image forming apparatuses described above may be separately installed in a network environment to form a shared image forming system in a manner similar to the image forming system 200 of FIG. 3.

This invention may be conveniently implemented using a convention general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnection an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An image forming system, comprising:
an image input apparatus having an input property profile and configured to read an image from an image source and to convert said image into image data using said input property profile;
an image processing apparatus configured to execute an image processing operation relative to said image data converted by said image input apparatus; and
an image output apparatus having an output property profile and configured to output an image using said output property profile in accordance with said image data processed through said image processing operation executed by said image processing apparatus,
wherein said image processing apparatus comprises:
a property recognizer configured to read and recognize an input property profile of said image input apparatus and an output property profile of said image output apparatus;
a memory configured to prestore a reference property profile; and
a property calculator configured to calculate an optimal property based on said input property profile, said output property profile and said reference property profile, said image processing apparatus executing said image processing operation using said optimal property, wherein the image forming system further comprising a reference selector configured to receive said input and output property profiles from said property recognizer, and wherein said memory is configured to prestore a plurality of reference property profiles, said reference selector configured to select one of said plurality of reference property profiles prestored in said memory based on said input and output property profiles sent from said property recognizer, and said property calculator is configured to calculate said optimal property based on said input and output property profile and said selected reference property profile.

2. The image forming system as defined in claim 1, wherein said image input apparatus is configured to specify an input image mode and said image output apparatus is configured to specify an output image mode,
said image forming system further comprising an image mode recognizer configured to read and recognize at least one of said input image mode specified by said image input apparatus and said output image mode specified by said image output apparatus, and
wherein said reference selector is configured to receive information of said at least one of said input and output image modes from said image mode recognizer and to select one of said plurality of reference property profiles prestored in said memory based on said information of said at least one of said input and output image modes sent from said image mode recognizer, and said property calculator is configured to calculate said optimal property based on said input and output property profile sent from said property recognizer and said reference property profile selected by said second reference selector.

3. The image forming system as defined in claim 2, wherein said image mode recognizer is configured to read and recognize said input property profile of said image input apparatus and said output property profile of said image output apparatus in addition to said at least one of said input image mode specified by said image input apparatus and said output image mode specified by said image output apparatus, said reference selector is configured to receive information of said input and output property profiles and said at least one of said input and output image mode sent from said image mode recognizer and to select one of said plurality of reference property profiles prestored in said memory based on said received information, and said property calculator is configured to calculate said optimal property based on said input and output property profile sent from said property recognizer and said reference property profile selected by said reference selector.

4. The image forming system as defined in claim 1, wherein said reference selector is configured to select one of said plurality of reference property profiles prestored in said memory based on information of color properties included in said input and output property profiles sent from said property recognizer.

5. The image forming system as defined in claim 2, wherein said reference selector is configured to select one of said plurality of reference property profiles prestored in said memory based on information of said output image mode specified by said image output apparatus when said image mode recognizer recognizes a difference in said input and output image modes.

6. The image forming system as defined in claim 2, wherein said reference selector is configured to select one of said plurality of reference property profiles prestored in said memory based on information of said input image mode specified by said image output apparatus when said image mode recognizer recognizes a difference in said input and output image modes.

7. The image forming system as defined in claim 2, wherein said reference selector is configured to select one of said plurality of reference property profiles prestored in said memory based on information of a predetermined output image mode when said image mode recognizer recognizes none of said input and output image modes.

8. The image forming system as defined in claim 3, wherein said image mode recognizer is configured to recognize said input and output property profiles, including resolution properties, in addition to said at least one of said input and output image modes and said reference selector is configured to select one of said plurality of reference property profiles prestored in said memory based on information of said at least one of said input and output image modes and of said resolution properties included in said input and output property profiles.

9. The image forming system as defined in claim 8, wherein said reference selector is configured to select one of said plurality of reference property profiles prestored in said memory based on information of one of said input and output image modes which corresponds to a resolution property having a lower value when said image mode recognizer recognizes said input and output image modes having resolution properties of different values.

10. The image forming system as defined in claim 8, wherein said reference selector is configured to select one of said plurality of reference property profiles prestored in said memory based on information of said input image mode when said image mode recognizer recognizes said input and output image modes having resolution properties of no difference in values.

11. The image forming system as defined in claim 8, wherein said reference selector is configured to select one of said plurality of reference property profiles prestored in said memory based on information of said output image mode when said image mode recognizer recognizes said input and output image modes having resolution properties of no difference in values.

12. The image forming system ad defined in claim 8, wherein said reference selector is configured to select one of said plurality of reference property profiles prestored in said memory based on information of a predetermined image mode when said image mode recognizer recognizes none of said input and output image modes.

13. An image forming system, comprising:
an image input apparatus having an input property profile and configured to read an image from an image source and to convert said image into image data using said input property profile;
an image processing apparatus configured to execute an image processing operation relative to said image data converted by said image input apparatus; and
an image output apparatus having an output property profile and configured to output an image using said output property profile in accordance with said image data processed through said image processing operation executed by said image processing apparatus,
wherein said image processing apparatus comprises:
a property recognizer configured to read and recognize and input property profile of said image input apparatus and an output property profile of said image output apparatus;
a memory configured to prestore a reference property profile; and
a property calculator configured to calculate an optimal property based on said input property profile, said output property profile and said reference property profile, said image processing apparatus executing said image processing operation using said optimal property, wherein each of said input and output property profiles includes at least one of gamma, spatial frequency, color, scanner red/green/blue (RGB) dot displacement, and resolution properties.

14. The image forming system as defined in claim 13, further comprising:
an image area separator configured to judge types of said image data converted by said image input apparatus and to separate said image into image areas by said types according to a judged result;
an image area separation controller configured to control conditions under which said image area separator judges and separates said image data based on said input and output property profiles sent from said property recognizer,
and wherein said image processing apparatus is configured to execute said image processing operation in accordance with said image areas separated by said image area separator.

15. The image forming system as defined in claim 14, wherein when said property recognizer recognizes that one of said resolution property and said MTF property is within a predetermined range, said image area separation controller controls said conditions based on said at least one of resolution properties and MTF properties recognized by said property recognizer, and said image area separator separates said image into image areas by said types, which includes an edge image and a screened-print image, based on said conditions generated by said image area separation controller based on said at least one of said resolution properties and said MTF properties.

16. The image forming system as defined in claim 15, wherein said image area separation controller is configured to control said conditions such that one of said edge image and screened-print image detection operations becomes difficult and the other one of said edge image and screened-print image detection operations becomes easy as one of values of said resolution property and said MTF property is out of a predetermined range when said property recognizer recognizes that one of said resolution property and said MTF property is out of said predetermined range.

17. The image forming system as defined in claim 15, wherein said image area separation controller is configured to control said conditions such that said edge image detection operation becomes difficult and said screened-print image detection operation becomes easy as one of values of said resolution property and said MTF property is out of a predetermined range when said property recognizer recognizes that one of said resolution property and said MTF property is out of said predetermined range.

18. The image forming system as defined in claim 15, wherein said image area separation controller is configured to control said conditions such that one of edge image and screened-print image detection operations becomes easy and the other one of said edge image and screened-print image detection operations becomes difficult as one of values of said resolution property and said MTF property is out of a predetermined range when said property recognizer recognizes that one of said resolution property and said MTF property is out of said predetermined range.

19. The image forming system as defined in claim 15, wherein when said property recognizer recognizes that one of said resolution property and said MTF property is within said predetermined range, said image area separation controller changes a threshold value to be used for a pixel detection in one of said edge image and screened-print image detection operations based on values of said one of said resolution property and said MTF property.

20. The image forming system as defined in claim 15, wherein when said property recognizer recognizes that one of said resolution property and said MTF property varies in a direction within said predetermined range, said image area separation controller changes in a direction a threshold value to be used for a pixel detection in one of said edge image and screened-print image detection operations based on values of said one of said resolution property and said MTF property.

21. The image forming system as defined in claim 15, wherein when said property recognizer recognizes that one of said resolution property and said MTF property is out of said predetermined range, said image area separation controller cancels one of said edge image and screened-print image detection operations.

22. The image forming system as defined in claim 15, wherein when said property recognizer recognizes that said input property profile includes no resolution property, said image area separation controller cancels one of said edge image and screened-print image detection operations.

23. The image forming system as defined in claim 19, wherein said image area separation controller is configured to increase a threshold value for a white pixel detection and decreases a threshold value for a black pixel detection in said image area separation operation, performed during said edge image detection operation, in response to an increase of said resolution property of said image input apparatus.

24. The image forming system as defined in claim 19 wherein said image area separation controller is configured to decrease a threshold value for a white pixel detection and to increase a threshold value for a black pixel detection in said image area separation operation, performed during said edge image detection operation, in response to an increase of said MTF property of said image input apparatus.

25. The image forming system as defined in claim 19, wherein said image area separation controller is configured to decrease a threshold value for a pixel detection in said image area separation operation, performed during said screened-print image detection operation, in response to an increase of said resolution property of said image input apparatus.

26. The image forming system as defined in claim 19, wherein said image area separation controller is configured to increase a threshold value for a pixel detection in said image area separation operation, performed during said screened-print image detection operation, in response to an increase of said MTF property of said image input apparatus.

27. The image forming system as defined in claim 19, wherein when said property recognizer recognizes that said MTF property is decreased, said property recognizer narrows said predetermined range in response to a decrease of said MTF property.

28. An image forming system, comprising:
an image input apparatus having an input property profile and configured to read an image from an image source and to convert said image into image data using said input property profile;
an image processing apparatus configured to execute an image processing operation relative to said image data converted by said image input apparatus; and
an image processing apparatus configured to execute an image processing operation relative to said image data converted by said image input apparatus; and
an image output apparatus having an output property profile and configured to output an image using said output property profile in accordance with said image data processed through said image processing operation executed by said image processing apparatus,
wherein said image processing apparatus comprises:
a property recognizer configured to read and recognize an input property profile of said image input apparatus and an output property profile of said image output apparatus;
a memory configured to prestore a reference property profile; and
a property calculator configured to calculate an optimal property based on said input property profile, said output property profile and said reference property profile, said image processing apparatus executing said image processing operation using said optimal property, wherein said property recognizer is configured to read an input spatial frequency property of said image input apparatus and an output spatial frequency property of said image output apparatus and to recognize an input and output spatial frequency property information based on said input spatial frequency property of said image input apparatus and said output spatial frequency property of said image output apparatus respectively, said memory is configured to prestore a reference spatial frequency property, and said property calculator is configured to calculate said optimal property based on said input and output spatial frequency property information and said reference spatial frequency property, said image processing apparatus executing said image processing operation using said optimal property.

29. The image forming system as defined in claim 28, wherein said memory is configured to prestore a plurality of reference spatial frequency properties, said reference selector is configured to select one of said plurality of reference spatial frequency properties prestored in said memory based on said input and output spatial frequency property information sent from said property recognizer, and said property calculator is configured to calculate said optimal property based on said input and output spatial frequency property information and said selected reference spatial frequency property.

30. The image forming system as defined in claim 29, wherein said reference selector is configured to select one of said plurality of reference spatial frequency properties prestored in said memory in response to a value of said input and output spatial frequency property information sent from said property recognizer.

31. The image forming system as defined in claim 30, wherein when said property recognizer recognizes that a value of said input and output spatial frequency property information is lower than a value of a predetermined input and output spatial frequency property, said reference selector stepwise selects a next low reference spatial frequency property from among said plurality of reference spatial frequency properties prestored in said memory in response to a decrease of said input and output spatial frequency property information sent from said property recognizer.

32. The image forming system as defined in claim 28, wherein when said property recognizer recognizes that a value of said input and output spatial frequency property information is lower than a value of a predetermined input and output spatial frequency property, said image processing apparatus cancels an execution of a filter operation during said image processing operation.

33. An image forming system, comprising:
image input means, having an input property profile, for reading an image from an image source and converting said image into image data using said input property profile;
image processing means for executing an image processing operation relative to said image data converted by said image input means; and
image output means, having an output property profile, for outputting an image using said output property profile in accordance with said image data processed through said image processing operation executed by said image processing means,
wherein said image processing means comprises:
property recognizing means for reading and recognizing an input property profile of said image input means and an output property profile of said image output means;
memory means for prestoring a reference property profile; and
property calculating means for calculating an optimal property based on said input property profile, said output property profile and said reference property profile, said image processing means executing said image processing operation using said optimal property, wherein the image forming system further comprising reference selecting means for receiving said input and output property profiles from said property recognizing means, and wherein said memory means prestores a plurality of reference property profiles, said reference selecting means selects one of said plurality of reference property profiles prestored in said memory means based on said input and output property profiles sent from said property recognizing means, and said property calculating means calculates said optimal property based on said input and output property profile and said selected reference property profile.

34. The image forming system as defined in claim 33, wherein said image input means specifies an input image mode and said image output means specifies an output image mode,
said image forming system further comprising image mode recognizing means for reading and recognizing at least one of said input image mode specified by said image input means and said output image mode specified by said image output means, and
wherein said reference selecting means receives information of said at least one of said input and output image modes from said image mode recognizing means and selects one of said plurality of reference property profiles prestored in said memory means based on said information of said at least one of said input and output image modes sent from said image mode recognizing means, and said property calculating means calculate said optimal property based on said input and output property profile sent from said property recognizing means and said reference property profile selected by said second reference selecting means.

35. The image forming system as defined in claim 34, wherein said image mode recognizing means reads and recognizes said input property profile of said image input means and said output property profile of said image output means in addition to said at least one of said input image mode specified by said image input means and said output image mode specified by said image output means, said reference selecting means receives information of said input and output property profiles and said at least one of said input and output image mode sent from said image mode recognizing means and selects one of said plurality of reference property profiles prestored in said memory means based on said received information, and said property calculating means calculates said optimal property based on said input and output property profile sent from said property recognizing means and said reference property profile selected by said reference selecting means.

36. The image forming system as defined in claim 33, wherein said reference selecting means selects one of said plurality of reference property profiles prestored in said memory means based on information of color properties included in said input and output property profiles sent from said property recognizing means.

37. The image forming system as defined in claim 34, wherein said reference selecting means selects one of said plurality of reference property profiles prestored in said memory means based on information of said output image mode specified by said image output means when said image mode recognizing means differently recognizes said input and output image modes.

38. The image forming system as defined in claim 34, wherein said reference selecting means selects one of said plurality of reference property profiles prestored in said memory means based on information of said input image mode specified by said image output means when said image mode recognizing means recognizes a difference said input and output image modes.

39. The image forming system as defined in claim 34, wherein said reference selecting means selects one of said plurality of reference property profiles prestored in said memory means based on information of a predetermined output image mode when said image mode recognizing means recognizes none of said input and output image modes.

40. The image forming system as defined in claim 35, wherein said image mode recognizing means recognizes said input and output property profiles, including resolution properties, in addition to said at least one of said input and output image modes and said reference selecting means selects one of said plurality of reference property profiles prestored in said memory means based on information of said at least one of said input and output image modes and of said resolution properties included in said input and output property profiles.

41. The image forming system as defined in claim 40, wherein said reference selecting means selects one of said plurality of reference property profiles prestored in said memory means based on information of one of said input and output image modes which corresponds to a resolution property having a lower value when said image mode recognizing means recognizes said input and output image modes having resolution properties of different values.

42. The image forming system as defined in claim 40, wherein said reference selecting means selects one of said plurality of reference property profiles prestored in said memory means based on information of said input image mode when said image mode recognizing means recognizes said input and output image modes having resolution properties of no difference in values.

43. The image forming system as defined in claim 40, wherein said reference selecting means selects one of said plurality of reference property profiles prestored in said memory means based on information of said output image mode when said image mode recognizing means recognizes and input and output image modes having resolution properties of no difference in values.

44. The image forming system as defined in claim 40, wherein said reference selecting means selects one of said plurality of reference property profiles prestored in said memory means based on information of a predetermined image mode when said image mode recognizing means recognizes none of said input and output image modes.

45. An image forming system, comprising:
    image input means, having an input property profile, for reading an image from an image source and converting said image into image data using said input property profile;
    image processing means for executing an image processing operation relative to said image data converted by said image input means; and
    image output means, having an output property profile, for outputting an image using said output property profile in accordance with said image data processed through said image processing operation executed by said image processing means,
    wherein said image processing means comprises:
    property recognizing means for reading and recognizing an input property profile of said image input means and an output property profile of said image output means;
    memory means for prestoring a reference property profile; and
    property calculating means for calculating an optimal property based on said input property profile, said output property profile and said reference property profile, said image processing means executing said image processing operation using said optimal property, wherein each of said input and output property profiles includes at least one of gamma, spatial frequency, color, scanner red/green/blue (RGB) dot displacement, and resolution properties.

46. The image forming system as defined in claim 45, further comprising:
    image area separating means for judging types of said image data converted by said image input means and separating said image into image areas by said types according to a judged result;
    image area separation controlling means for controlling conditions, under which said image area separating means judges and separates said image data, based on said input and output property profiles sent from said property recognizing means,
    and wherein said image processing means executes said image processing operation in accordance with said image areas separated by said image area separating means.

47. The image forming system as defined in claim 46, wherein when said property recognizing means recognizes that one of said resolution property and said MTF property is within a predetermined range, said image area separation controlling means controls said conditions based on said at least one of resolution properties and MTF properties recognized by said property recognizing means, and said image area separating means separates said image into image areas by said types, which includes an edge image and a screened-print image, based on said conditions generated by said image area separation controlling means based on said at least one of said resolution properties and said MTF properties.

48. The image forming system as defined in claim 47, wherein said image area separation controlling means controls said conditions such that one of said edge image and screened-print image detection operations becomes difficult and the other one of said edge image and screened-print image detection operations becomes easy as one of values of said resolution property and said MTF property is out of a predetermined range when said property recognizing means recognizes that one of said resolution property and said MTF property is out of said predetermined range.

49. The image forming system as defined in claim 47, wherein said image area separation controlling means controls said conditions such that said edge image detection operation becomes difficult and said screened-print image detection operation becomes easy as one of values of said resolution property and said MTF property is out of a predetermined range when said property recognizing means recognizes that one of said resolution property and said MTF property is out of said predetermined range.

50. The image forming system as defined in claim 47, wherein said image area separation controlling means controls said conditions such that one of said edge image and screened-print image detection operations becomes easy and the other one of said edge image and screened-print image detection operations becomes difficult as one of values of said resolution property and said MTF property is out of a predetermined range when said property recognizing means recognizes that one of said resolution property and said MTF property is out of said predetermined range.

51. The image forming system as defined in claim 47, wherein when said property recognizing means recognizes that one of said resolution property and said MTF property is within said predetermined range, said image area separation controlling means changes a threshold value to be used for a pixel detection in one of said edge image and screened-print image detection operations based on values of said one of said resolution property and said MTF property.

52. The image forming system as defined in claim 47, wherein when said property recognizing means recognizes that one of said resolution property and said MTF property varies in a direction within said predetermined range, said image area separation controlling means changes in a direction a threshold value to be used for a pixel detection in one of said edge image and screened-print image detection operations based on values of said one of said resolution property and said MTF property.

53. The image forming system as defined in claim 47, wherein when said property recognizing means recognizes that one of said resolution property and said MTF property is out of said predetermined range, said image area separation controlling means cancels one of said edge image and screened-print image detection operations.

54. The image forming system as defined in claim 47, wherein when said property recognizing means recognizes that said input property profile includes no resolution property, said image area separation controlling means cancels one of said edge image and screened-print image detection operations.

55. The image forming system as defined in claim 51, wherein said image area separation controlling means increases a threshold value for a white pixel detection and decreases a threshold value for a blank pixel detection in said image area separation operation, performed during said edge image detection operation, in response to an increase of said resolution property of said image input means.

56. The image forming system as defined in claim 51, wherein said image area separation controlling means decreases a threshold value for a white pixel detection and increases a threshold value for a black pixel detection in said image area separation operation, performed during said edge image detection operation, in response to an increase of said MTF property of said image input means.

57. The image forming system as defined in claim 51, wherein said image area separation controlling means decreases a threshold value for a pixel detection in said image area separation operation, performed during said screened-print image detection operation, in response to an increase of said resolution property of said image input means.

58. The image forming system as defined in claim 51, wherein said image area separation controlling means increases a threshold value for a pixel detection in said image area separation operation, performed during said screened-print image detection operation, in response to an increase of said MTF property of said image input means.

59. The image forming system as defined in claim 51, wherein when said property recognizing means recognizes that said MTF property is decreased, said property recognizing means narrows said predetermined range in response to a decrease of said MTF property.

60. An image forming system, comprising:
  image input means, having an input property profile, for reading an image from an image source and converting said image into image data using said input property profile;
  image processing means for executing an image processing operation relative to said image data converted by said image input means; and
  image output means, having an output property profile, for outputting an image using said output property profile in accordance with said image data processed through said image processing operation executed by said image processing means,
  wherein said image processing means comprises:
  property recognizing means for reading and recognizing an input property profile of said image input means and an output property profile of said image output means;
  memory means for prestoring a reference property profile; and
  property calculating means for calculating an optimal property based on said input property profile, said output property profile and said reference property profile, said image processing means executing said image processing operation using said optimal property,
  wherein said property recognizing means reads an input spatial frequency property of said image input means and an output spatial frequency property of said image output means and recognizes an input and output spatial frequency property information based on said input spatial frequency property of said image input means and said output spatial frequency property of said image output means respectively, said memory means prestores a reference spatial frequency property, and said property calculating means calculates said optimal property based on said input and output spatial frequency property information, and said reference spatial frequency property, said image processing means executing said image processing operation using said optimal property, and
  wherein said memory means prestores a plurality of reference spatial frequency properties, said reference selecting means selects one of said plurality of reference spatial frequency properties prestored in said memory means based on said input and output spatial frequency property information sent from said property recognizing means, and said property calculating means calculates said optimal property based on said input and output spatial frequency property information and said selected reference spatial frequency property.

61. The image forming system as defined in claim 60, wherein said reference selecting means selects one of said plurality of reference spatial frequency properties prestored in said memory means in response to a value of said input and output spatial frequency property information sent from said property recognizing means.

62. The image forming system as defined in claim 61, wherein when said property recognizing means recognizes that a value of said input and output spatial frequency property information is lower than a value of a predetermined input and output spatial frequency property, said reference selecting means stepwise selects a next low reference spatial frequency property from among said plurality of reference spatial frequency properties prestored in said memory means in response to a decrease of said input and output spatial frequency property information sent from said property recognizing means.

63. An image forming system, comprising:
  image input means, having an input property profile, for reading an image from an image source and converting said image into image data using said input property profile;
  image processing means for executing an image processing operation relative to said image data converted by said image input means; and
  image output means, having an output property profile, for outputting an image using said output property profile in accordance with said image data processed through said image processing operation executed by said image processing means,
  wherein said image processing means comprises:
  property recognizing means for reading and recognizing an input property profile of said image input means and an output property profile of said image output means;
  memory means for prestoring a reference property profile; and
  property calculating means for calculating an optimal property based on said input property profile, said output property profile and said reference property profile, said image processing means executing said image processing operation using said optimal property, wherein said property recognizing means reads an input spatial frequency property of said image input means and an output spatial frequency property of said image output means and recognizes an input and output spatial frequency property information based on said input spatial frequency property of said image input means and said output spatial frequency property of said image output means respectively, said memory means prestores a reference spatial frequency property, and said property calculating means calculates said optimal property based on said input and output spatial frequency property information, and said reference spatial frequency property, said image processing means executing said image processing operation using said optimal property, and wherein when said property recognizing means recognizes that a value of said input and output spatial frequency property information is lower than a value of a predetermined input and output spatial frequency property, said image processing means cancels an execution of a filter operation during said image processing operation.

64. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said prestoring step prestores a plurality of reference property profiles, said method further comprising a step of selecting one of said plurality of reference property profiles based on information of said input and output property profiles recognized in said recognizing step, and wherein said calculating step calculates an optimal property based on said input property profile, said output property profile and said reference property profile selected in said selecting step, said executing step executing said image processing operation using said optimal property.

65. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said prestoring step prestores a plurality of reference property profiles, aid method further comprising the steps of obtaining at least one of an input image mode under which said reading step reads said input image and an output image mode under which said outputting step outputs said output image and selecting one of said plurality of reference property profiles based on information of said input and output image modes obtained in said obtaining step, and wherein said calculating step calculates an optimal property based on said input property profile, said output property profile and said reference property profile selected in said selecting step, said executing step executing said image processing operation using said optimal property.

66. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said prestoring step prestores a plurality of reference property profiles, said method further comprising the steps of:

obtaining at least one of an input image mode under which said reading step reads said input image and an output image mode under which said outputting step outputs said output image; and selecting one of said plurality of reference property profiles based on information of said input and output property profiles recognized in said recognizing step and said input and output image modes obtained in said obtaining step, and wherein said calculating step calculates an optimal property based on said input property profile, said output property profile and said reference property profile selected in said selecting step and executing step executing said image processing operation using said optimal property.

67. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein each of said input and output property profiles includes at least one of gamma, spatial frequency, color, scanner red/green/blue RGB dot displacement, and resolution properties.

68. The method as defined in claim 67, further comprising the steps of: judging types of said image data; and separating said image data into image areas in accordance with said types judged in said judging step, and wherein said executing step executes said image processing operation based on said image areas separated in said separating step.

69. The method as defined in claim 68, wherein said recognizing step recognizes at least one of a resolution property included in said input property profile and an MTF property included in said output property profile, and said executing step execute said image processing operation which comprises steps of performing at least one of an edge area detection and a screened-print area detection based on information of said at least one of said resolution property and said MTF property recognized in said recognizing step.

70. The method as defined in claim 69, further comprising the steps of:

checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that one of said edge area detection and said screened-print area detection becomes more difficult and the other one of said edge area detection and said screened-print area detection becomes easier.

71. The method as defined in claim 69, further comprising steps of checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that said edge area detection becomes more difficult and said screened-print area detection becomes easier.

72. The method as defined in claim 69, further comprising the steps of:

checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that said edge area detection becomes easier and said screened-print area detection becomes more difficult.

73. The method as defined in claim 69, further comprising the steps of:

checking whether at least one of values of said resolution property and said MTF property is out of a predetermined range; and changing a threshold value to be used for a pixel detection in an image area separation operation during said edge area detection and said screened-print area detection, and wherein when a result of said checking step is such that at least one of said resolution property and said MTF property is out of said predetermined range, said changing step changes said threshold value based on said at least one of values of said resolution property and said MTF property which is out of said predetermined range as checked by said checking step.

74. The method as defined in claim 69, further comprising the steps of:

checking whether at least one of values of said resolution property and said MTF property is within a predetermined range in a direction; and changing a threshold value to be used for a pixel detection in an image area separation operation during said edge area detection and said screened-print area detection, and wherein when a result of said checking step is such that at least one of said resolution property and said MTF property is within said predetermined range in a direction, said changing step changes said threshold value in a direction based on said at least one of said values of said resolution property and said MTF property which is within said predetermined range as checked by said checking step.

75. The method as defined in claim 69, further comprising the steps of:

checking whether at least one of values of said resolution property and said MTF property is out of a predetermined range; and canceling at least one of said edge area detection and said screened-print area detection when a result of said checking step is such that at least one of said resolution property and said MTF property is out of said predetermined range.

76. The method as defined in claim 69, further comprising a step of canceling said edge area detection and said screened-print area detection, and wherein when said recognizing step recognizes no resolution property, said canceling step cancels at least one of said edge area detection and said screened-print area detection.

77. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said recognizing step recognizes an input spatial frequency property included in said input property profile and an output spatial frequency property included in said output property profile and said calculating step calculates an optimal property based on said input spatial frequency property, said output spatial frequency property, and said reference property profile selected in said selecting step said executing step executing said image processing operation using said optimal property.

78. A method for image forming, comprising the steps of:

reading an input image from an image source;

converting said input image into image data;

executing an image processing operation relative to said image data;

outputting an output image in accordance with said image data processed through said image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said prestoring step prestores a plurality of reference spatial frequency properties, said method further comprising a step of selecting one of said plurality of reference spatial frequency properties based on information of said input and output spatial frequency properties recognized in said recognizing step, and wherein said calculating step calculates an optimal property based on said input spatial frequency property, said output spatial frequency property and said reference spatial frequency property selected in said selecting step said executing step executing said image processing operation using said optimal property.

79. The method as defined in claim 78, further comprising a step of obtaining input and output spatial frequency property information based on said input spatial frequency property and said output spatial frequency property, and wherein said selecting step differently selects one of said plurality of reference spatial frequency properties in accordance with a value of said input and output spatial frequency property information obtained in said obtaining step.

80. The method as defined in claim 79, further comprising step of checking whether said value of said input and output spatial frequency property information is lower than a predetermined value, and wherein when a result of said checking step is such that said value of said input and output spatial frequency property information is lower than said predetermined value, said selecting step stepwise selects one of said plurality of said reference spatial frequency properties in accordance with a decrease of said value of said input and output spatial frequency property information.

81. An image processing apparatus, comprising:

an input property profile manager including an input property profile which defines an input conversion property used when an input image is converted into input image data;

an output property profile manager including an output property profile which defines an output conversion property used when an output image data is converted into an output image;

an image processing mechanism configured to execute an image processing operation relative to said input image data converted with said input property profile;

a property recognizer configured to read and recognize said input property profile and said output property profile;

a memory configured to prestore a reference property profile;

a property calculator configured to calculate an optimal property based on said input property profile, said output property profile and said reference property profile, said image processing mechanism executing said image processing operating using said optimal property;

a reference selector configured to receive said input and output property profiles from said property recognizer, and wherein said memory is configured to prestore a plurality of reference property profiles, said reference selector is configured to select one of said plurality of reference property profiles prestored in said memory based on said input and output property profiles sent from said property recognizer, and said property calculator is configured to calculate said optimal property based on said input and output property profile and said selected reference property profile.

82. An image processing apparatus, comprising:

an input property profile manager including an input property profile which defines an input conversion property used when an input image is converted into input image data;

an output property profile manager including an output property profile which defines an output conversion property used when an output image data is converted into an output image;

an image processing mechanism configured to execute an image processing operation relative to said input image data converted with said input property profile;

a property recognizer configured to read and recognize said input property profile and said output property profile;

a memory configured to prestore a reference property profile;

a property calculator configured to calculate an optimal property based on said input property profile, said output property profile and said reference property profile, said image processing mechanism executing said image processing operation using said optimal property;

an input property source switch configured to switch an input property source between an external source and said input property profile; and an output property source switch configured to switch an output property source between an external source and said output property profile; and wherein said property recognizer is configured to read and recognize an input property profile received via said input property switch and an output property profile received via said output property switch.

83. An image processing apparatus, comprising:

input property profile managing means including an input property profile for defining an input conversion property used when an input image is converted into input image data;

output property profile managing means including an output property profile for defining an output conversion property used when an output image data is converted into an output image;

image processing means for executing an image processing operation relative to said input image data converted with said input property profile;

property recognizing means for reading and recognizing said input property profile and said output property profile;

memory means for prestoring a reference property profile;

property calculating means for calculating an optimal property based on said input property profile, said output property profile and said reference property profile said image processing means executing said image processing operation using said optimal property; and reference selecting means receiving said input and output property profiles from said property recognizing means, and wherein said memory means prestores a plurality of reference property profiles, said reference selecting means selects one of said plurality of reference property profiles prestored in said memory means based on said input and output property profiles sent from said property recognizing means, and said property calculating means calculates said optimal property based on said input and output property profile and said selected reference property profile.

84. An image processing apparatus, comprising:

input property profile managing means including an input property profile for defining an input conversion property used when an input image is converted into input image data;

output property profile managing means including an output property profile for defining an output conversion property used when an output image data is converted into an output image;

image processing means for executing an image processing operation relative to said input image data converted with said input property profile;

property recognizing means for reading and recognizing said input property profile and said output property profile;

memory means for prestoring a reference property profile;

property calculating means for calculating an optimal property based on said input property profile, said output property profile and said reference property profile said image processing means executing said image processing operation using said optimal property;

input property source switch means for switching an input property source between an external source and said input property profile; and an output property source switch means for switching an output property source between an external source and said output property profile, and wherein said property recognizing means reads and recognizes an input property profile received via said input property switch means and an output property profile received via said output property switch means.

85. A method for image forming, comprising the steps of:

prestoring a reference property profile;

providing an input property profile relative to an input property with which an image read from an original is converted into image data corresponding to said image and an output property profile relative to an output property to be used when said image data is converted to be output;

recognizing said input property profile and said output property profile;

calculating an optimal property based on said input property profile, said output property profile and said reference property profiles; and executing an image processing operation relative to said image data using said optimal property, wherein said prestoring step prestores a plurality of reference property profiles said method further comprising a step of selecting one of said plurality of reference property profiles based on information of said input and output property profiles recognized in said recognizing step, and wherein said calculating step calculates an optimal property based on said input property profile, said output property profile and said reference property profile selected in said selecting step, and said executing step to optimally execute said image processing operation using said optimal property.

86. A method for image forming, comprising the steps of:

prestoring a reference property profile;

providing an input property profile relative to an input property with which an image read from an original is converted into image data corresponding to said image and an output property profile relative to an output property to be used when said image data is converted to be output;

recognizing said input property profile and said output property profile;

calculating an optimal property based on said input property profile, said output property profile and said reference property profile; and executing an image processing operation relative to said image data using said optimal property, said method further comprising a first step of selecting one of a plurality of input property sources including an external source and said input property profile and a second step of selecting one of a plurality of output property sources including an external source and said output property profile, and wherein said recognizer recognizes said one of said plurality of said input property sources including said external source and said input property profile selected by said first selecting step and said one of a plurality of output property sources including an external source and said output property profile selected by said second selecting step.

87. A computer readable medium storing computer instructions for performing the steps of:

reading an input image from an image source;

converting said input image into image data;

executing an image processing operation relative to said image data;

outputting an output image in accordance with said image data processed through said—image processing operation;

prestoring a reference property profile;

recognizing an input property profile including input properties with which said input image is converted during said converting step and an output property profile including calculating an optimal property based on said input property profile, said output property profile and said reference property profile, said executing step executing said image processing operation using said optimal property, wherein said prestoring step prestores a plurality of reference property profiles, said computer readable medium further storing computer instructions for performing a step of selecting one of said plurality of reference property profiles based on information of said input and output property profiles recognized in said recognizing step, and wherein said calculating step calculates an optimal property based on said input property profile, said output property profile and said reference property profile selected in said selecting step, said executing step executing said image processing operation using said optimal property.

88. A computer readable medium storing computer instructions for performing the steps of:

reading an input image from an image source;

converting said input image into image data;

executing an image processing operation relative to said image data;

outputting an output image in accordance with said image data processed through said—image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein said prestoring step prestores a plurality of reference property profiles, said computer readable medium further storing computer instructions for performing the steps of:

obtaining at least one of an input image mode under which said reading step reads said input image and an output image mode under which said outputting step outputs said output image; and selecting one of said plurality of reference property profiles based on information of said input and output image modes obtained in said obtaining step, and wherein said calculating step calculates an optimal property based on said input property profile, said output property profile and said reference property profile selected in said selecting step, said executing step executing said image processing operation using said optimal property.

89. A computer readable medium storing computer instructions for performing the steps of:

reading an input image from an image source;

converting said input image into image data;

executing an image processing operation relative to said image data;

outputting an output image in accordance with said image data processed through said—image processing operation, prestoring a reference property profile;

recognizing an input property profile including input properties with which said input image is converted during said converting step and an output property profile including output properties with which said output images output during said outputting step; and calculating an optimal property based on said input property profile, said output property profile and said reference property profile, said executing step executing said image processing operation using said optimal property, wherein said prestoring step prestores a plurality of reference property profiles, said computer readable medium further storing computer instructions for performing the steps of:

obtaining at least one of an input image mode under which said reading step reads said input image and an output image mode under which said outputting step outputs said output image; and selecting one of said plurality of reference property profiles based on information of said input and output property profiles recognized in said recognizing step and said input and output image modes obtained in said obtaining step, and wherein said calculating step calculates an optimal property based on said input property profile, said output property profile and said reference property profile selected in said selecting step, said executing step executing said image processing operation using said optimal property.

90. A computer readable medium storing computer instructions for performing the steps of:

reading an input image from an image source;

converting said input image into image data;

executing an image processing operation relative to said image data;

outputting an output image in accordance with said image data processed through said—image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, wherein each of said input and output property profiles includes at least one of gamma, spatial frequency, color, scanner red/green/blue (RGB) dot displacement, and resolution properties.

91. A computer readable medium storing computer instructions for performing the steps of:

reading an input image from an image source;

converting said input image into image data;

executing an image processing operation relative to said image data;

outputting an output image in accordance with said image data processed through said—image processing operation, prestoring a reference property profile;

recognizing an input property profile including input properties with which said input image is converted during said converting step and an output property profile including output properties with which said output image is output during said outputting step; and calculating an optimal property based on said input property profile, said output property profile and said reference property profile, said executing step executing said image processing operation using said optimal property, said computer readable medium further storing computer instructions for performing the steps of:

judging types of said image data; and separating said image data into image areas in accordance with said types judged in said judging step, and wherein said executing step executes said image processing operation based on said image areas separated in said separating step.

92. The computer readable medium as defined in claim 91, wherein said recognizing step recognizes at least one of a resolution property included in said input property profile and an MTF property included in said output property profile, and said executing step executes said image processing operation which comprises performing at least one of an edge area detection and a screened-print area detection based on information of said at least one of said resolution property and said MTF property recognized in said recognizing step.

93. The computer readable medium as defined in claim 92, said computer readable medium further storing computer instructions for performing the steps of:

checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that one of said edge area detection and said screened-print area detection becomes more difficult and the other one of said edge area detection and said screened-print area detection becomes easier.

94. The computer readable medium as defined in claim 92, said computer readable medium further storing computer instructions for performing the steps of:

checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that said edge area detection becomes more difficult and said screened-print area detection becomes easier.

95. The computer readable medium as defined in claim 92, said computer readable medium further storing computer instructions for performing the steps of:

checking whether at least one of said resolution property and said MTF property is out of a predetermined range; and controlling easiness in performing said edge area detection and said screened-print area detection, and wherein when a result of said checking step is such that at least one of said resolution property and said MTF property is out of said predetermined range, said controlling step controls such that said edge area detection becomes easier and said screened-print area detection becomes more difficult.

96. The computer readable medium as defined in claim 92, said computer readable medium further storing computer instructions for performing the steps of:

checking whether at least one of values of said resolution property and said MTF property is out of a predetermined range; and changing a threshold value to be used for a pixel detection in an image area separation operation during said edge area detection and said screened-print area detection, and wherein when a result of said checking step is such that at least one of said resolution property and said MTF property is out of said predetermined range, said changing step changes said threshold value based on said at least one of values of said resolution property and said MTF property which is out of said predetermined range as checked by said checking step.

97. The computer readable medium as defined in claim 92, said computer readable medium further storing computer instructions for performing the steps of:

checking whether at least one of values of said resolution property and said MTF property is within a predetermined range in a direction; and changing a threshold value to be used for a pixel detection in an image area separation operation during said edge area detection and said screened-print area detection, and wherein when a result of said checking step is such that at least one of said resolution property and said MTF property is within said predetermined range in a direction, said changing step changes in a direction said threshold value based on said at least one of said values of said resolution property and said MTF property which is within said predetermined range as checked by said checking step.

98. The computer readable medium as defined in claim 92, said computer readable medium further storing computer instructions for performing the steps of:

checking whether at least one of values of said resolution property and said MTF property is out of a predetermined range; and canceling at least one of said edge area detection and said screened-print area detection when a result of said checking step is such that at least one of said resolution property and said MTF property is out of said predetermined range.

99. The computer readable medium as defined in claim 92, said computer readable medium further storing computer instructions for performing a step of cancelling at least one of said edge area detection and said screened-print area detection when said recognizing step recognizes no resolution property.

100. A computer readable medium storing computer instructions for performing the steps of:
reading an input image from an image source;
converting said input image into image data;
executing an image processing operation relative to said image data;
outputting an output image in accordance with said image data processed through said—image processing operation,
prestoring a reference property profile;
recognizing an input property profile including input properties with which said input image is converted during said converting step and an output property profile including output properties with which said output image is output during said outputting step; and
calculating an optimal property based on said input property profile, said output property profile and said reference property profile, said executing step executing said image processing operation using said optimal property, wherein said prestoring step prestores a plurality of reference spatial frequency properties, said method further comprising a step of selecting one of said plurality of reference spatial frequency properties based on information of said input and output spatial frequency properties recognized in said recognizing step, and
wherein said calculating step calculates an optimal property based on said input spatial frequency property, said output spatial frequency property and said reference spatial frequency property selected in said selecting step said executing step executing said image processing operation using said optimal property.

101. The computer readable medium as defined in claim 100, said computer readable medium further storing computer instructions for performing a step of obtaining input and output spatial frequency property information based on said input spatial frequency property and said output spatial frequency property, and wherein said selecting differently selects one of said plurality of reference spatial frequency properties in accordance with a value of said input and output spatial frequency property information obtained in said obtaining step.

102. The computer readable medium as defined in claim 101, said computer readable medium further storing computer instructions for performing the step of checking whether said value of said input and output spatial frequency property information is lower than a predetermined value, and
wherein when a result of said checking step is such that said value of said input and output spatial frequency property information is lower than said predetermined value, said selecting step stepwise selects one of said plurality of said reference spatial frequency properties in accordance with a decrease of said value of said input and output spatial frequency property information.

103. A computer readable medium storing computer instructions for performing the steps of:
prestoring a reference property profile;
providing an input property profile relative to an input property with which an image read from an original is converted into image data corresponding to said image and an output property profile relative to an output property to be used when said image data is converted to be output;
recognizing said input property profile and said output property profile;
calculating an optimal property based on said input property profile, said output property profile and said reference property profile; and
executing an image processing operation relative to said image data using said optimal property, wherein said prestoring step prestores a plurality of reference property profiles, said computer readable medium further storing computer instructions for performing the step of selecting one of said plurality of reference property profiles based on information of said input and output property profiles recognized in said recognizing step, and
wherein said calculating step calculates an optimal property based on said input property profile, said output property profile and said reference property profile selected in said selecting step, and said executing step executes said image processing operation using said optimal property.

104. A computer readable medium storing computer instructions for performing the steps of:
prestoring a reference property profile;
providing an input property profile relative to an input property with which an image read from an original is converted into image data corresponding to said image and an output property profile relative to an output property to be used when said image data is converted to be output;
recognizing said input property profile and said output property profile;
calculating an optimal property based on said input property profile, said output property profile and said reference property profile; and
executing an image processing operation relative to said image data using said optimal property, said computer readable medium further storing computer instructions for performing the steps of:
a first step of selecting one of a plurality of input property sources including an external source and said input property profile and a second step of selecting one of a plurality of output property sources including an external source and said output property profile, and
wherein said recognizer recognizes said one of said plurality of said input property sources including said external source and said input property profile selected by said first selecting step and said one of a plurality of output property sources including an external source and said output property profile selected by said second selecting step.

* * * * *